United States Patent
Hamamoto et al.

(10) Patent No.: US 7,889,632 B2
(45) Date of Patent: Feb. 15, 2011

(54) RADIO COMMUNICATION SYSTEM AND RADIO COMMUNICATION METHOD

(75) Inventors: Kozue Hamamoto, Kiyose (JP); Hitoshi Yoshino, Yokosuka (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 945 days.

(21) Appl. No.: 10/547,428

(22) PCT Filed: Feb. 27, 2004

(86) PCT No.: PCT/JP2004/002332

§ 371 (c)(1),
(2), (4) Date: May 24, 2006

(87) PCT Pub. No.: WO2004/077712

PCT Pub. Date: Sep. 10, 2004

(65) Prior Publication Data

US 2006/0250935 A1    Nov. 9, 2006

(30) Foreign Application Priority Data

Feb. 28, 2003   (JP) .............................. 2003-054760
Feb. 28, 2003   (JP) .............................. 2003-054765

(51) Int. Cl.
*H04J 11/00* (2006.01)
*H04J 9/00* (2006.01)

(52) U.S. Cl. ....................... 370/203; 370/204; 370/205; 370/206; 370/207; 370/208

(58) Field of Classification Search .................. 370/203, 370/204, 205, 206, 207, 208, 209, 210, 211; 455/17, 23, 102, 106, 130

See application file for complete search history.

(56) References Cited

U.S. PATENT DOCUMENTS 6,735,446 B1 * 5/2004 Iwata et al. .................. 455/518
2004/0062193 A1 * 4/2004 Ma et al. ..................... 370/208

FOREIGN PATENT DOCUMENTS

JP    10-191431    7/1998

(Continued)

OTHER PUBLICATIONS

Derwent Abstract for JP 2002-330467, retrieved on May 15, 2009, 1 page.*

(Continued)

*Primary Examiner*—Kwang B Yao
*Assistant Examiner*—Adam Duda
(74) *Attorney, Agent, or Firm*—Oblon, Spivak, McClelland, Maier & Neustadt, L.L.P.

(57) ABSTRACT

A radio communication system for carrying out communications between radio stations by modulating a plurality of signal sequences to be transmitted and received into at least one frequency channel assigned to each of a plurality of cells is formed by a channel mapping means for rearranging for each cell a plurality of frequency channels assigned with respect to each cell, and newly assigning particular frequency channels as a transmission and reception band of said signal sequences, and a bandwidth control means for controlling a bandwidth of said assigned frequency channel according to a propagation state of said assigned frequency channel.

10 Claims, 35 Drawing Sheets

FOREIGN PATENT DOCUMENTS

| | | |
|---|---|---|
| JP | 10-303849 | 11/1998 |
| JP | 11-17644 | 1/1999 |
| JP | 11-27231 | 1/1999 |
| JP | 11-205848 | 7/1999 |
| JP | 11-215093 | 8/1999 |
| JP | 2000-9734 | 1/2000 |
| JP | 2000-32565 | 1/2000 |
| JP | 2000-286822 | 10/2000 |
| JP | 2000-303849 | 10/2000 |
| JP | 2000-332724 | 11/2000 |
| JP | 2002-262343 | 9/2002 |
| JP | 2002-330467 | 11/2002 |
| JP | 2002-335557 | 11/2002 |
| JP | 2003-46481 | 2/2003 |

OTHER PUBLICATIONS

Machine Translation for JP 2002-330467, retrieved on May 15, 2009, all pages.*

* cited by examiner

FIG.7
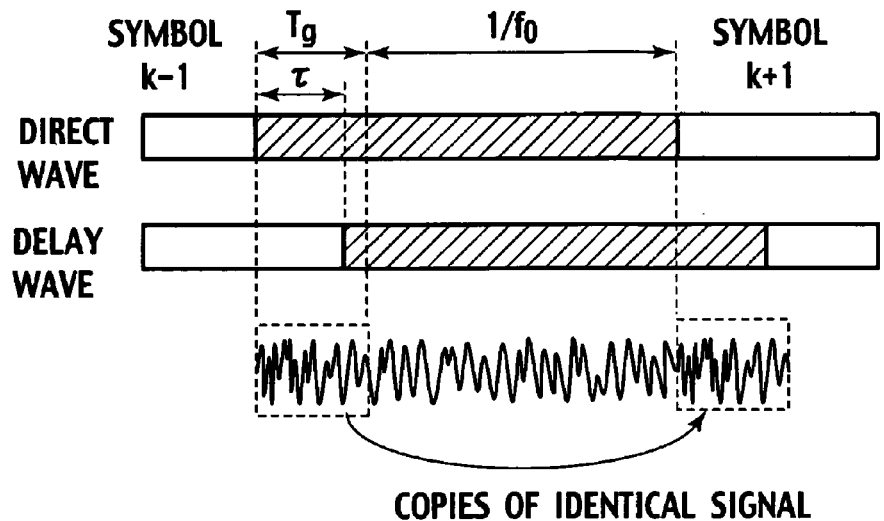
FIG.8
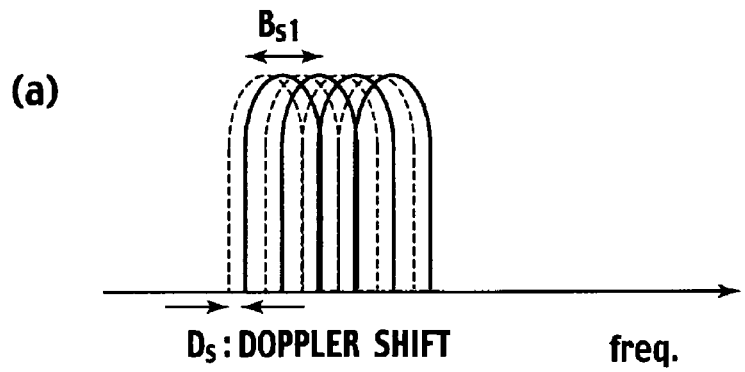
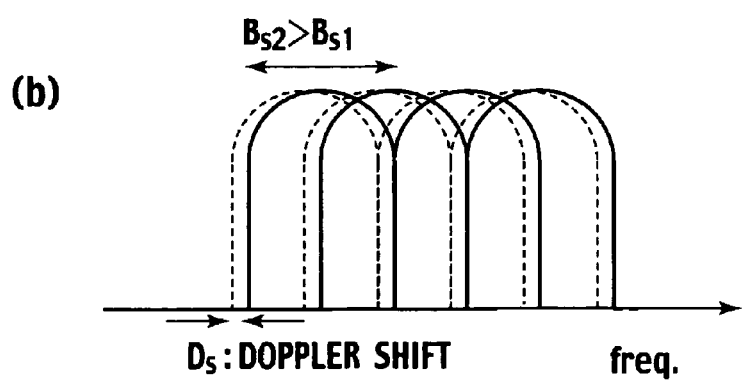

FIG.16
(a)
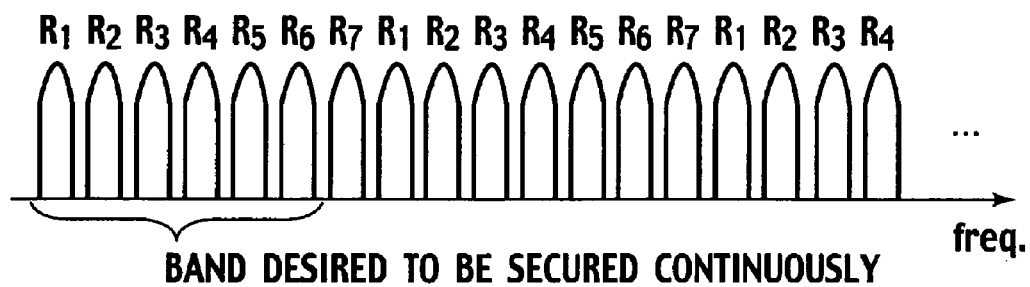
(b)
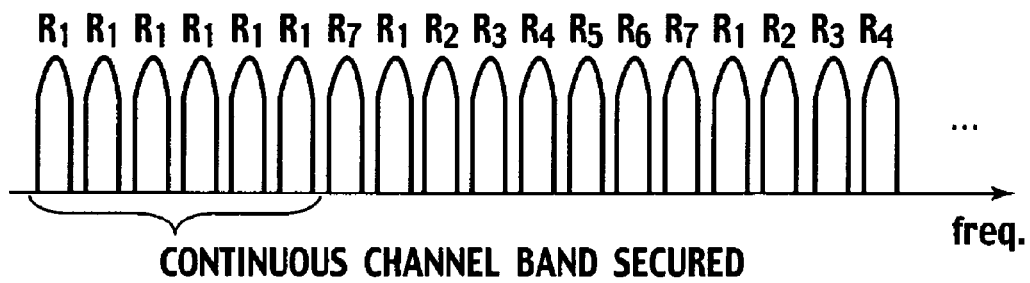
(c)
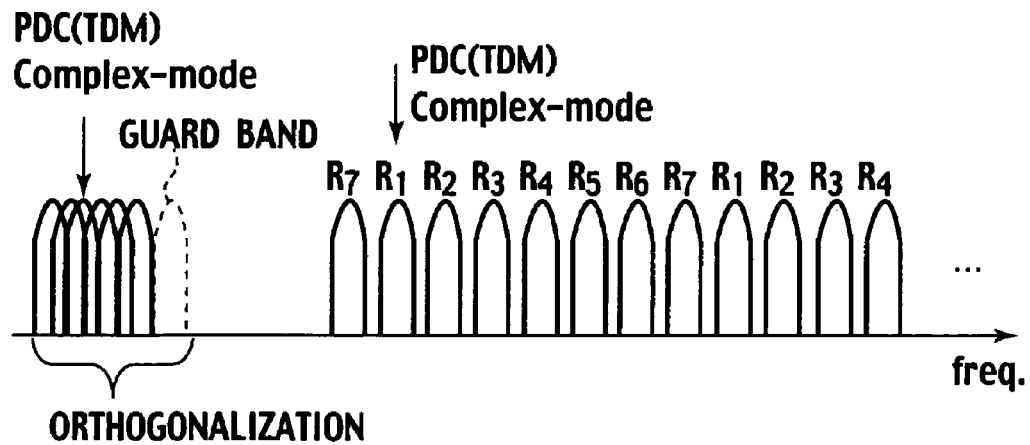

FIG.21
(a)
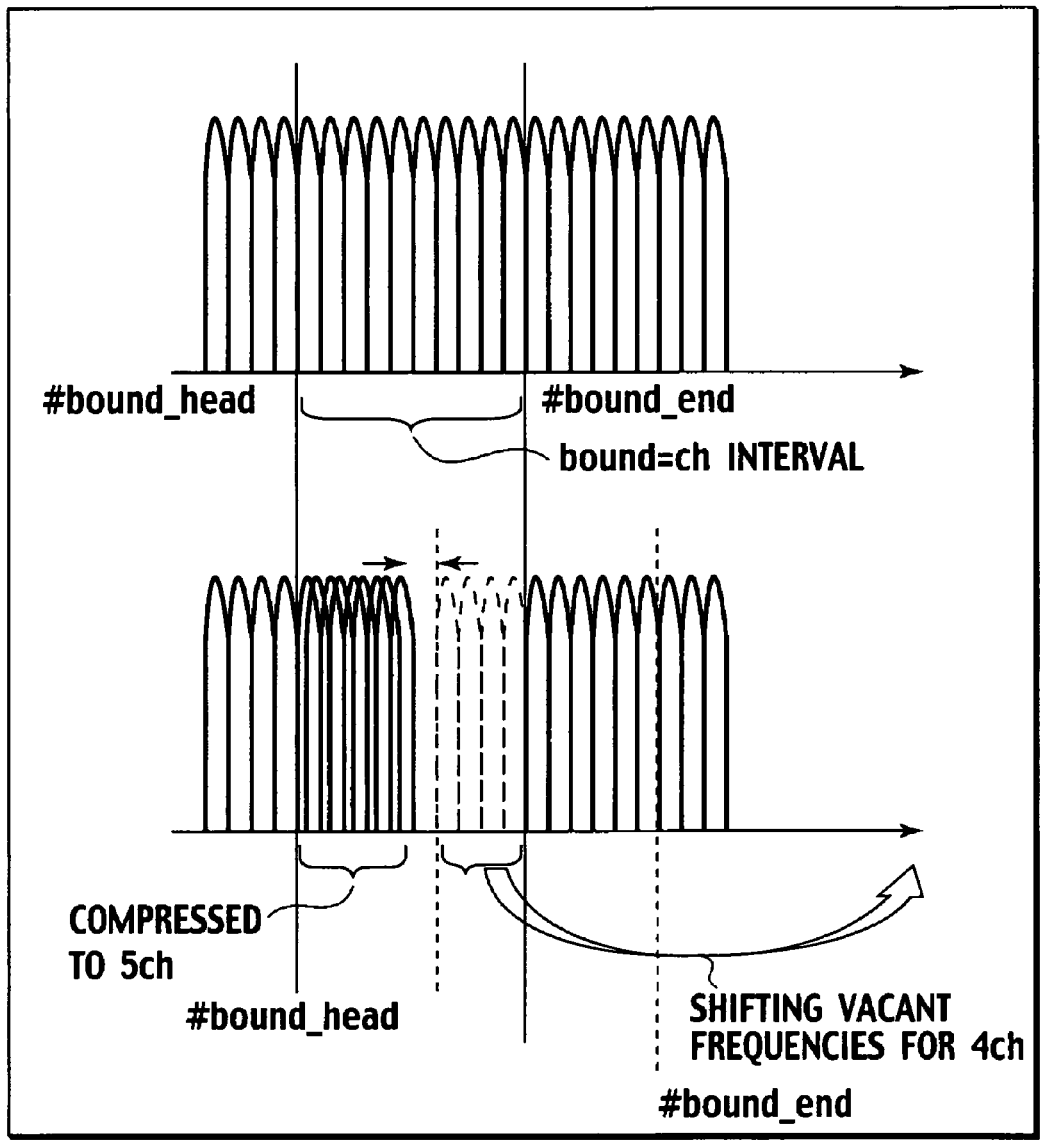
(b)
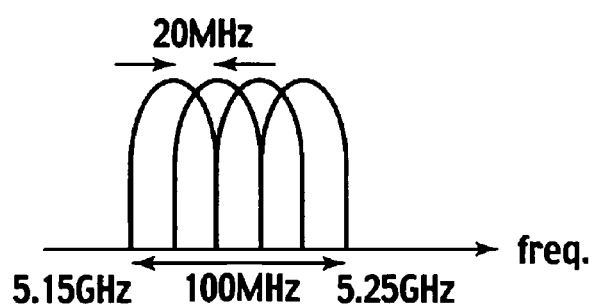

FIG.25
(a)
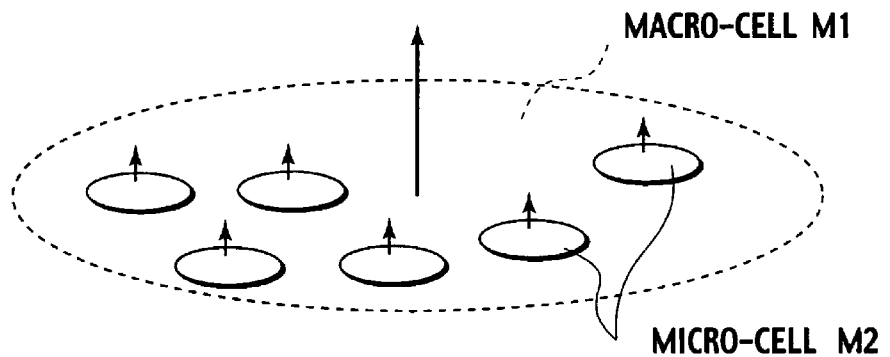
(b)
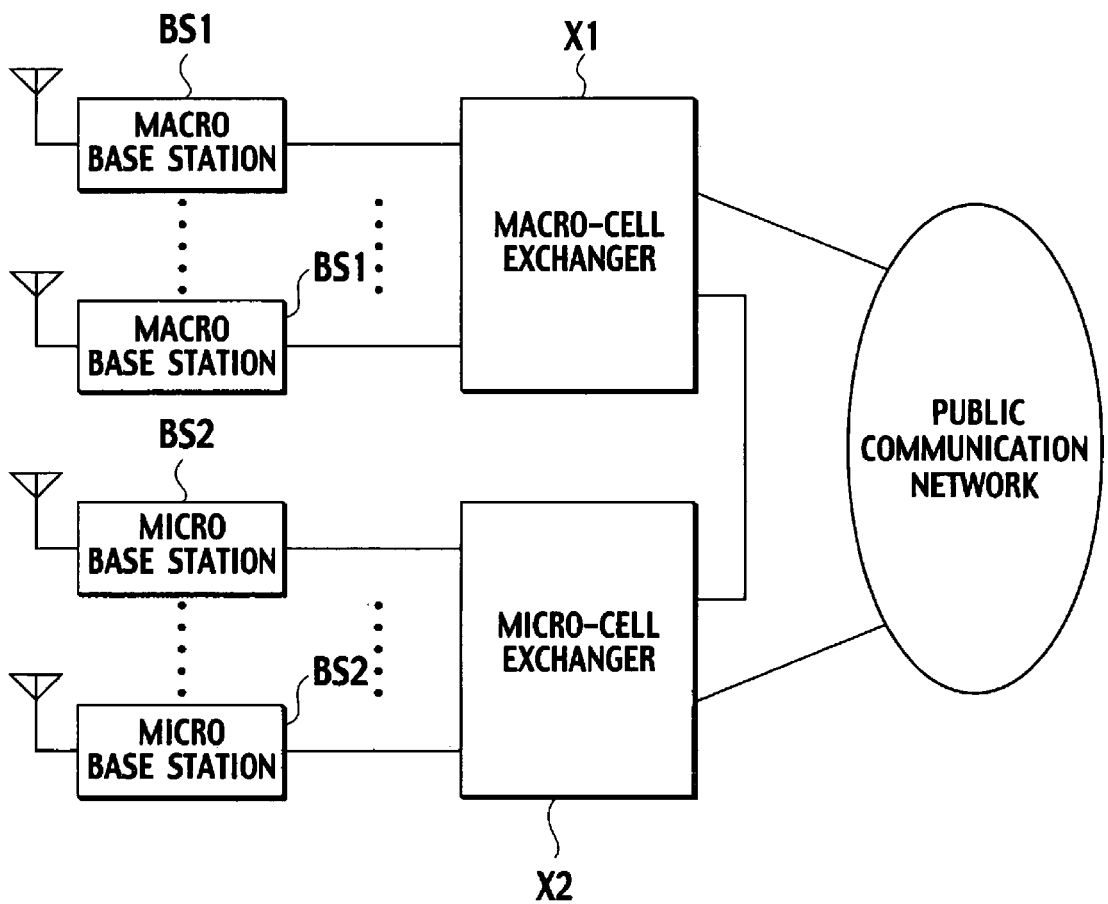

FIG.34
(a)
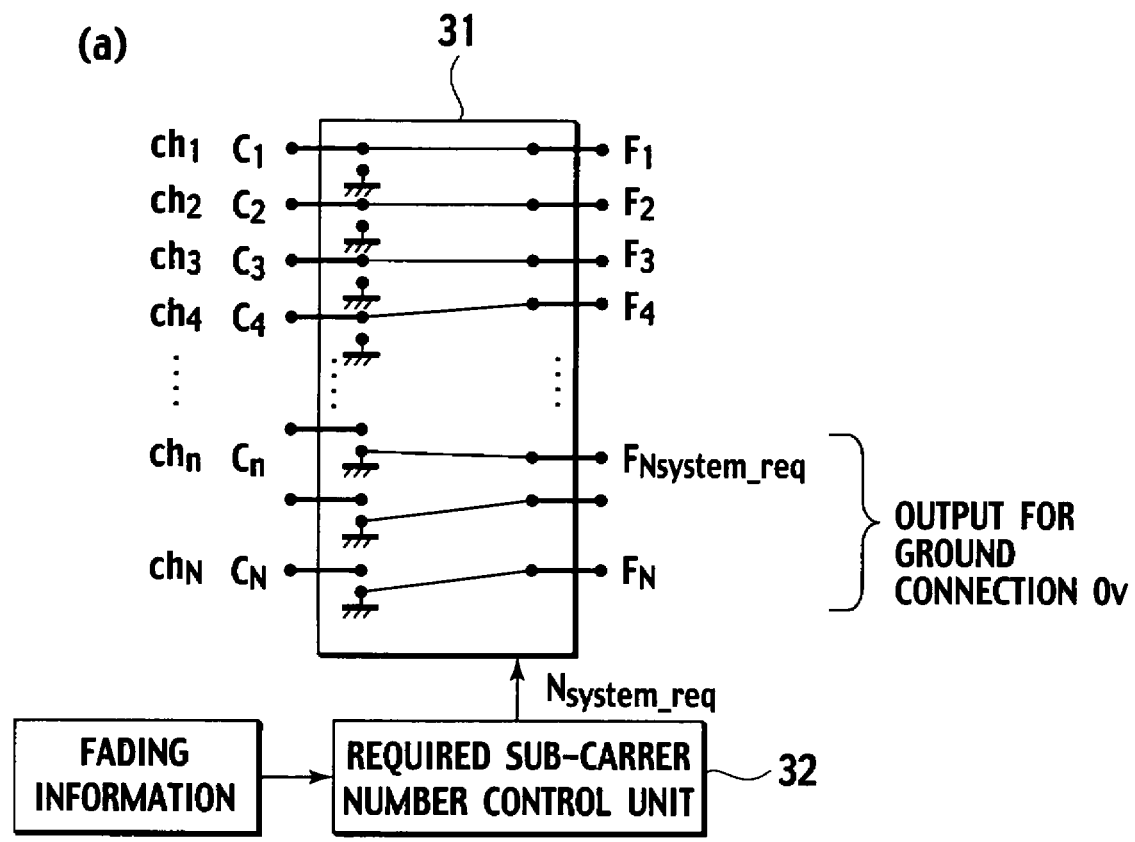
(b)
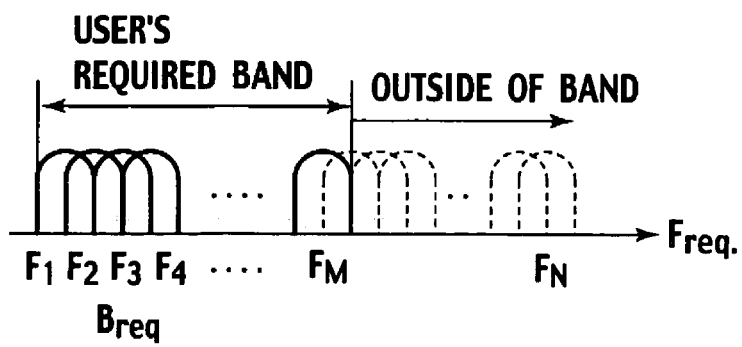

RADIO COMMUNICATION SYSTEM AND RADIO COMMUNICATION METHOD

TECHNICAL FIELD

The present invention related to a radio communication system and a radio communication method at a time when radio base stations and a plurality of mobile communication terminal stations carry out communications through multiplexed channels, which are used for digital transmission in an orthogonal frequency division multiplexing modulation scheme such as the OFDM scheme and the fourth generation scheme.

BACKGROUND ART (A) About the Digital Cellular System

In the conventional digital cellular systems (PDC: Personal Digital Cellular telecommunication system, PHS: Personal Handy-phone System, GSM: Global System for Mobile communications, for example), the radio base stations and a plurality of mobile communication terminal stations carry out communications through time division multiplexed (TDMA) radio channels. In these systems, each radio station is assigned with a fixed frequency channel such that no interferences with neighboring base stations occur, and a plurality of mobile communication terminal stations and the radio base stations can carry out communications without causing interferences, by using channels formed by the frequency channels as a plurality of time division multiplexed (TDMA) channels.

In such a conventional radio communication system, in a case where a covered area by each base station has a multi-cell configuration, a radio communication for connecting a radio base station and a mobile communication terminal station within each cell, for example, is carried out though a channel frequency channel assigned to each base station. Then, in the radio communication in the FDMA or TDMA cellular scheme, in order to avoid the neighboring cell interferences, the frequency channel arrangement is made such that the identical frequency channel will not be used at the neighboring cells. Such conventional frequency channel assignment methods includes the following.

(1) Fixed Frequency Channel Assignment

In the fixed frequency channel assignment (FCA: Fixed Channel Assignment), the radio frequency channel that can be selected is determined fixedly for each radio cell, and it is configured such that the reuse of the radio frequency channel is realized with an optimal distance interval. The arrangement is made by determining the frequency channel to be arranged to each cell in advance, so that this is called the fixed frequency channel assignment method.

(2) Dynamic Frequency Channel Assignment

There is a method for dynamically rearranging the frequency channel to be assigned and arranged to each cell according to a traffic of each cell, with respect to said fixed frequency channel arrangement. This is called the dynamic frequency channel assignment. In this method, at each radio cell, all the frequency channels used by the system can be selected. Namely, as long as a required quality is satisfied, it can be used for communication at any radio cell.

In the dynamic frequency channel assignment method, there are advantages that (a) the efficient utilization of frequencies according to coarse/dense of the traffic can be realized, and (b) compared with the fixed frequency channel arrangement, the design is easier as there is no need to make the radio frequency channel arrangement plan before the start of the system operation.

(B) About the Frequency Orthogonal Multiplexing Scheme (OFDM)

On the other hand, in recent years, the multi-carrier transmission scheme is attracting attentions as a measure against the frequency selective fading in the high speed transmission. In this multi-carrier transmission scheme, the transmission data are transmitted by being distributed to a plurality of carriers with different frequencies, so that the band of each carrier becomes a narrow band, and it is harder to receive an influence of the frequency selective fading when the number of sub-carriers is larger. In particular the orthogonal frequency division multiplexing (OFDM: Orthogonal Frequency Division Multiplexing) in which respective sub-carriers are orthogonalized has a high frequency utilization efficiency and it is used for the radio LAN and digital broadcasting.

In this scheme, the frequencies of respective carriers are set such that respective carriers are mutually orthogonalized within a symbol section. The spectra of the OFDM signals are continuously overlapping with each other, and a processing to take out the signal on a particular carrier by using a band pass filter as in the ordinary multi-carrier transmission is not carried out. Then, in the OFDM, the orthogonalization of respective carriers and the extraction of each sub-carrier signal are carried out by using an inverse discrete Fourier transform (IDFT: Inverse Discrete Fourier Transform) circuit and a discrete Fourier transform (DFT: Discrete Fourier Transform) circuit in general.

Then, in the reception in this OFDM scheme, the data symbol is correctly taken out by the demodulation from each extracted sub-carrier, so that unlike the multi-carrier transmission in which a plurality of sub-carriers are arranged on a frequency axis by providing guard bands and each sub-carrier is separated by a narrow band filter, the frequency intervals of respective sub-frequency channels can be narrowed by overlapping them and therefore the frequency utilization efficiency is good in the OFDM.

The power spectrum of the general frequency division multiplexing scheme is, as shown in FIG. 1, formed by the arrangement of the occupied bands which are bands necessary for transmitting signals of respective sub-carriers and guard bands for preventing interferences between respective sub-carriers. In other words, the entire band used in the entire system is (Occupied band of the frequency channel)×N+ (Guard band)×(N−1).

In the OFDM, the orthogonality between respective carriers is maintained and the overlap of respective modulated wave bands is made possible by setting the frequency interval of the sub-carrier to the interval of the first theorem of Nyquist. Namely, as shown in FIG. 2, the orthogonalized OFDM signal is such that the symbol can be taken out despite of the fact that the spectra of respective sub-carriers are overlapping, so that the frequency channel separation of the sub-carrier can be made narrow. In other words, the entire band used in the entire system is only (Occupied band of the frequency channel)×(N+1)/2.

In FIG. 3, a configuration of the conventional OFDM radio device using the inverse discrete Fourier transform circuit is shown. In FIG. 3, the data sequence to be transmitted is first applied with the baseband digital modulation by the symbol mapper 1. It is converted into a plurality of frequency channels of the identical symbol rate by the serial to parallel converter 2, and it is converted into a plurality of orthogonalized sub-carrier signals by carrying out the inverse Fourier transform by the inverse discrete Fourier transform circuit 4. The parallel output signals of the inverse Fourier transform circuit 4 are, the time series transmission signals are converted into the time series transmission signals by applying the serial to parallel conversion at the parallel to serial converter 5. They are converted into the RF frequency band used by the system at the radio transmitter 6, and after the power is amplified, they are transmitted through the transmission antenna 7.

Examples of the communication system in which the OFDM is introduced includes the radio LAN system using 5.2 GHz band, etc. In this system, 52 sets of the sub-carriers are used.

The OFDM has features such as the interferences between codes can be further reduced by setting the guard interval in the symbol section.

Also, usually, the sub-carrier is secured by the continuous band, In the OFDM transmission, the orthogonality between respective sub-carriers is very important, and if the orthogonality of frequencies is broken even slightly, the inter-carrier interference (ICI: Inter-Carrier Interference) occurs between sub-carriers, and it has a large influence on the signal transmission characteristics.

In the OFDM system used in the digital broadcasting, the orthogonality between respective sub-carriers is secured, and in the case of carrying out the plural station simultaneous transmission at the identical frequency channel, the sufficient synchronization is established between carries of the transmitter of each transmission site, and the sending of the broadcast signals is carried out such that the orthogonality can be secured sufficiently.

(C) About the Cellular System and the OFDM

As an example of applying the OFDM to the radio communication system, the radio communication system using the band division multiple access (BDMA: Band Division Multiple Access) scheme has been proposed, for example. The spectrum of the BDMA scheme is shown in FIG. 4. The BDMA scheme is a communication scheme which uses both the frequency division multiple access and the time division multiple access. In the BDMA scheme, the information transmission is carried out by applying the linear digital modulation such as QPSK to each sub-carrier. In this scheme, the entire transmission band is divided into a plurality of sub-bands, and they are assigned to different users in units of the divided sub-bands. Also, in Japanese Patent Application Laid Open No. H10-191431, it is proposed to increase or decrease the number of sub-carriers according to the transmission capacity required by the user in the multi-carrier transmission.

(D) About the CDMA Scheme

In the case of the CDMA, the arrangement of the identical frequency repeating cells is theoretically possible, but in the case where a plurality of micro-cells which communicate by using the identical frequency band exists within a macro-cell, the DSA (Dynamic Frequency arrangement: Dynamic Spectrum Allocation) is still necessary as a measure against the identical frequency channel interference within cell.

Now, in this CDMA scheme, there are cases of adopting the hierarchical cell structure such as that in which the micro-cells are located within the macro-cell, and in order to utilize frequencies efficiently in this hierarchical cell structure, there is a proposition for a method in which, in a system in which the identical frequency band is shared by systems with different transmission speeds for the micro-cell and the macro-cell, for example, when one of the frequency channels becomes unnecessary, a permission for use is given to one with the low priority level among the other one of the vacant frequency channel, and a partition which is a boundary between the frequency band of the micro-cell side and the frequency band of the macro-cell side is shifted (see Japanese Patent Application Laid Open No. H11-205848, for example).

However, in the conventional system such as the digital cellular scheme explained in the above described (A), there is a need to secure a plurality of frequency channels, and arrange them by providing a constant interval so as to avoid the interference of the identical frequency channels in the frequency channel assignment.

Consequently, it is utilized efficiently by assigning respective frequency channels to respective cells in the limited frequency band assigned to the system, but in the future the shortage of the number of frequency channels due to the increase of the data communication traffic is expected, and the radio communication system with the higher frequency utilization efficiency is demanded.

Also, in the OFDM explained in the above described (B), there is a need to secure the frequency channel band in which the sub-carriers satisfying the orthogonality condition are arranged continuously, as shown in FIG. 5. For this reason, the channel assignment is going to be regulated, and in the case of the shortage of the frequency channels, it is considered that it becomes difficult to deal with it flexibly.

On the other hand, in the digital broadcasting and the radio communication explained in the above described (C), a plurality of delayed waves with large time delays arrive due to the multi-path propagation, so that in the high speed transmission of information, the transmission speed required for the radio communication largely changes according to the user and the application, as from speech, electronic mails, still images, video image transfer, etc. Consequently, in the case of carrying out the information transmission by the bands that are divided and determined in advance as in the conventional radio communication system, the division loss becomes large, and there is a problem regarding the efficient utilization of frequencies.

In addition, in the CDMA scheme explained in the above described (D), even in the method for realizing the efficient utilization of frequency channels by shifting the partition, the total sum of the number of channels that can be secured in the system band is constant for the macro-cell and the micro-cell, and it is possible to consider the cases where the shortage of channels on one side cannot be compensated by channels of the other side by simply shifting the partition.

(Description of the Frequency Orthogonalized Multiplexing Scheme (OFDM))

Conventionally, the the multi-carrier transmission scheme has been proposed as a measure against the frequency selective fading in the high speed digital transmission. In this multi-carrier transmission scheme, the transmission information data is sent by being distributed to a plurality of sub-carriers with different frequencies, so that the band of each carrier can be a narrow band, and there is a characteristic that when the bands of these sub-carriers are narrower, it is harder to receive an influence of the waveform distortion due to the frequency selective fading.

In such a multi-carrier transmission scheme, particularly in the orthogonal frequency division multiplexing (OFDM: Orthogonal Frequency Division Multiplexing) in which respective sub-carriers are orthogonalized, unlike the conventional multi-carrier transmission in which a plurality of sub-carriers are arranged on the frequency axis by providing guard bands and each sub-carrier is separated by a narrow band filter, the frequency utilization efficiency can be made higher by narrowing the frequency intervals of respective sub-frequency channels by overlapping them, and it is used for the radio LAN and the digital broadcasting.

In this scheme, the frequency intervals of respective sub-carriers are set such that respective sub-carriers become orthogonal to each other within the symbol section. Then, in the OFDM, in practice, the orthogonalization of respective sub-carriers and the extraction of each sub-carrier signal are carried out by the digital signal processing, using the inverse discrete Fourier transform (IDFT: Inverse Discrete Fourier Transform) circuit and a discrete Fourier transform (DFT: Discrete Fourier Transform) circuit.

(Description of the OFDM Function Block)

FIG. 3 is a block diagram showing a structure of a conventional OFDM radio device equipped with an inverse discrete Fourier transform circuit.

As shown in FIG. 3, the conventional OFDM radio device has a symbol mapper 1 for applying the baseband digital modulation with respect to the information data sequence of the user, a serial to parallel converter 2 for converting the output signal of the symbol mapper 1 into a plurality of channels with the identical symbol rate, an inverse discrete Fourier transform circuit 4 for applying the inverse Fourier transform with respect to the parallel output signal sequences which are output signals of the serial to parallel converter 2 and converting them into a plurality of orthogonalized sub-carrier signals, a parallel to serial converter 5 for converting the output signals of the inverse discrete Fourier transform circuit 4 into a time series signal, and a radio transmitter 6 for converting it into an RF frequency band used by the system and amplifying the power.

In such a conventional OFDM radio device, assuming that the information data sequence to be transmitted is a, the digital modulation such as QPSK, QAM, for example is carried out by the symbol mapper 1 first. By this digital modulation, the information bit sequence is converted into a complex symbol sequence $S_x$ ($S_0$, $S_1$, $S_2$, $S_3$). Next, it is distributed to a plurality (N sets) of sub-carrier channels ($F_1$, $F_2$, ... $F_N$) by the serial to parallel converter 2. Then, the inverse Fourier transform is carried out by the inverse discrete Fourier transform circuit 4, and they are converted into time series sample values (sample values of OFDM symbols) in which a plurality of orthogonalized sub-carrier frequency channel signals are superposed. The sample values of the OFDM symbols are serial to parallel converted by the parallel to serial converter 5, and converted into the continuous time series transmission signal, and after it is frequency converted into the RF frequency band used by the system at the radio transmitter 6, the power is amplified, and it is transmitted from the transmission antenna 7.

(Transmission Band Variable of the OFDM)

In the ordinary OFDM transmission device, the system clock frequency is fixed, so that the bandwidth is constant. For example, Japanese Patent Application Laid Open No. H11-215093 proposes a configuration for easily carrying out variable of the band frequency of the sub-carrier, and an addition of a function for automatically following variable of the band of the sub-carrier at a receiving side, in the transmission of the OFDM signals.

Describing it in detail, as shown in FIG. 6, in the OFDM transmission device disclosed in Japanese Patent Application Laid Open No. H11-215093, at the transmitting side, a clock output terminal of a clock oscillator 101B is connected to a clock rate conversion unit 101A, and a clock output terminal of the clock rate conversion unit 101A is connected to respective clock terminals of a rate conversion unit 101, an encoding unit 102T, an IFFT unit 103A, a guard attaching unit 103B, a synchronization symbol insertion unit 105, and an orthogonal modulation processing unit 108. At the receiving side, an output VC of a synchronization detector 109A is connected to a terminal VC of a clock oscillator 109B, and an output FSTr of the synchronization detector 109A is connected to FST terminals of an FFT unit 103C and a rate inverse conversion unit 107. Also, an output CKr of the clock oscillator 109B is connected to clock CK terminals of the FFT unit 103C, the rate inversion conversion unit 107, an orthogonal demodulation processing unit 109, and the synchronization detector 109A.

Then, in such an OFDM transmission device disclosed in Japanese Patent Application Laid Open No. H11-215093, the clock rate conversion unit for uniformly changing the operation timing of the transmission unit and the period of the clock that determines the clock rate is provided, and a function for controlling the reproduction clock rate according to the detected frame information period is added to the receiving side, and the frequency channel that can be used and the bandwidth that can be used are determined by checking the radio wave using state (how vacant the channels are).

Also, in Japanese Patent Application Laid Open No. 2000-303849, the flexibility and the adaptability of the OFDM system are given by making it possible to carry out the increasing/decreasing adjustment (scaling) for the operation parameters or characteristics of the system such as the symbol length of the OFDM, the number of carriers, or the number of bits per symbol of each carrier, for example, by the external setting or the decoded date.

The scaling control circuit of that OFDM system provides the compatibility or the desired performance by dynamically changing the operation parameters or characteristics according to the case of judging necessary or effective.

Also, in Japanese Patent Application Laid Open No. 2000-303849, the scaling of the OFDM parameter is carried out by the external setting or the decoded data. The scaling uses information such as a received signal strength, a ratio of the noise plus interference with respect to the received signal, a detected error, a notice, etc.

The influence of the multi-path in the case of adding the guard band is shown in FIG. 7. The advantage of providing the guard interval to the multiplexed carrier transmission is that it becomes possible to reduce or remove the inter-symbol interference (inter-code interference) doe to a signal dispersion (or a delay spread) in the transmission channel, as an interval as a guard time Tg is inserted while transmitting a next symbol and there is no need for a waveform equalizer that is necessary in the single carrier system.

The delayed copy for each symbol that arrives to a receiver after the intended signal can disappear before the next symbol is received, by the existence of the guard time. As such, the advantage of the OFDM lies in the function for overcoming the adverse influence of the multiplexed channel transmission without requiring the equalization.

In Japanese Patent Application Laid Open No. H11-215093 described above, the frequency that can be used and the bandwidth that can be used are determined by checking the radio wave using state (how vacant the channels are). However, in the actual mobile communications, the radio wave propagation path varies in time and its property changes largely. In the mobile communication propagation path, the following point becomes problematic by the delayed waves due to the time variation of the propagation path and the multi-path propagation, and there is a problem that the signal transmission characteristics are degraded.

By using FIG. 8, the relationship between the sub-carrier occupied bandwidth and the time variation of the fading will be described. Note that, the influence of the Doppler shift will be described as an example of the time variation of the fading.

In the mobile communication, the amount of the Doppler shift is determined by the moving speed of the mobile station itself, the moving speed of an object which reflected arriving radio waves, etc. In general, when the mobile station runs through the multiplexed wave propagation path, the received waves change randomly depending on the wavelength λ of the transmission waves and the moving speed V of the mobile station. Each element wave is Doppler shifted as much as $V/\lambda=f_D$ at maximum, and the spectrum spreading appears.

Here, assuming that the occupied frequency bandwidth of the narrow band sub-carrier (FIG. 8(*a*)) is $B_1$, the occupied bandwidth of the wide band sub-carrier (FIG. 8(*b*)) is $B_2$, and the maximum Doppler shift amount is $D_S$, in the OFDM transmission in general, when the relative value of the Doppler shift amount $D_S$ with respect to the sub-carrier occupied bandwidth B becomes larger, the orthogonality between sub-carriers is deteriorated, and the signal transmission characteristics are degraded due to the inter-channel interference (ICI: Inter-Channel Interference). Namely, compared with the case where the occupied bandwidth of the sub-carrier is narrow ($B_1$) as shown in FIG. 8(*a*), a rate ($D_S/B_W$) of the Doppler shift with respect to the sub-carrier band is sufficiently small in the case where the occupied bandwidth is wide ($B_2$), so that the degradation of the transmission characteristics due to the Doppler shift is less.

However, when the band of the sub-carrier is wide, it becomes easier to receive the influence of the frequency selective fading due to the multi-path propagation. The frequency characteristics of the radio wave propagation path are affected largely by the propagation delay time, and when the maximum delay time $\tau_{max}$ is large, the frequency characteristicd at the propagation path is distorted largely.

In contrast, as shown in FIG. 9, in the case where the occupied bandwidth of the sub-carrier is narrow as $B_1$, it can be regarded as the uniform fading in each sub-carrier, and only the received signal levels of a part of the sub-carriers are lowered, so that it can be recovered to some extent by the gain adjustment by an AGC (Automatic Gain Control) circuit.

However, in the case where the occupied bandwidth of the sub-carrier is wide as $B_2$, the received signal levels of a part of the occupied band drop frequency selectively due to the frequency selective fading, so that there has been a problem that the waveform distortion occurs and the signal transmission characteristics are considerably degraded.

Consequently, even in the case of carrying out the transmission with the identical information bit rate, the optimum sub-carrier bandwidth and the number of sub-carriers are different due to the time variation of the fading and the maximum delay amount. Also, in the case where the maximum tolerable bandwidth assigned to each user is constant, when each sub-carrier occupied band is widened, as shown in FIG. 10, there arise channels which deviate from the maximum tolerable bandwidth.

On the other hand, in the Japanese Patent Application Laid Open No. 2000-303849 described above, the scaling is carried out dynamically by the external setting or the decoded data. In other words, in order to avoid the frequency selective fading or the like in which the location factor is dominant, there has been a problem that there is a need to carry out the scaling by making some setting at each time of moving.

In addition, in the VSF-OFCDM scheme (Variable Spreading Factor-Orthogonal Frequency and Code Division Multiplexing) which is the so called fourth generation communication scheme, the information symbol is divided on a plurality of frequency axes, and the information symbol is transmitted by spreading it by the spread code of the variable spreading rate assigned to each mobile station, so that the symbol rate will be different from the other conventional transmission schemes so that the interferences between different transmission scheme occur in a region where the other transmission schemes coexist, and it is expected that the identical frequency band cannot be shared.

DISCLOSURE OF THE INVENTION

An object of the present invention is to provide a radio communication system and a radio communication method capable of utilizing the frequency band efficiently, in the case where the frequency bands respectively utilized in a wide band system of the OFDM scheme and a narrow band system coexist.

Another object of the present invention is to provide a radio communication system and a radio communication method capable of utilizing the frequency channels within the band efficiently, at a time of carrying out communications between radio stations through the frequency channel assigned to each of a plurality of areas of the digital cellular system, the frequency orthogonalized multiplexing scheme system, CDMA scheme, etc.

Another object of the present invention is to provide a radio communication system and a radio communication method capable of realizing the improvement of the transmission characteristics, by controlling the sub-carrier bandwidth and the number of sub-carriers, by calculating the optimum sub-carrier occupied band according to the fading (radio wave propagation path) information.

The present invention provides a radio communication system for carrying out communications between radio stations by modulating a plurality of signal sequences to be transmitted and received into at least one frequency channel assigned to each of a plurality of cells, a radio communication system characterized by having a channel mapping means for rearranging for each cell a plurality of frequency channels assigned with respect to each cell, and newly assigning particular frequency channels as a transmission and reception band of said signal sequences, and a bandwidth control means for controlling a bandwidth of said assigned frequency channel according to a propagation state of said assigned frequency channel.

Also, the present invention provides a radio communication method for carrying out communications between radio stations by modulating a plurality of signal sequences to be transmitted and received into at least one frequency channel assigned to each of a plurality of cells, a radio communication method characterized by having a step for rearranging for each cell a plurality of frequency channels assigned with respect to each cell, and newly assigning particular frequency channels as a transmission and reception band of said signal sequences, and a step for controlling a bandwidth of said assigned frequency channel according to a propagation state of said assigned frequency channel.

Moreover, in the present invention, at a time of carrying out communications between radio stations through the frequency channel assigned to each of a plurality of areas, rearrangement of assignment of said frequency channels is carried out, and particular continuous frequency channels of a system band are assigned for each of said areas, and the frequency channels rearranged by the channel mapping circuit are orthogonally multiplexed. Note that the rearrangement of channels in the above described invention can be carried out with respect to parallel output signal sequences of an identical symbol rate, or parallel transmission baseband signal sequences corresponding to a plurality of users.

According to such a present invention, the efficient utilization of the system band can be realized by rearranging the frequency channels assigned with respect to each cell (base station) into continuous frequency channels for each cell (base station), and compressing this into a narrow band by orthogonal multiplexing. Namely, by rearranging the frequency channels into a continuous system band, it becomes possible to omit the overhead due to the fact that the frequency channels are discontinuous such as the guard interval, and it becomes possible to realize the efficient utilization of the resources. Also, by using the parallel output signal sequences of the identical symbol rate and the baseband signal sequences as the target of the rearrangement, the compressibility can be raised, and it becomes possible to utilize the resources more efficiently.

In the above described invention, it is preferable to acquire a search table indicating a using state of frequency channels used in nearby areas and carry out a search of a vacant channel, and rearrange the frequency channels according to this search result and assign continuous channels with respect to identical cell. In this case, it becomes possible to integrally manage the frequency channels used in a plurality of cells, the detection of the unused frequency channel becomes easier, and the speed up of the processing can be realized. Note that this search table may be managed by the base station control device, for example, or the sharing of information can be realized by carrying out transmission and reception of data between the radio devices and establishing the synchronization.

It is preferable to carry out the rearrangement of the frequency channels in the present invention, by searching whether or not a vacant frequency channel exists within a band to be continuously secured with respect to an arbitrary base station, according to the search table, and (a) in the case where the vacant frequency channel exists within this band to be continuously secured, changing the assignment to this base station, and (b) in the case where the vacant frequency channel does not exist within this band to be continuously secured, counting the vacant frequency channels outside this band to be continuously secured, and when more than or equal to a prescribed number of the vacant frequency channels are secured, holding the information regarding these vacant frequency channels in a vacancy memory table, and changing the frequency channels of another base station used within the band to be continuously secured to the frequency channels held in the vacancy memory table, and (c) repeating the processing of (a) and (b).

In this case, it is possible to make the assignment to an arbitrary cell (base station) according to the distribution of the used/unused frequency channels, by using the search table.

Note that, in the present invention, unused frequency channels are generated by repeating rearrangement of channels and the orthogonal multiplexing, and new channels are assigned to generated unused frequency channels. In this case, it is possible to realize the diversity of the frequency channel assignment, such as assigning a channel of an arbitrary cell (base station) with respect to the frequency channel which has newly become an unused state by the compression.

In the present invention, in the case where this radio communication system has a hierarchical cell structure formed by a macro-cell and micro-cells contained in this macro-cell, and these macro-cell and micro-cells use an identical frequency band, it is preferable to shift a partition which is a boundary between a frequency channel band of the macro-cell and a frequency channel band of the micro-cells, and then concentrate vacant channels before and after the partition by carrying out rearrangement of the frequency channels by searching vacant channels, using a shifted partition as a reference. In this case, it is preferable to carry out the shifting of the partition by giving a priority level for each frequency channel according to a traffic state in the macro-cell and micro-cells, and rearranging the frequency channels according to this priority level. In this case, even in the system which forms the hierarchical cell structure, it becomes possible to properly arrange and compress unused channels while carrying out the adjustment of the frequency band, between the upper level hierarchy and the lower level hierarchy, by appropriately shifting the partition.

Note that, in the present invention, a transmission scheme used by this radio communication system is preferably a scheme for spreading the information symbol in a plurality of time regions or frequency regions, according to a spread code assigned to a terminal of a receiving side, and making a rate of the spread code with respect to the information symbol rate variable.

In this case, the wide band system of the OFDM scheme and the narrow band system can coexist in the identical frequency band, so that the new generation communication scheme can coexist by using two schemes in the same frequency band, and in the case of changing the communication scheme, it is possible to make a smooth transition by stages from the previous scheme to the new scheme.

Moreover, the present invention is such that, in a signal transmission method for converting information data sequences into a plurality of channels, and transmitting and receiving a signal sequence of each of these plurality of channels by a plurality of orthogonalized sub-carrier signals, a propagation route of the sub-carrier signals is estimated, and a bandwidth of the sub-carrier signals to be transmitted and received, according to this estimated fading information. According to such a present invention, the bandwidth of the sub-carriers is controlled according to the state of the propagation route, so that it becomes possible to efficiently utilize the maximum tolerable bandwidth according to the communication environment, and it is possible to realize the improvement of the communication quality and the transmission characteristics.

In the present invention, it is preferable to calculate a required number of sub-carriers that can be assigned to a user, according to the controlled sub-carrier bandwidth, and branch a number of the plurality of sub-carriers to be transmitted and received into the required number of sub-carriers. In this case, it is possible to use the appropriate number of sub-carriers according to the propagation environment and the number of users.

In the present invention, it is preferable to generate a fading time variation information and a delay distortion information in a radio wave propagation path, according to a waveform of received signals, and estimate the propagation route according to these information. In this case, the fading can be estimated by utilizing the radio waves received at the receiving side, so that it is possible to carry out the control of the sub-carrier bandwidth at higher precision.

In the present invention, it is preferable to transmit the estimated fading information by multiplexing it with a user data information, and separate the fading information from a received data matrix. In this case, by transmitting the fading information acquired at the receiving side to the correspondent, it is possible to share the information regarding the propagation environment at both sides of the transmitting side and the receiving side.

In the present invention, at the transmitting side, it is preferable to have a step for detecting a sub-carrier bandwidth information according to the fading information and calculating a clock frequency from the detected sub-carrier bandwidth information, a step for converting a generated frequency into the calculated clock frequency and carrying out serial to parallel conversion at the clock frequency according to this sub-carrier frequency, and a step for selecting a desired channel from a single or plurality of sub-carrier channels after an inverse discrete Fourier transform. In this case, the it is possible to set the signal speed according to the fading so that it is possible to carry out the transmission of signals efficiently.

In the present invention, it is preferable to have a function for calculating a total bandwidth to be assigned to this user from a required information bit transmission speed of the user, and calculating the required number of sub-carriers from the total bandwidth and the sub-carrier bandwidth information. In this case, the required number of sub-carriers with respect to the total bandwidth is calculated by accounting for the actual communication power of the user, so that it is possible to distribute the resources in well balanced manner according to the utilization state of the resources of the entire system, and it is possible to realize the dispersion of loads.

In the present invention, it is preferable to make a setting regarding an optimum sub-carrier bandwidth, a required number of sub-carriers, and a guard interval according to the fading information, at a time of communication start. In this case, it is possible to set the guard interval according to the sub-carrier bandwidth and the number of sub-carriers that are set according to the state of the propagation route, so that it is possible to realize the appropriate interference prevention.

Note that this setting of the guard interval length can be made periodically at a prescribed time interval determined in advance, or in a case where an optimum sub-carrier bandwidth, a required number of sub-carriers, a guard interval, or a signal error rate becomes less than or equal to a certain reference, besides at a time of the communication start.

In the present invention, a transmission scheme used by this radio communication system is preferably a scheme for spreading the information symbol in a plurality of time regions or frequency regions, according to a spread code assigned to a terminal of a receiving side, and making a rate of the spread code with respect to the information symbol rate variable.

In this case, the information symbol can be transmitted by dividing the information symbol on a plurality of frequency axes according to the propagation route (fading) state, and spreading it by the spread code of the variable spreading rate assigned to each reception device, so that it is possible to multiplex the signals of a plurality of users with the signals of the identical time in the identical frequency band according to the propagation route of each reception device, and it is possible to prevent the interferences between the users while realizing the efficient utilization of the resources. As a result, the wide band system of the OFDM scheme and the narrow band system can coexist in the identical frequency band, so that the new generation communication scheme can coexist by using two schemes in the same frequency band, and in the case of changing the communication scheme, it is possible to make a smooth transition by stages from the previous scheme to the new scheme.

BRIEF DESCRIPTION OF THE DRAWINGS

FIG. 7 is a figure showing an influence of the multi-path in the case of attaching a guard band in a conventional transmission scheme.

FIG. 8 is a figure showing an influence of the Doppler shift in a conventional case.

FIG. 16 is a figure showing a rearrangement of frequency channels according to the first embodiment.

FIG. 21 is a figure showing rearranged frequency channels in the first embodiment.

FIG. 25 is a figure showing an overall configuration of a system according to the fifth embodiment typically.

FIG. 34 is a figure showing an operation of a sub-carrier frequency channel assignment in which a transmission band is variable, in a channel mapping according to the tenth embodiment.

BEST MODE FOR CARRYING OUT THE INVENTION

In the following, the embodiments of the present invention will be described by using the drawings.

Figure 1:
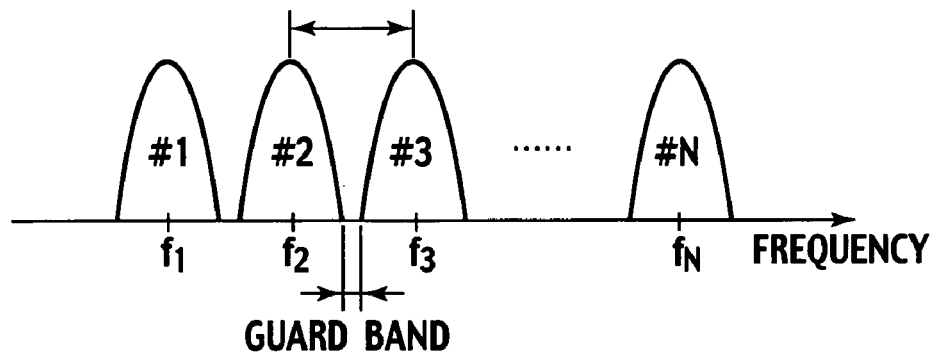
FIG. 1 is a figure showing a power spectrum of a conventional general frequency division multiplexing scheme.
Figure 2:
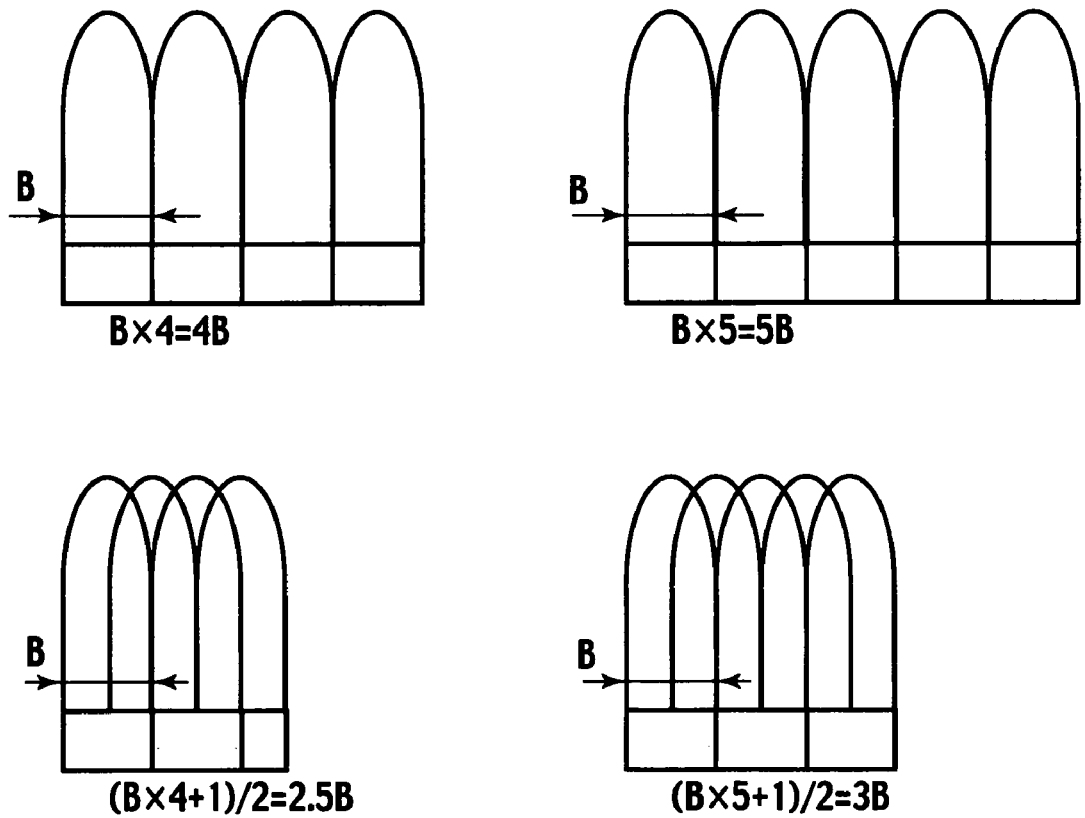
FIG. 2 is a figure showing a frequency interval of the sub-carriers in a conventional OFDM scheme.
Figure 3:
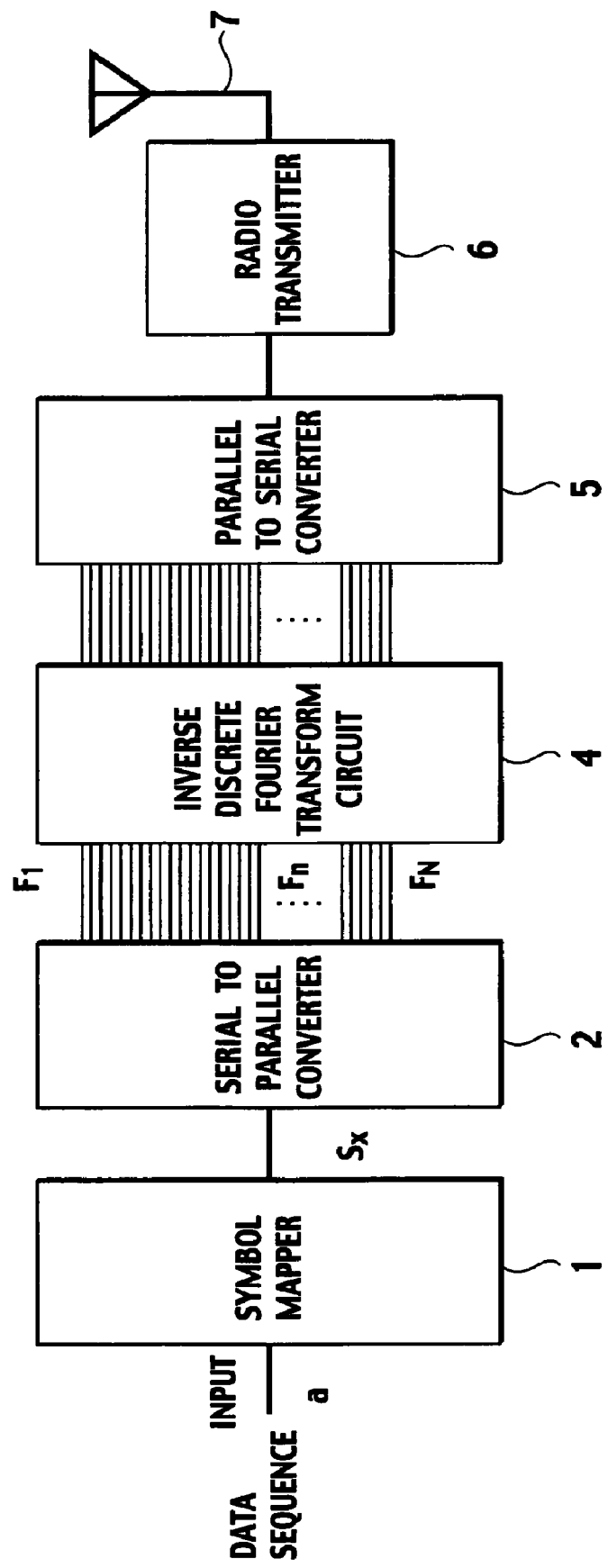
FIG. 3 is a block diagram showing a configuration of a conventional OFDM radio device using an inverse discrete Fourier transform circuit.
Figure 4:
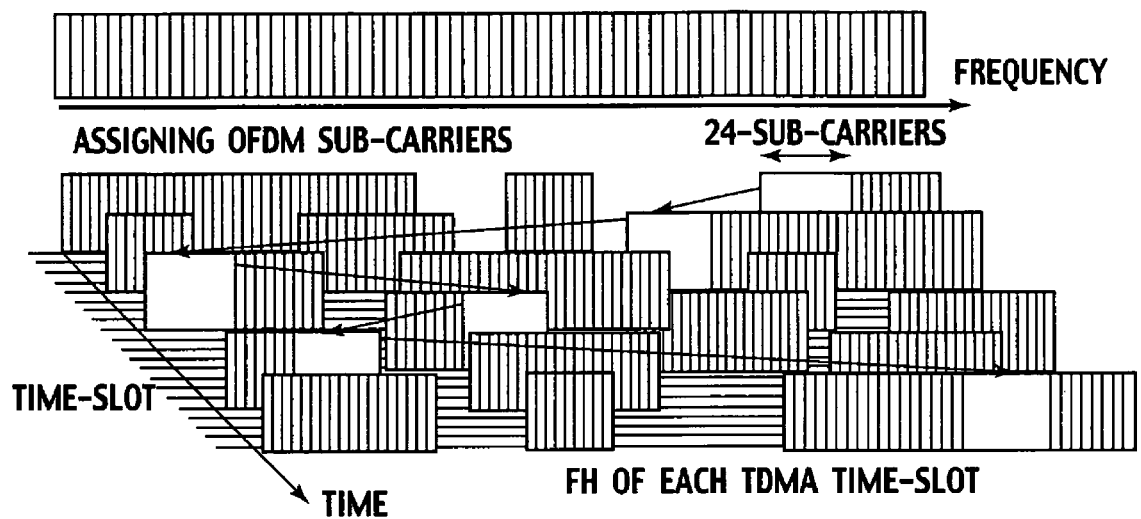
FIG. 4 is a figure showing a spectrum of a conventional BDMA scheme.
Figure 5:
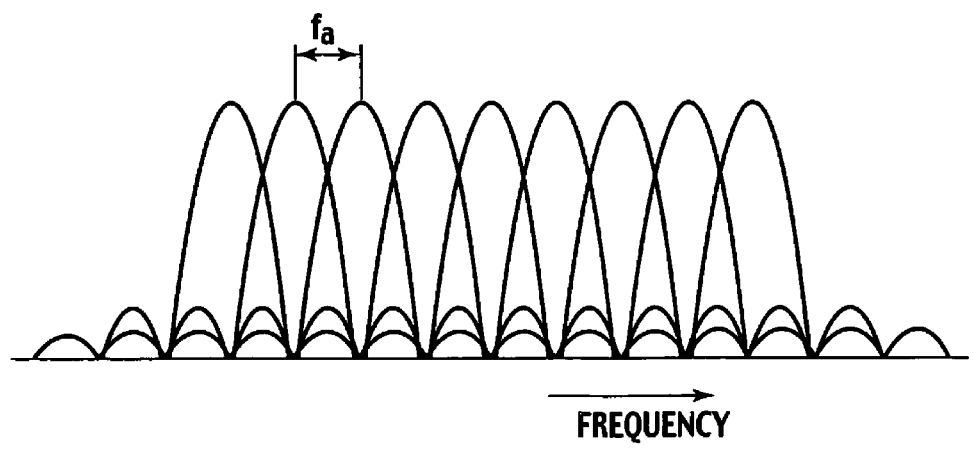
FIG. 5 is a figure of a frequency channel band in a conventional OFDM.
Figure 6:
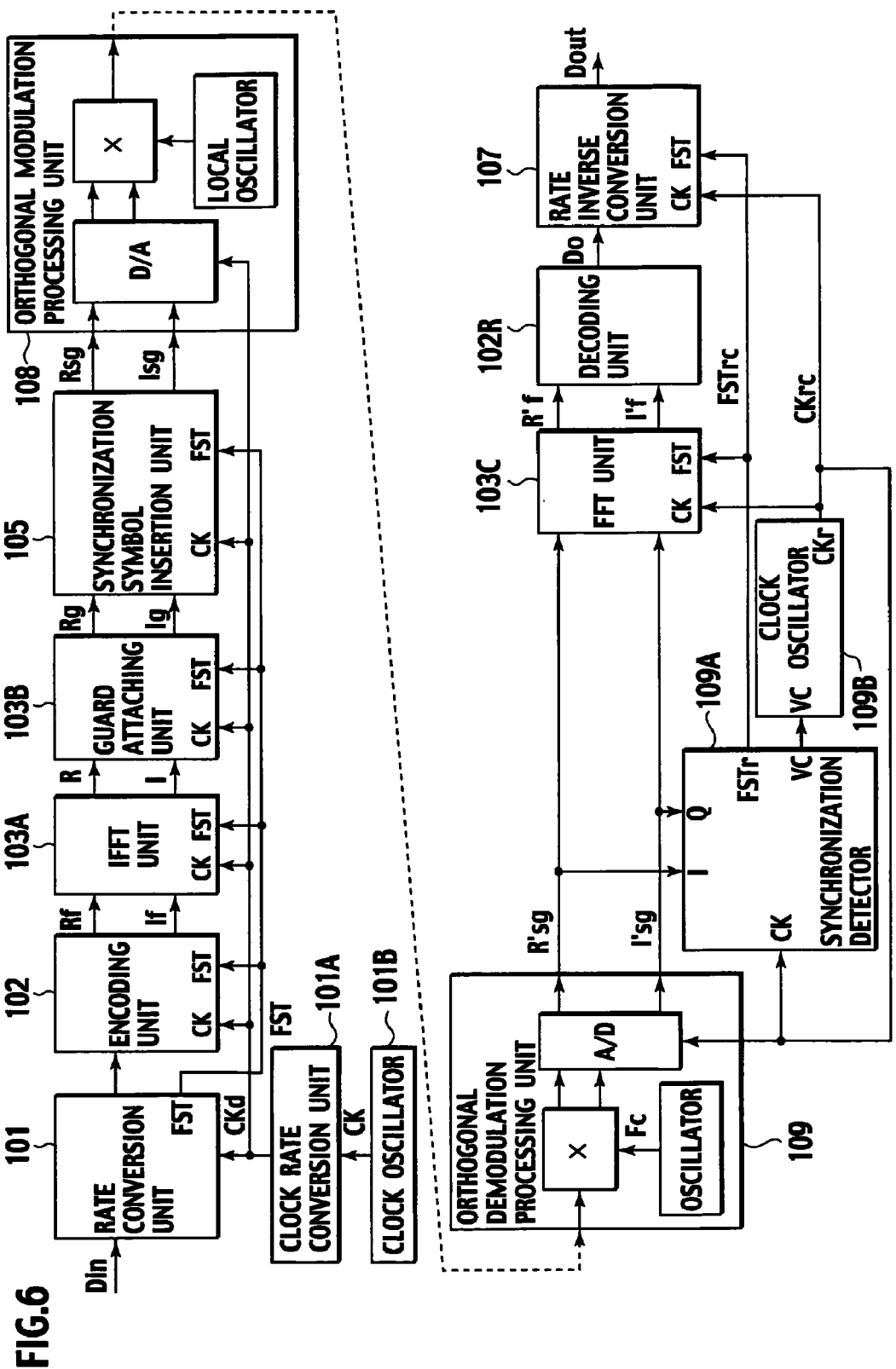
FIG. 6 is a block diagram showing a structure of a conventional transmission device.
Figure 9:
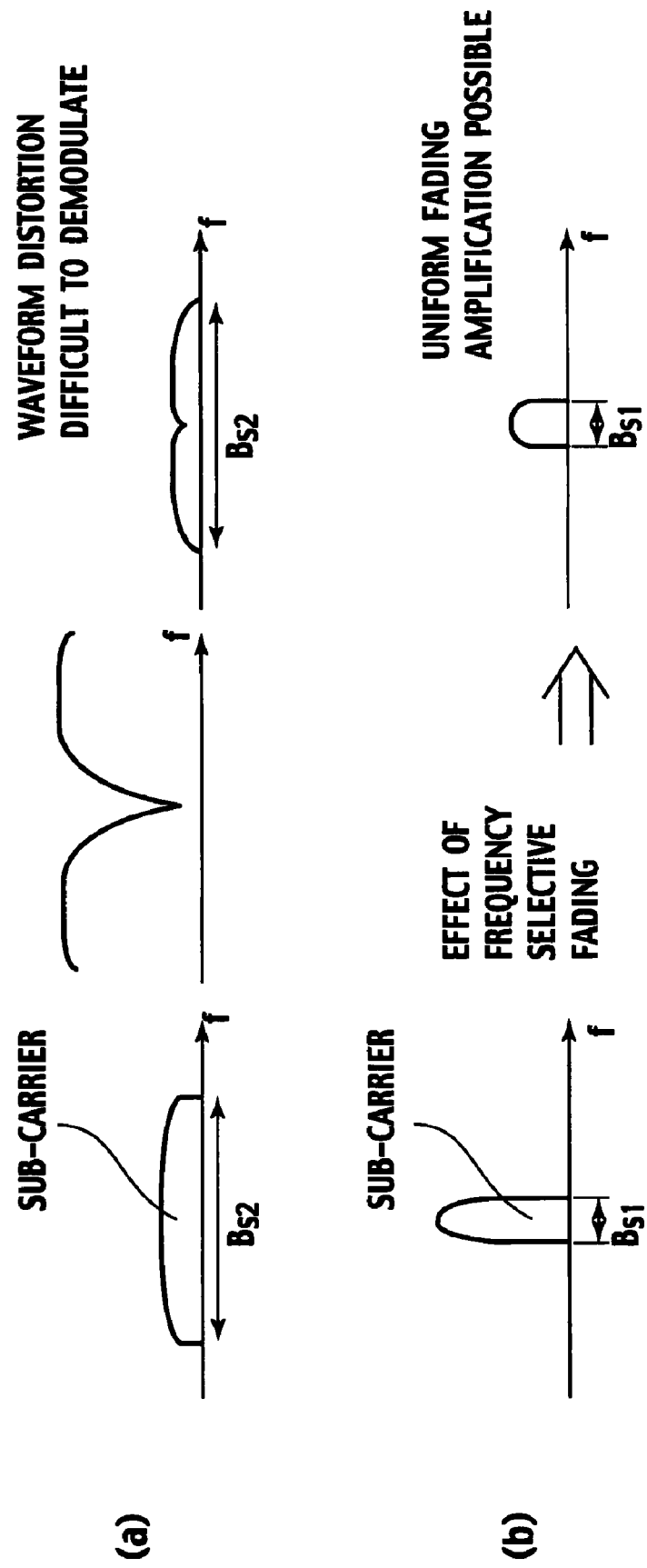
FIG. 9 is a figure showing an influence due to a frequency selective fading in a conventional case.
Figure 10:
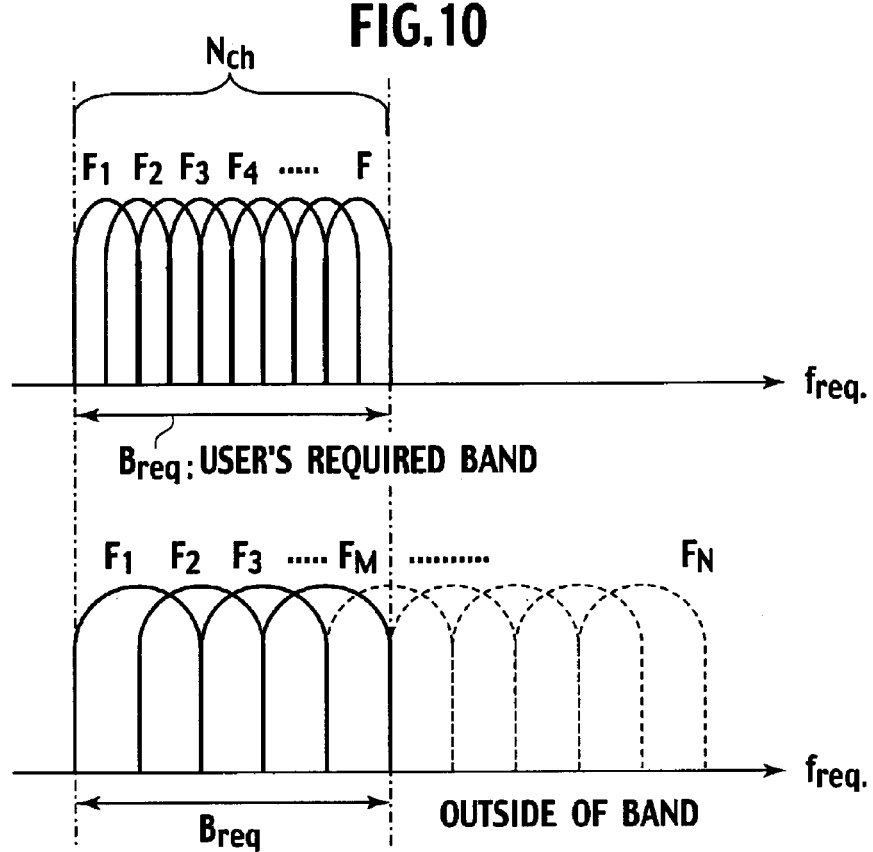
FIG. 10 is a figure showing an example of a frequency spectrum in a conventional case.
Figure 11:
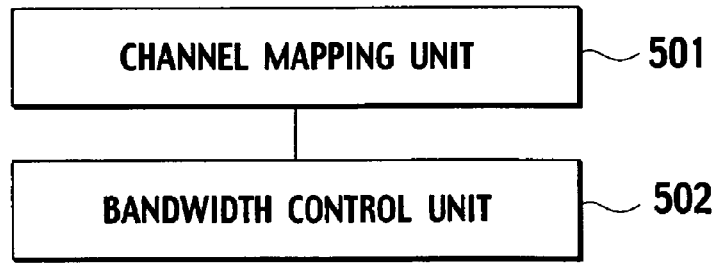
FIG. 11 is a block diagram showing a schematic configuration of a radio communication system of the present invention.

FIG. 11 shows a schematic configuration of a radio communication system according to the present invention. The radio communication system of FIG. 11 comprises a channel mapping unit 501 and a bandwidth control unit 502. In this radio communication system, the efficient utilization of the frequency band is realized by introducing the OFDM scheme into the frequency band which happens to have some vacancy, at the channel mapping unit 501, on an assumption that the respective frequency bands utilized by the wide band system of the OFDM scheme and the narrow band system (PDC=800 MHz, GSM, PHS, 3G system=2 GHz, radio LAN=2.4 GHz, etc.) are coexisting. The channel mapping unit 501 can assign new resources to the system band by rearranging the frequency channels assigned to each cell (base station) into continuous frequency channels for each cell (base station), and compressing them into a narrow band by orthogonally multiplexing them. In addition, at the bandwidth control unit 502, the further improvement of the transmission characteristics is realized by controlling the sub-carrier bandwidth and the number of sub-carriers optimally, by accounting for the fading variation at the receiving side.

In the following, the detail of the channel mapping unit 501 will be described in detail in the first embodiment to the sixth embodiment, and the detail of the bandwidth control unit 502 will be described in detail in the seventh embodiment to the thirteenth embodiment.

First Embodiment (System Configuration)

Figure 12:
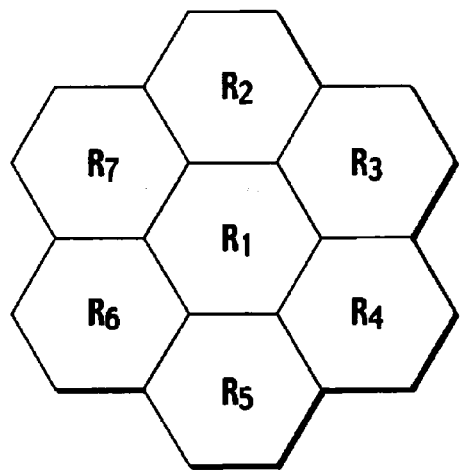
FIG. 12 is a figure showing a cell structure according to the first to fourth embodiments.

The first embodiment of the present invention will be described. Note that the present embodiment will be described for an exemplary case in which a plurality of cells $R_1$, $R_2$, $R_3$ ... are such that, as shown in FIG. 12, radio communications are carried out by the frequency repeating cell configuration with the cluster size of 7, and the frequency arrangement numbers nc=#1, #2, #3, #4 ... #nc ... #700 are repeatedly assigned respectively to R1, R2, R3, ... R7.

Figure 13:
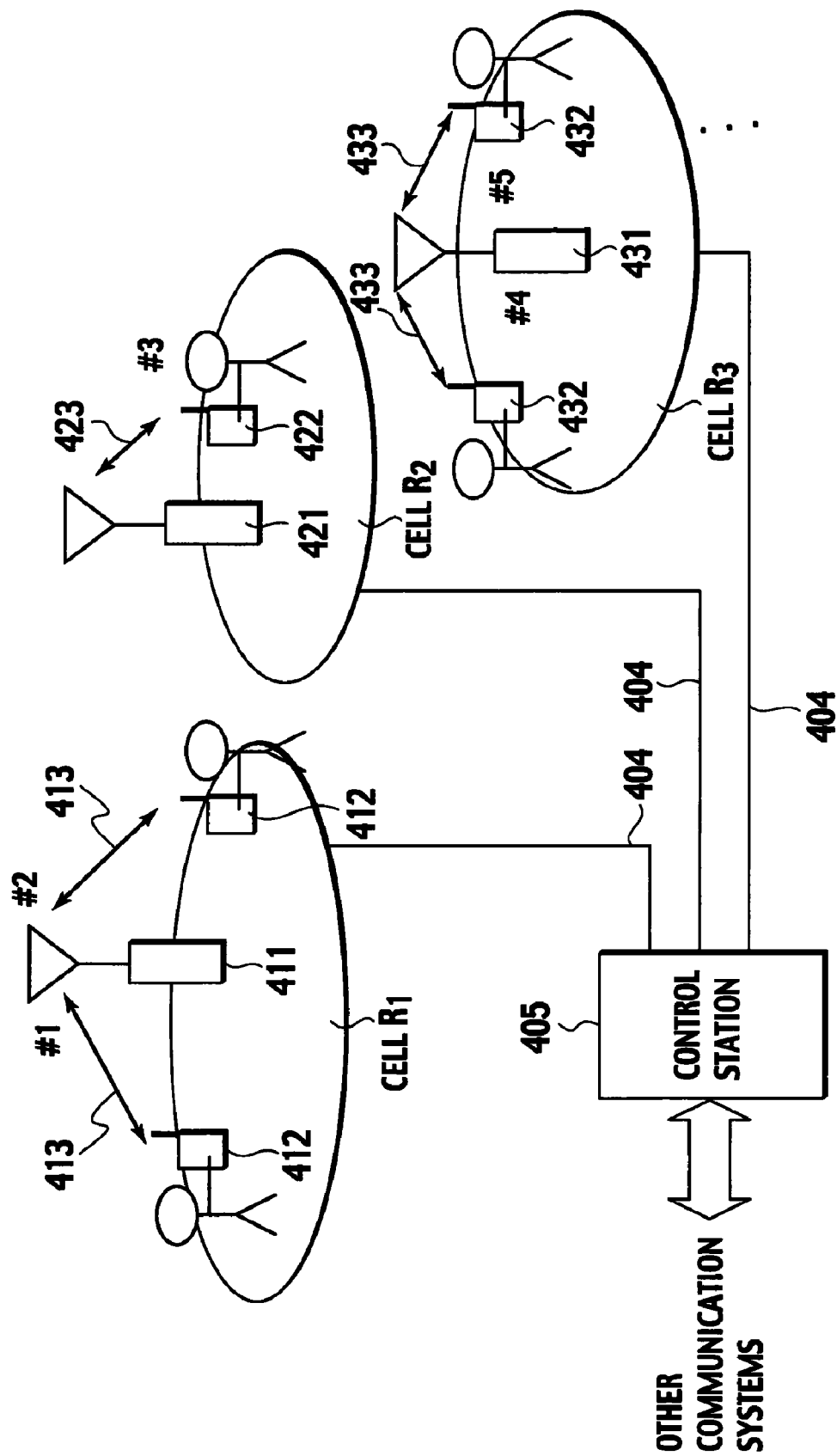
FIG. 13 is an explanatory figure showing an overall configuration of a system according to the first to fourth embodiments.

As shown in FIG. 13, in the communication system according to the present embodiment, the radio base stations 411, 421, 431 ... for respectively managing a plurality of cells R1, R2, R3 ... and radio mobile stations 412, 422, 432 ... located in respective cells carry out transmission and reception of signals through radio channels 413, 423, 433. Then, each radio base station 411, 421, 431 is connected to a control station 405 through a channel 404, and made possible to communicate with the other communication systems through this control station 405.

Figure 14:
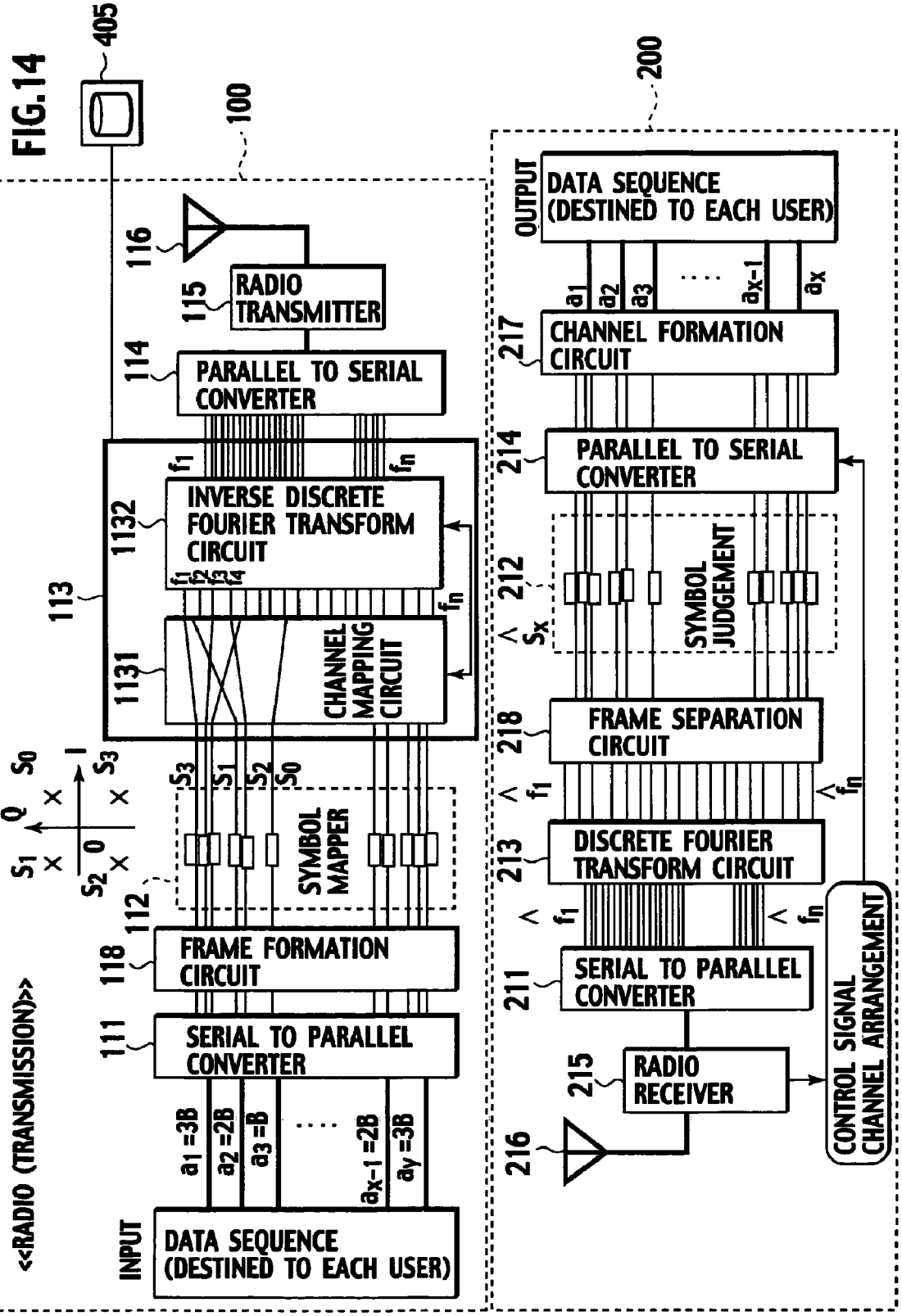
FIG. 14 is a block diagram showing an internal configuration of a radio device according to the first embodiment.

FIG. 14 is a block diagram showing a configuration of a system according to the present embodiment. This system comprises a transmission unit 100 and a reception unit 200, which is provided as a radio device for a radio base station, a radio mobile station, etc. Note that, this embodiment will be described for an exemplary case in which this communication system is provided at a radio mobile station.

As shown in FIG. 14, the transmission unit 100 has a serial to parallel converter 111, into which data sequences $a_1$, $a_2$, ... $a_y$ destined to respective users are inputted, for converting these data sequences into parallel signals, a frame formation circuit 118 for forming a frame according to the burst signal (synchronization signal), a symbol mapper 112 for carrying out the baseband digital modulation, a channel selection device 113 for carrying out the channel assignment, a parallel to serial converter 114 for applying the parallel to serial conversion to the output signals from the channel selection device 113 and converting them into time series transmission signals, and a radio transmitter 115 for amplifying power after converting them into a radio frequency band used by the system and transmitting them through a transmission antenna 116.

The serial to parallel converter 111 is a circuit for converting arbitrary number of sub-carriers into a plurality of channels according to information indicated by the data to be transmitted, and in the present embodiment, it has a function for converting signals with different symbol rates into a plurality of frequency channels with an identical symbol rate.

The symbol mapper 112 carries out the modulation of the baseband digital signals, and in the present embodiment, it has a function for demultiplexing the information frequency channel and the control frequency channel from the FDMA or TDMA signals. This digital signal modulation has a function for discretely changing the amplitude, phase and frequency of the carrier according to the multi-valued symbol and forming a constellation in a signal space diagram on the complex plane, and replaces them by the baseband signals of the I frequency channel and the Q frequency channel of these modulated waves and generates the modulated waves, as shown in FIG. 14.

Figure 15:
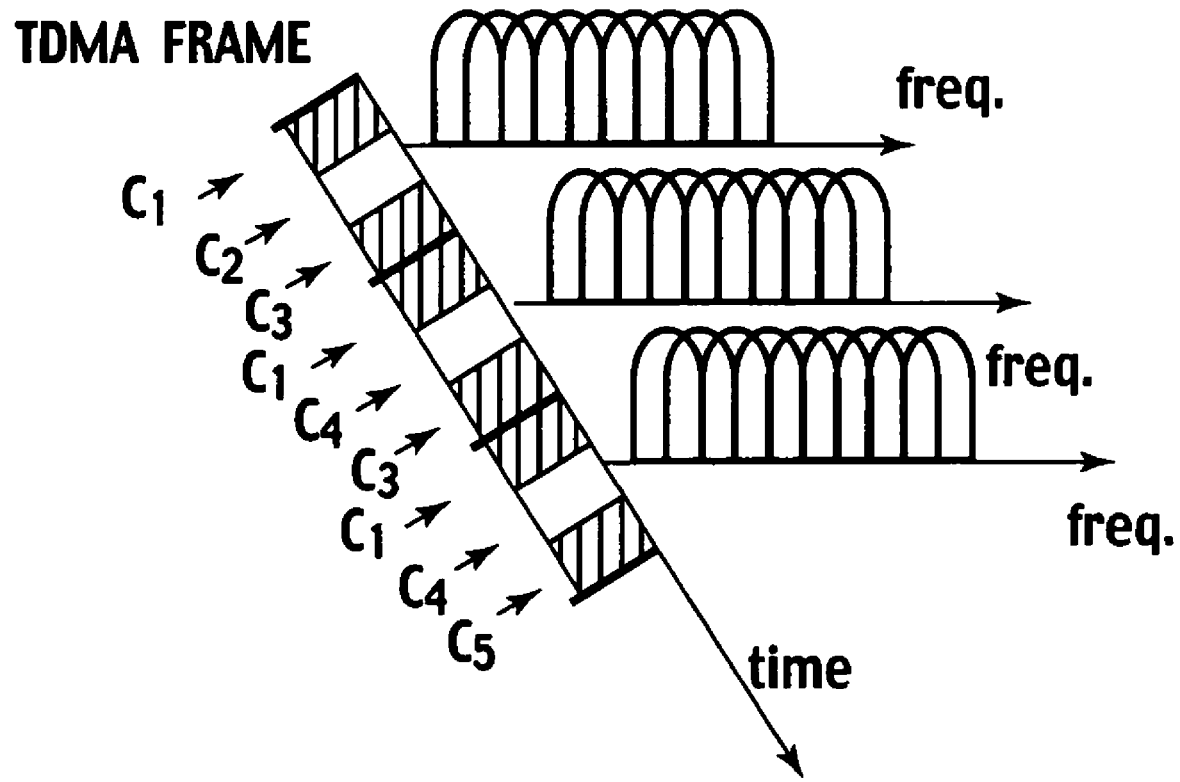
FIG. 15 is a figure showing a configuration of a digital signal modulation according to the first embodiment.

The frame formation circuit 118 is a circuit or converting the digital signals into the burst signals of the FDMA or TDMA signals, as shown in FIG. 15.

The channel selection device 113 has a channel mapping circuit 1131 for assigning the serial output signal sequences to the particular continuous channels of the system band, and an inverse discrete Fourier transform circuit 1132 for applying the inverse Fourier transform to the output signals of said frequency channel mapping means and converting them into the plurality of orthogonalized sub-carrier frequency channel signals.

The channel mapping circuit 1131 is a circuit for carrying out the continuous frequency channel assignment, and the inverse discrete Fourier transform circuit 1132 is a circuit for carrying out the compression of the occupied band by orthogonally multiplexing all the frequency channels. In particular, in the case where the frequency channels are continuously arranged, this inverse discrete Fourier transform circuit 1132 has a function for converting them into the sub-carriers by orthogonally multiplexing this portion.

To describe in detail the signal assignment by the channel mapping circuit 1131, as shown in FIG. 16(*a*), at the beginning, the arbitrary number of sub-carriers according to the user's requests are assigned to the frequency channels of the respective cells $R_1, R_2, R_3, \ldots R_7$. Then, at the transmission unit 100, when there are input (speech call origination, packet transmission) of data $a_1, a_2, \ldots a_y$ from the respective users, via the serial to parallel converter 111 and the frame formation circuit 118, the modulation such as QPSK is carried out at the symbol mapper 112. At this point, they are branched into a plurality of frequency channels by the required bit rate at the serial to parallel converter 111, and the overall necessary number of frequency channels to be assigned is determined. As the necessary bit rate is different for each reception radio station 2, the number of frequency channels to be assigned is also different.

Also, at the serial to parallel converter 111, the required bit rate is secured at the radio channel assignment between the radio base station and the radio mobile station. For example, when one channel of the basic frequency channel has the bit rate B and the data sequence an from the user has the bit rate of 3B, the assignment of 3 frequency channels is carried out. The symbol mapper 112 carries out the modulation of the baseband digital signals, and in the present embodiment, it demultiplexes the information frequency channel and the control frequency channel from the FDMA or TDMA signals. More specifically, this digital signal modulation discretely changes the amplitude, phase and frequency of the carrier according to the multi-valued symbol, forms a constellation in a signal space diagram on the complex plane, replaces them by the baseband signals of the I frequency channel and the Q frequency channel of these modulated waves, and generates the modulated waves.

At the channel mapping circuit 1131, as shown in FIG. 16(*b*), the rearrangement of the assignment of the frequency channels is carried out, and for each area, the parallel output signal sequences in which the respective frequency channels have the identical symbol rate are assigned to particular continuous frequency channels of the system band. In addition, the channel mapping circuit 1131 orthogonally multiplexes the respective re-assigned and mapped carrier frequencies at the inverse discrete Fourier transform circuit 1132, and converts them by the parallel to serial converter 114. In this orthogonal multiplexing, in the case where the frequency channels are continuously arranged, the compression of the occupied band is carried out by converting them into the sub-carriers by orthogonally multiplexing this portion, as shown in FIG. 16(*c*).

Figure 17:
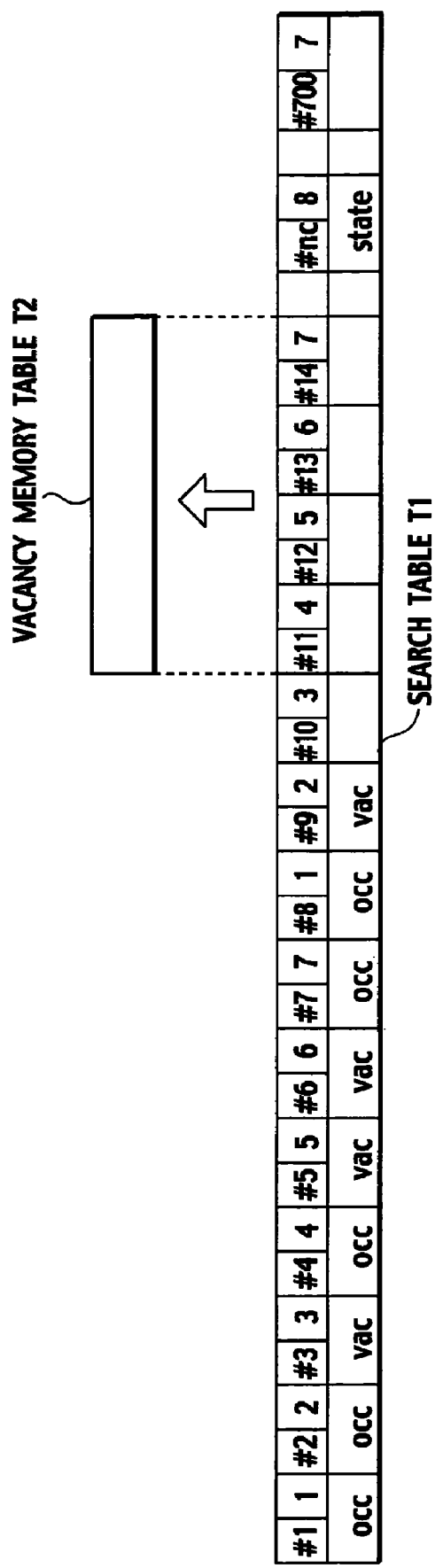
FIG. 17 is a figure showing a search table and a vacancy memory table according to the first embodiment.

Also, the channel mapping circuit 1131 has a function for acquiring the search table T1 as shown in FIG. 17 and referring it at a time of carrying out the rearrangement of the frequency arrangement. In the present embodiment, the search table T1 is a database maintained within the control station 405, which stores the arrangement number of the communication frequency channel, the belonging area, and the state distinction as to whether it is vacant or used, for all the frequency channels, and the information regarding all the frequency channels is shared at the respective radio base stations as this search table T1 is acquired by the channel mapping circuit 1131 of each radio base station.

In the present embodiment, assuming that the frequency arrangement number nc=#1, #2, #3, #4, . . . #nc . . . . . . #700 are repeatedly assigned to R1, R2, R3, . . . R7 respectively, the search table T1 has two transmission information of vac when the using state of the frequency channel is a vacant state and occ when it is a occupied state, for each cell. More specifically, denoting f(arrangement number of frequency channel, belonging area, state distinction), the search table T1 stores f(1, 1, occ), f(2, 2, occ), f(3, 3, vac), f(4, 4, vac), f(5, 5, vac), f(6, 6, vac), f(7, 7, occ), f(8, 1, occ), f(9, 2, occ), . . . f(#nc, r, state).

Also, the search table T1 is made such that, as shown in FIG. 17, in the case where the vacant frequency channel does not exist within the band to be continuously secured at a time of referring the search table T1, the vacant frequency channels outside this band to be continuously secured are counted, and when more than or equal to a prescribed number of the vacant frequency channels are secured, it cooperates with the vacancy memory table T2 for holding the information regarding these vacant frequency channels. This vacancy memory table T2 holds the information regarding the counted vacant frequency channels which is copied from the search table T1, and it is used at a time of changing the frequency channels of another radio base station which are used within a said band to be continuously secured to the frequency channels held in said vacancy memory table.

Figure 18:
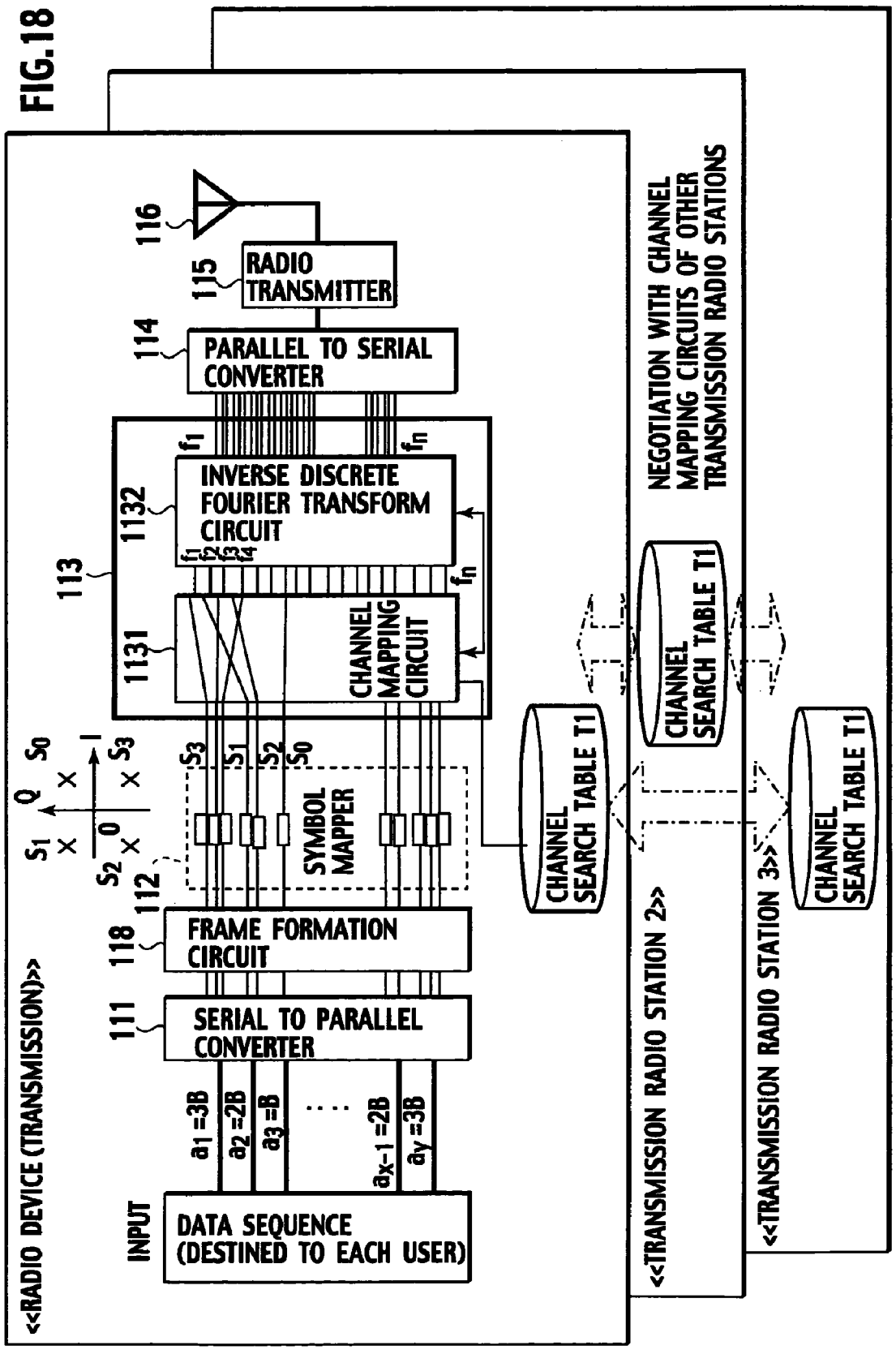
FIG. 18 is a block diagram showing an internal configuration of a radio device according to a modified embodiment of the first embodiment.

Note that, in the present embodiment, the search table T1 is stored within the control station 405, and the information is shared by a plurality of radio devices as the channel mapping circuit 1131 of each device acquires it from the control station 405, but, for example, as shown in FIG. 18, the negotiation processing for realizing the synchronization of the search table T1 may be carried out by the transmission and reception of the search table T1 information between the channel mapping circuits 1131 of the respective radio devices. Namely, the transmission units 100 of the radio base stations are connected by the optical fiber network or the like and the information regarding the latest frequency channel using state is always shared between the neighboring radio base stations. Then, in the present embodiment, each frequency channel is assigned in advance by each radio base station to the unique frequency channel. The assignment control is carried out autonomously and distributedly by utilizing the fact that each radio base station shares the frequency channel information with the surrounding cells.

On the other hand, as shown in FIG. 14, the reception unit 200 has a radio receiver 215, a serial to parallel converter 211, a discrete Fourier transform circuit 213, a frame separation circuit 218, a symbol judgement unit 212, a parallel to serial converter 214, a channel formation circuit 217, and a reception antenna 216.

In such a reception unit 200, the signals transmitted from the other device are received by the reception antenna 216, and the continuous data signals converted into the baseband signals by the radio receiver 215 are serial to parallel converted at the symbol time interval at the serial to parallel converter 211. Then, these output signals are extracted into a plurality of sub-carrier signal components at the discrete Fourier transform circuit 213, and the extracted single or plurality of sub-carrier channel signals are separated for each frame at the frame separation circuit 218, and this is baseband digital demodulated at the symbol judgement unit 212, and further they are serial to parallel converted to output the complex symbol sequences for desired users at the parallel to serial converter 214, and after the channels are formed by the channel formation circuit 217, they are outputted as the data sequences $a_1$ to $a_x$ destined to the respective users.

(System Operation)

Figure 19:
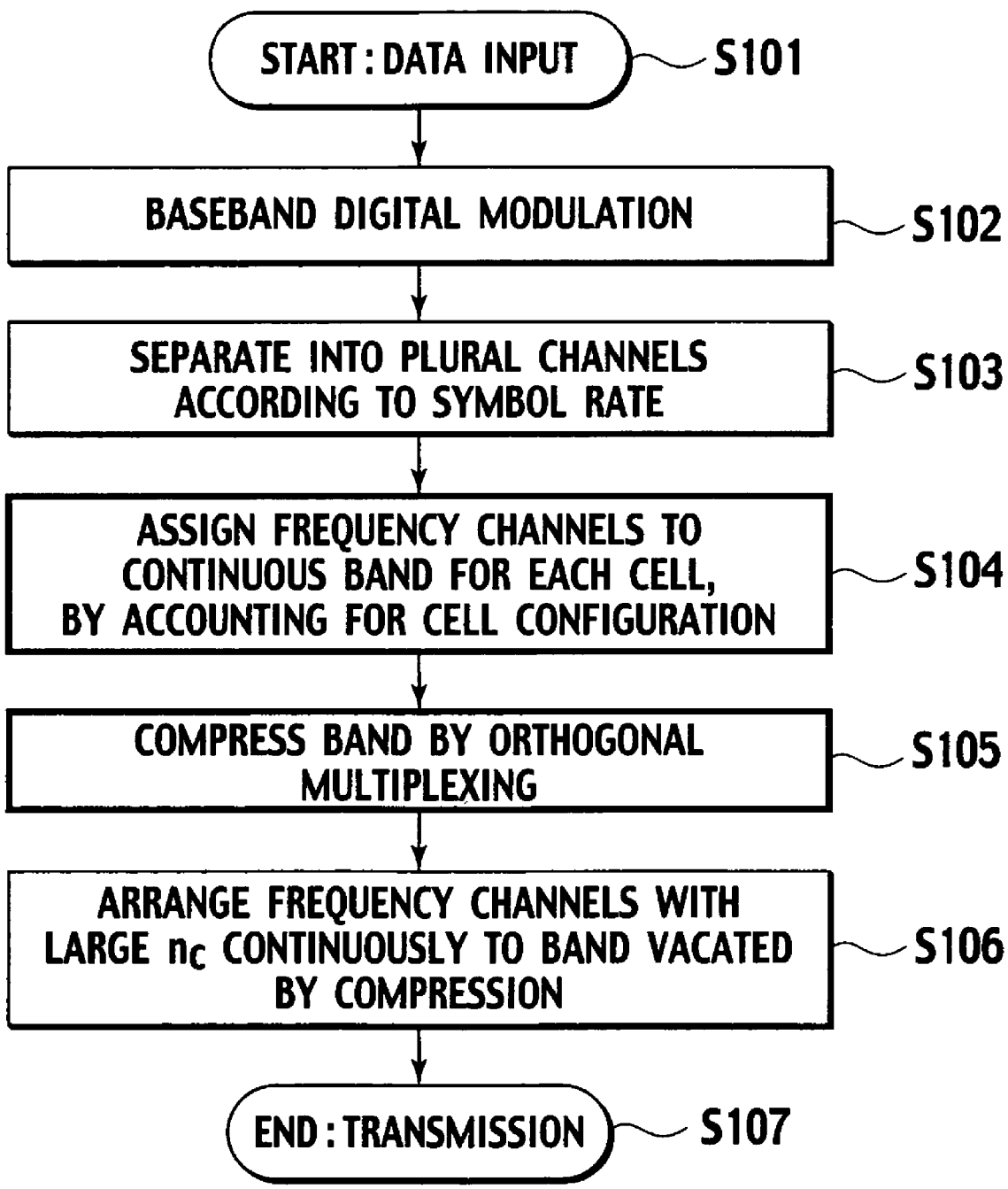
FIG. 19 is a flow chart showing an overall procedure for a channel assignment according to the first embodiment.

The processing procedure by the communication system according to the present embodiment is as follows. FIG. 19 is a flow chart showing the basic processing procedure in the present embodiment.

First, when there are input (baseband signals of speech call origination, packet transmission, etc.) of data $a_1, a_2, \ldots a_y$ from the users (S101), the inputted data $a_1, a_2, \ldots a_y$ are modulated into a plurality of frequency channels of the transmission speed determined in advance by the required bit rate at the speed converter 117, and branched into the necessary number of the frequency channels to be assigned (S102 and S103)

Next, the modulation such as QPSK is carried out and the symbol mapper 112 and the information bit sequence is converted into the symbol sequence ($S_0, S_1, S_2, S_3$). Then, the modulated signals are assigned to the continuous frequency channels at the channel mapping circuit 1131 (S104), all the frequency channels are compressed by orthogonally multiplexing them by the inverse discrete Fourier transform circuit 1132 (S105), and after the frequency channels with large nc are arranged continuously at the channel mapping circuit 1131 with respect to the band vacated by the compression (S106), they are transmitted by the radio transmitter 115 (S107).

In this way, by band compressing the continuous frequency channel band by the orthogonal multiplexing and assigning the frequency channels with large nc to the vacated frequency band, and repeating this, it is possible to collect the vacated high frequency band, assign the new frequency channels of $R_1$ and utilize them for the frequency sharing or the like with the other radio system.

Here, the processing at the steps S104 and S105 described above will be described in detail. Here, the procedure for rearranging the continuous frequency channels from nc=#1-#100 owned by each area, changing them to be belonging to $R_1$, and band compressing them by the orthogonal multiplexing will be described.

Describing it in detail, as shown in FIG. 21(*a*), the rearrangement of the frequency channels is carried out for the band for 100ch occupied by the 100ch frequency channels, they are changed to be belonging to $R_1$, and they are compressed to the band for 50+1 (guard band part) ch by the orthogonal multiplexing. Namely, the band for 100−52=48 ch are vacated. The assignment of the frequency channels with large nc to this band is carried out, and the unused bands are collected together to the high band and utilized for the other utilization purpose.

Figure 20:
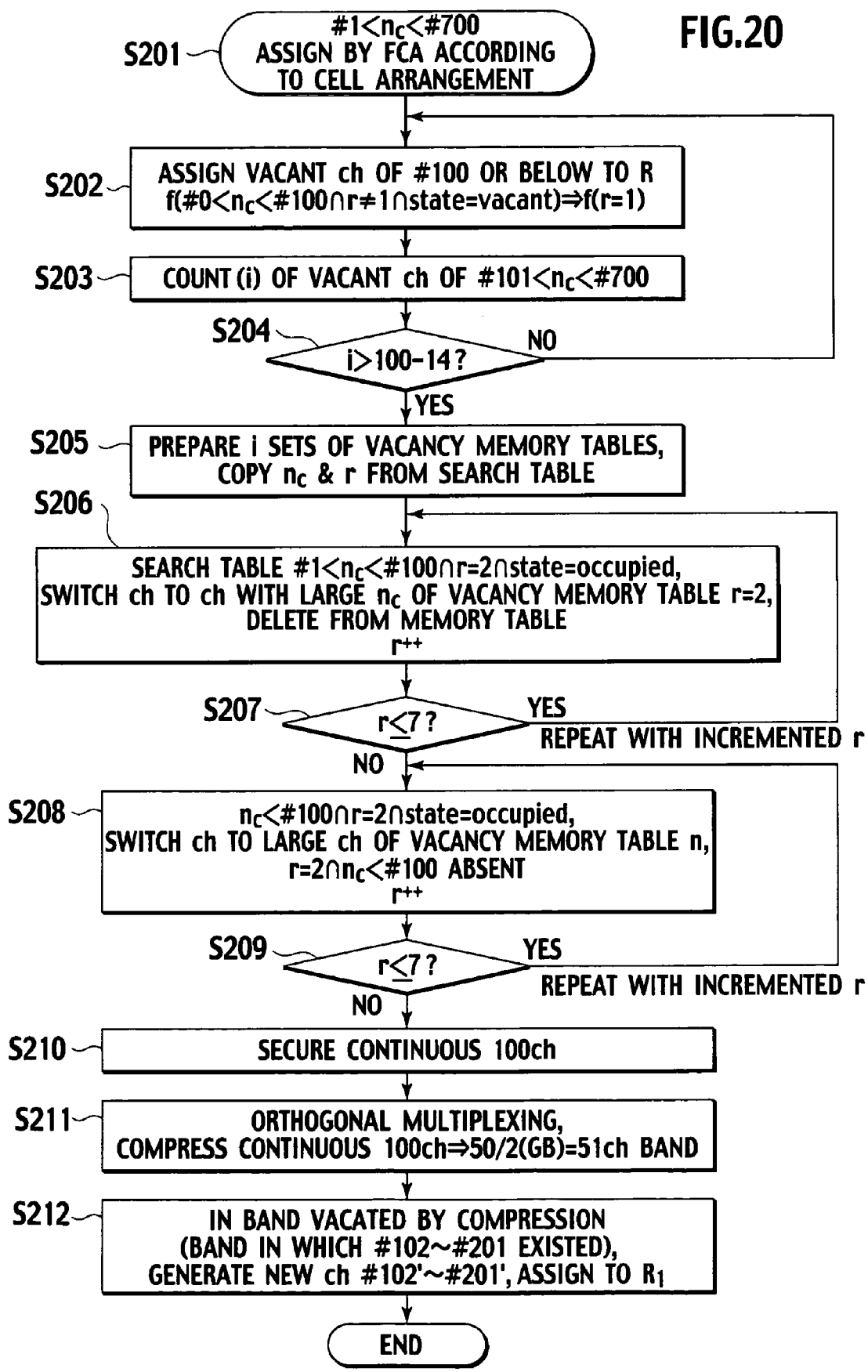
FIG. 20 is a flow chart showing in detail a procedure for a channel rearrangement according to the first embodiment.

For this rearrangement processing, the procedure for securing 100 for nc by one procedure and band compressing by carrying out the rearrangement will be described. FIG. 20 is a flow chart showing the procedure for band compressing.

At the search table T1, if there are vacant frequency channels in nc=#1-#100, all of them are changed to r=1 and to be belonging to $R_1$ (S202). Next, the vacant frequency channels of nc=#101-#700 are counted (S203), and when it is less than or equal to 86 (i>100−14), the continuous frequency channels cannot be secured by one procedure, so that it returns to the step S202, and the processing for the next 100 is executed.

On the other hand, at the step S204, when i is greater than or equal to 86, they are made to be belonging to (r=1), the vacant frequency channel number i sets of the vacancy memory tables T2 are prepared, and the information of the vacant frequency channels are copied from the search table T1 and held (S205).

Next, the vacant frequency channels are detected in an order of larger nc in the search table T1, the switching of the frequency channels assigned to those other than $R_1$ for nc=#1-#100 is carried out, and the contents of the vacancy memory tables T2 are all copied to $R_1$ of nc=#1-#100. At this point, the vacant frequency channels that match r=2 are sequentially assigned in an order of larger one from the search table T1, for r=2 of nc=#1-#100 (f(2, 2, occ), f(9, 2, occ) . . . ) (S206). BY such a switching, the vacated frequency channels are changed to r=1 and made to be belonging to the cell $R_1$. After that, the frequency channel information used for the substitution is deleted from the vacancy memory tables T2. When there is no more frequency channel belonging to r=2 of nc=#1-#100, the value of r is increased and the similar frequency channel switching is repeated for r=3, and this is repeated up to r=7 (S206 to S209).

By the processing up to here, the changing to be belonging to r=1 for the frequency channels nc=#1-#100 is completed, and the continuous 101 frequency channels are secured (S210). Next, these bands are compressed by the orthogonal multiplexing (S211), the new channels are generated in the band vacated by the compression, and they are assigned to the cell $R_1$ (S212).

More specifically, the band for 100ch occupied by 100ch frequency channels is compressed to the band for 50+1 (guard band part) ch by the orthogonal multiplexing at the inverse discrete Fourier transform circuit 1132, and the band for 100−51=49 ch is vacated. The assignment of the frequency channels with large nc to this vacated band is carried out, the unused bands are collected, and it becomes possible to utilize them for the other utilization purpose.

(Effects)

According to such a communication system according to the present embodiment, as shown in FIG. 21(*a*), for the continuous frequency channel portion, there is no need to provide the guard band between respective channels by the orthogonal multiplexing, so that the utilization efficiency of the frequency band becomes very high. In addition, the above described processing can use the fast Fourier transform, and the efficiency and the speed of the processing can be raised by this. The frequency utilization efficiency can be raised higher than the case of the independent multi-carrier transmission, by the orthogonal multiplexing. In other words, it becomes possible to use the band vacated by the compression for the new frequency channel assignment.

(Modification)

Note that the present invention can also be applied to the radio LAN system using the OFDM scheme, such as the radio LAN system IEEE802.11a, for example. In this case, it is often used in each independent room and it can be treated as an isolated cell, so that there is no need to carry out the frequency arrangement by accounting for the inter-cell interferences, and as shown in FIG. 21(*b*), when the system band is 100 MHz, there are 4 channels of the frequency channels with the channel interval of 20 MHz within the identical AP, and it is possible to select the vacant channel from these four channels and carry out the assignment.

Second Embodiment

Figure 22:
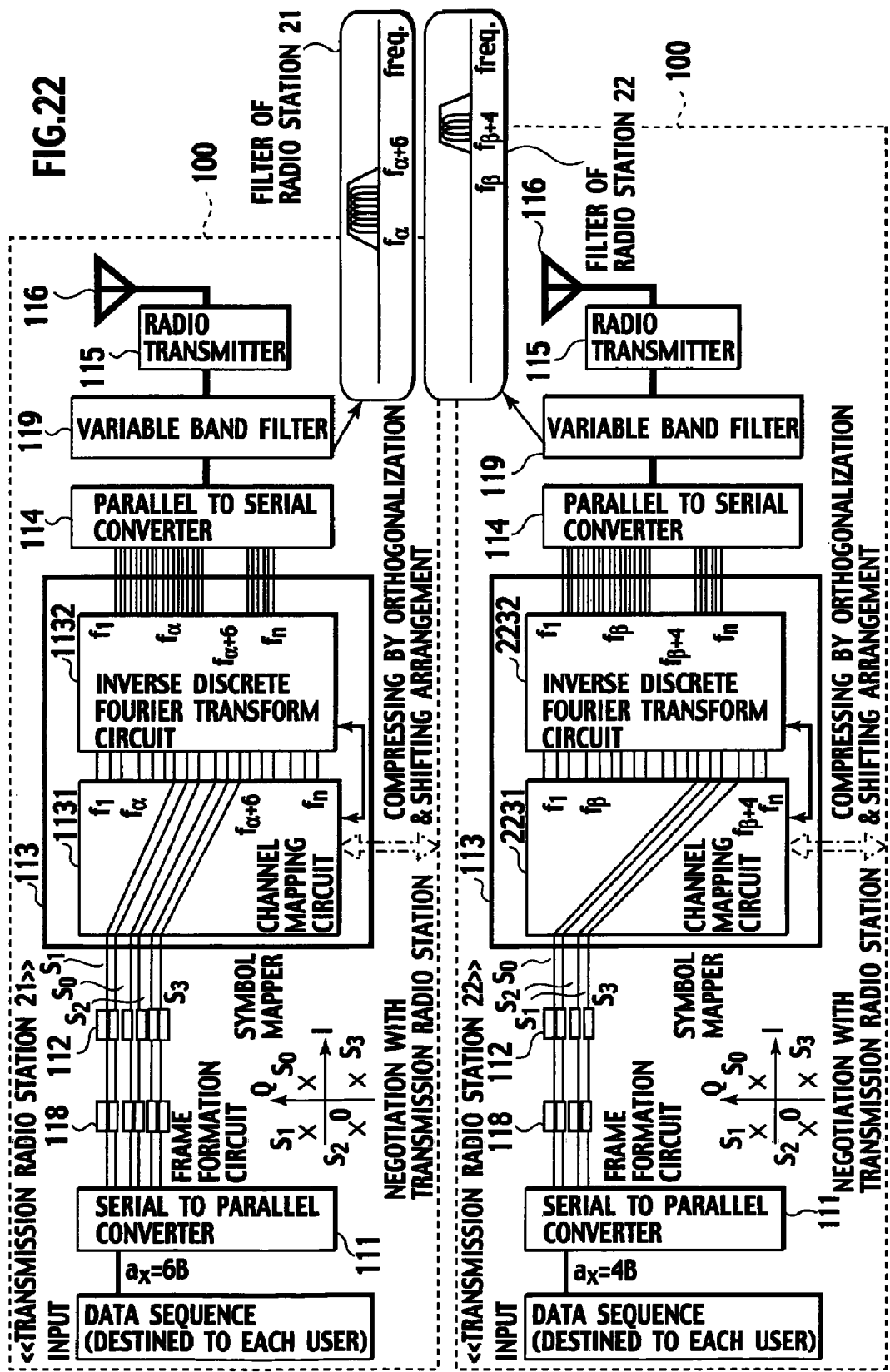
FIG. 22 is a block diagram showing an internal configuration of a radio device according to the second embodiment.

Next, the second embodiment of the present invention will be described. FIG. 22 is a block diagram showing an internal configuration of a transmission unit of a communication system according to the present embodiment. Note that the case where the communication system is a radio base station of a cellular mobile communication scheme will be described here, but the it has the similar configuration in the other cases.

As shown in FIG. 22, the transmission unit 100 according to the present embodiment has a speed converter 117 instead of the serial to parallel converter 111 described above, and in addition, it has a variable band filter 119.

The serial to parallel converter 111 is a circuit for branching the inputted data $a_1, a_2, \ldots a_y$ into a plurality of frequency channels with a transmission speed determined in advance according to the required bit rate, and convert them into as many signal sequences as the necessary number of frequency channels to be assigned. The variable band filter 119 is a circuit for selecting and extracting only a prescribed frequency band, and the communication is carried out though the radio transmitter 115 by using the channel that passed through this variable band filter 115.

According to such a present embodiment, even in the case where the required information bit rate is different for each mobile communication terminal and the number of sub-carriers to be assigned by the channel selection device 113 and their central frequency are different for each radio mobile station, it is possible to avoid the neighboring channel interferences to another radio mobile station transmission signals within the system band, by making the passing bandwidth variable by the variable band filter 119 about the central frequency. The output of this variable band filter 119 is converted into the frequency band used by the system, the power is amplified, and transmitted to the transmission path at the radio transmitter 115.

Third Embodiment

Figure 23:
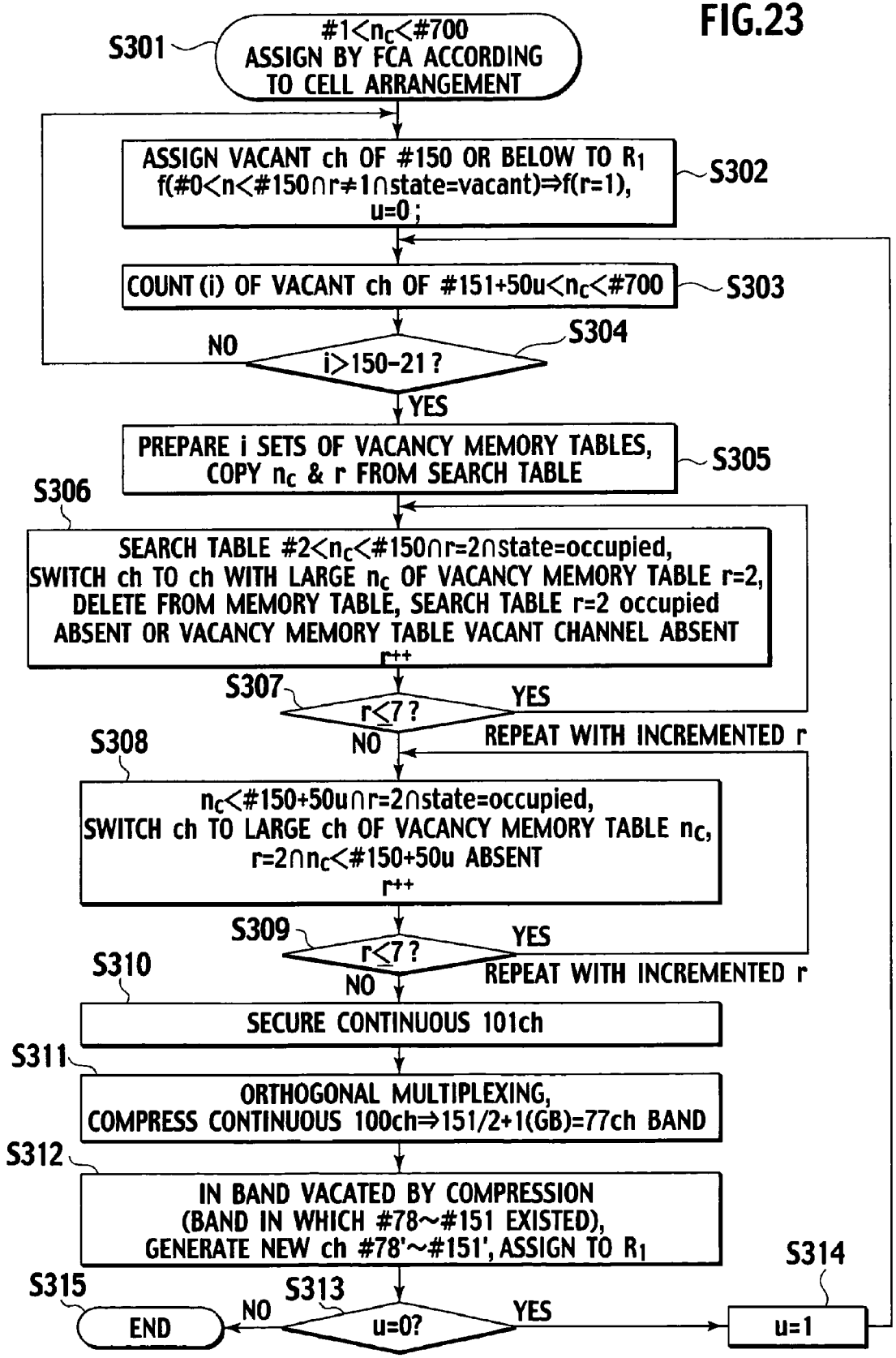
FIG. 23 is a flow chart showing an overall procedure for a channel assignment according to the third embodiment.

Next, the third embodiment of the present invention will be described. In the first embodiment described above, the case of improving the frequency utilization efficiency at $R_1$ by compressing a part of the frequency channels assigned to the area $R_1$ by the orthogonal multiplexing has been described. In this third embodiment, the case of compressing the frequency channels of the area other than $R_1$ as well by the orthogonalization in order to further raise the efficiency of the entire system will be described. FIG. 23 is a flow chart showing the processing procedure according to the third embodiment.

First, the frequency channel assignment capable of the appropriate frequency repetitive use is carried out by the FCA (S301). After that, an arbitrary continuous band is secured. Note that, here, an example in which the frequency channels are partitioned into groups of 150ch each (bound=150) will be described, but by giving an arbitrary value to bound, it can be applied to the securing of an arbitrary continuous band.

Next, at the search table T1, nc=#1 is set as a top (#bound_head=#1), and nc=#150 is set as a tail (#bound_end=#150). Then, within the search table T1, if there are vacant ones in nc=#1 to #150, they are all changed to r=x (initial value: r=1) and made to be belonging to Rx (initial value: R1) (S302).

The vacant frequency channels from the tail (#bound_end=#150) to #700 are counted (i) (S303). When i is greater than or equal to bound-(quotient of bound divided by the class size 7) (here it is 14), as many vacancy memory tables T2 as the number i of the vacant frequency channels are prepared, and the information of the vacant frequency channels is copied from the search table T1. When i is less than bound-(quotient of bound divided by the class size 7), it is repeated until the vacancy appears (S305).

Next, for the order of smaller r=y1xCr of #bound_head<nc<#bound_end (R=2 f(2, 2, occ), f(9, 2, occ) . . . ), the vacant frequency channels that match r=y are sequentially assigned in the order of larger one among the vacancy memory tables T2. The frequency channel vacated by the switching is immediately changed to r=x and made to be belonging to Rx. In the case where there is no more frequency channels belonging to r=y left from the vacancy memory tables T2 despite of the fact that there are frequency channels of r=y of #bound_head<nc<#bound_end still remaining, the remaining ones are left as they are and y is incremented, and the similar frequency channel switching is repeated for the next r=y (by r=3 after r=2) (S306 and S307). In r=y, if there are frequency channels of #bound_head<nc<#bound_end still remaining, they are also left as they are and the next frequency channel switching is carries out, and it is repeatedly carried out up to r=7 (up to y=6 when x=7). The remaining frequency channels which are not frequency channel switched are sequentially assigned in the order of larger vacancy memory table arrangement number nc, regardless of r (S308 and S309).

For the continuous 100ch secured by this work, every time they are secured (S310), they are compressed by the orthogonalization, and the new channels are generated and assigned to the band vacated by the compression. After the compression, the value of r=x is incremented, and the procedure up to the compression is repeated for the next r=x (R=2). The work to assign the continuous 100ch and compress them by the orthogonalization is repeated up to r=7 (S313 and S314). Then, when the processing is carried out for all the cells, it is finished (S315).

As such, according to the present embodiment, the band for 100ch occupied by the 100ch frequency channels are compressed to the band for 51+1 (guard band part) ch by the orthogonal multiplexing, so that for the system as a whole, the band for 48ch×7 cells are vacated. In the case of 1ch=25 kHz, the continuous band of 8.4 MHz is vacated and secured. The assignment of the frequency channels with large nc to this vacant band is carried out, the unused bands are collected, and it becomes possible to utilize them for the other utilization purpose.

Fourth Embodiment

Next, the fourth embodiment of the present invention will be described. In the first embodiment described above, the method for continuously arranging 100ch frequency channels to each area ($R_1$ to $R_7$) and compressing them has been proposed. By compressing 100ch by the orthogonalization, the frequency band that has been occupied until then and vacated is efficiently increased, but to secure the continuous band for 100ch is impossible except in the case where there are 100ch vacancy, so that in the actually operated system (the call loss rate about 3%), there is a possibility that it cannot be applied.

Figure 24:
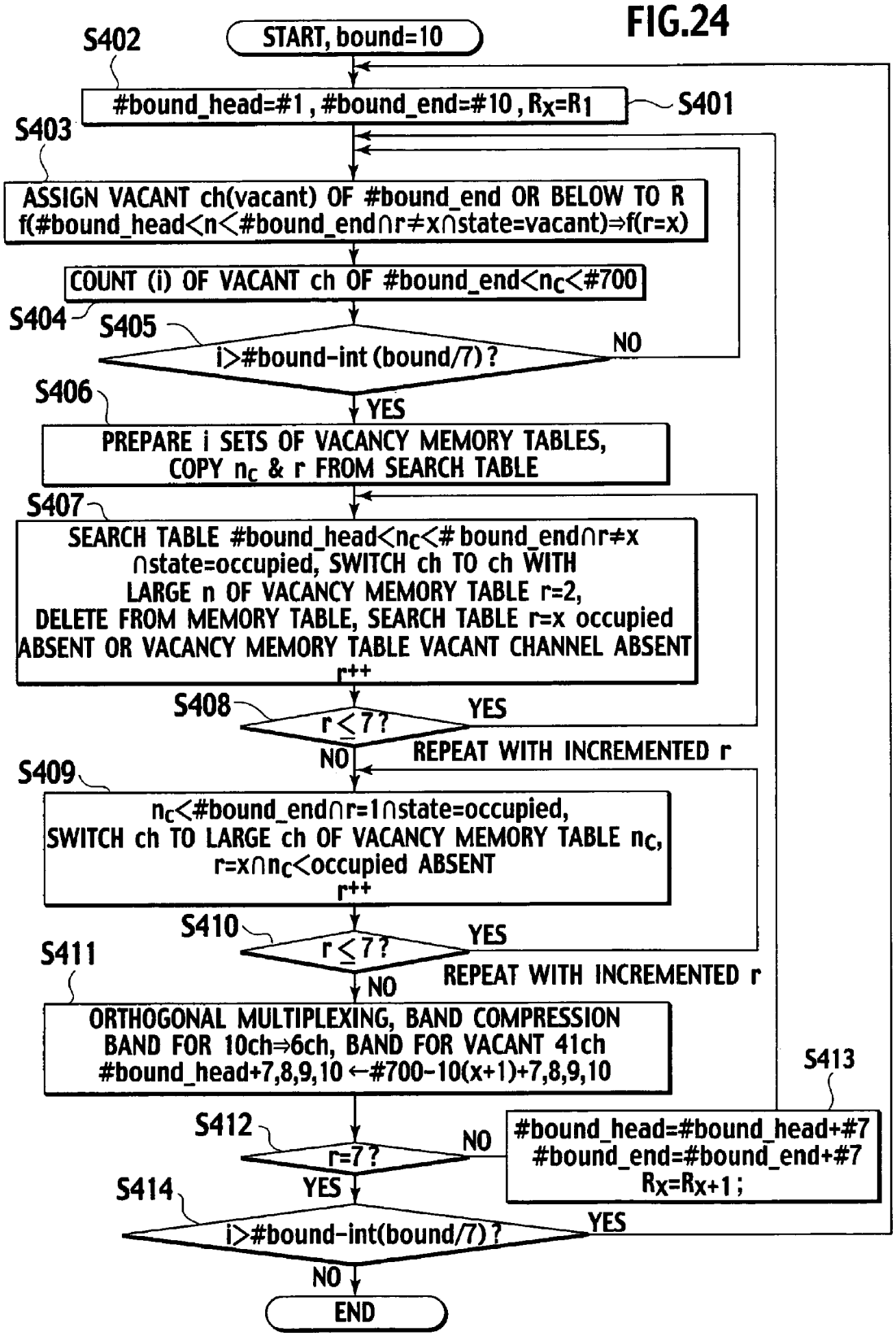
FIG. 24 is a flow chart showing an overall procedure for a channel assignment according to the fourth embodiment.

Also, even when an arbitrary value is given to bound, if the assignment is carried out one by one for $R_1$ to $R_7$, it is difficult to obtain the sufficient effect when bound is small. For this reason, this fourth embodiment adopts an algorithm which uses 100ch vacant frequency channels and repeats securing the continuous band for 10ch for each cell and compressing them by the orthogonalization. FIG. 24 is a flow chart sowing the operation of the communication system according to the present embodiment. First, it starts when the frequency channel assignment capable of the appropriate frequency repetitive use is carried out by the FCA. Here, the frequency channels are partitioned into groups of 100ch each (bound=10) (S401). Note that, by giving an arbitrary value to bound, it can be applied to the securing of an arbitrary continuous band.

Next, nc=#1 is set as a top (#bound_head=#1), and nc=#10 is set as a tail (#bound_end=#10). If there are vacant ones in nc=#1 to #10, they are all changed to r=x (initial value: r=1) and made to be belonging to Rx (initial value: $R_1$) (S402 and S403).

Next, the vacant frequency channels from the tail (#bound_end=#10) to #700 are counted (i) (S404). When i is greater than or equal to bound-(quotient of bound divided by the class size 7) (here it is 1), as many vacancy memory tables T2 as the number i of the vacant frequency channels are prepared, and the information of the vacant frequency channels is copied from the search table (S405 and S406). On the other hand, at the step S405, when i is less than bound-(quotient of bound divided by the class size 7), the processing of the above described steps S403 to S405 is repeated until the vacancy appears.

For the order of smaller $r=y_1 \times Cr$ of #bound_head<nc<#bound_end (R=2 f(2, 2, occ), f(9, 2, occ) ... from), the vacant frequency channels that match r=y are sequentially assigned in the order of larger one among the vacancy memory tables. The frequency channel vacated by the switching is immediately changed to r=x and made to be belonging to Rx. In the case where there is no more frequency channels belonging to r=y left from the vacancy memory tables despite of the fact that there are frequency channels of r=y of #bound_head<nc<#bound_end still remaining, the remaining ones are left as they are and y is incremented, and the similar frequency channel switching is repeated for the next r=y (by r=3 after r=2).

In r=y, if there are frequency channels of #bound_head<nc<#bound_end still remaining, they are also left as they are and the next frequency channel switching is carries out, and it is repeatedly carried out up to r=7 (up to y=6 when x=7). The remaining frequency channels which are not frequency channel switched are sequentially assigned in the order of larger vacancy memory table arrangement number nc, regardless of r (S407 to S410).

For the continuous 10ch secured by this work, every time they are secured they are compressed by the orthogonalization (S411). After the compression, the value of r=x is incremented, and the procedure up to the compression is repeated for the next r=x (R=2). The work to assign the continuous 10ch and compress them by the orthogonalization is repeated up to r=7 (S412).

At this point, the comparison of the values of i and bound-int (bound/7) is made (S414), and when i is greater, the above described procedure of the compression by the orthogonalization is repeated. On the other hand, when i is less, it is finished.

By the above procedure, the band for 10ch occupied by the 10ch frequency channels are compressed to the band for 5+1 (guard band part) ch by the orthogonal multiplexing, so that for the system as a whole, the band for 3ch×7 cells×(number of repetition) are vacated. The assignment of the frequency channels with large nc to this vacant band is carried out, the unused bands are collected, and it becomes possible to utilize them for the other utilization purpose.

Fifth Embodiment

Next, the fifth embodiment of the present invention will be described. In the present embodiment, the frequency utilization efficiency is improved similarly by the continuous band securing by the DSA and the compression by the orthogonalization, similarly as FDMA and TDMA. Note that, FIG. 25(a) is a figure showing a relationship of the macro-cell and the micro-cells in the hierarchical cell typically, in the present embodiment. Note that, in FIG. 25(a), the macro-cell and respective micro-cells are assumed to be sharing the identical frequency band.

Note that, in the present embodiment, in the case where the frequency channels unique to each system are discontinuous by the measure against the macro-cell interferences, in order to carry out the frequency channel arrangement aimed at the compression by the orthogonalization, to make the frequency channels transmitted from one radio base station continuous on the frequency axis, the management of the frequency channel assignment using the RP method for the continuous band securing is carried out. More specifically, as the method for assigning the frequency channels between the hierarchical cells, the frequency channels for use are separated for the macro-cell and the micro-cell, and a partition which is a border of these is controlled by the communication quality indicating the traffic state.

In the case of CDMA, the identical frequency repeating cell arrangement is theoretically possible, but in the case where a plurality of micro-cells which communicate by using the identical frequency band exist within the macro-cell, the DSA becomes necessary as the measure against the identical frequency channel interferences. In the present embodiment, the DSA function is provided at the base station control device, and the frequency efficient utilization is realized by this. This DSA is a system in which systems with different transmission speeds coexist, as in the micro-cell and the macro-cell of the identical frequency band, and when there is no more frequency channel on one side, the permission for use is given from one with the lower priority level among the vacant frequency channels on the other side.

More specifically, as shown in FIG. 25(a), the macro-cell M1 which is a communication region of the macro-cell radio base station and the micro-cell M2 which is the communication region of the micro-cell radio base station are hierarchically arranged in a form of overlapping. In these macro-cell M1 and micro-cell M2, the frequency channel assignment is carried out in the identical frequency band. Each one of the micro-cells is set in relation to the macro-cell with the communication region which is overlapping with that micro-cell.

Figure 26:
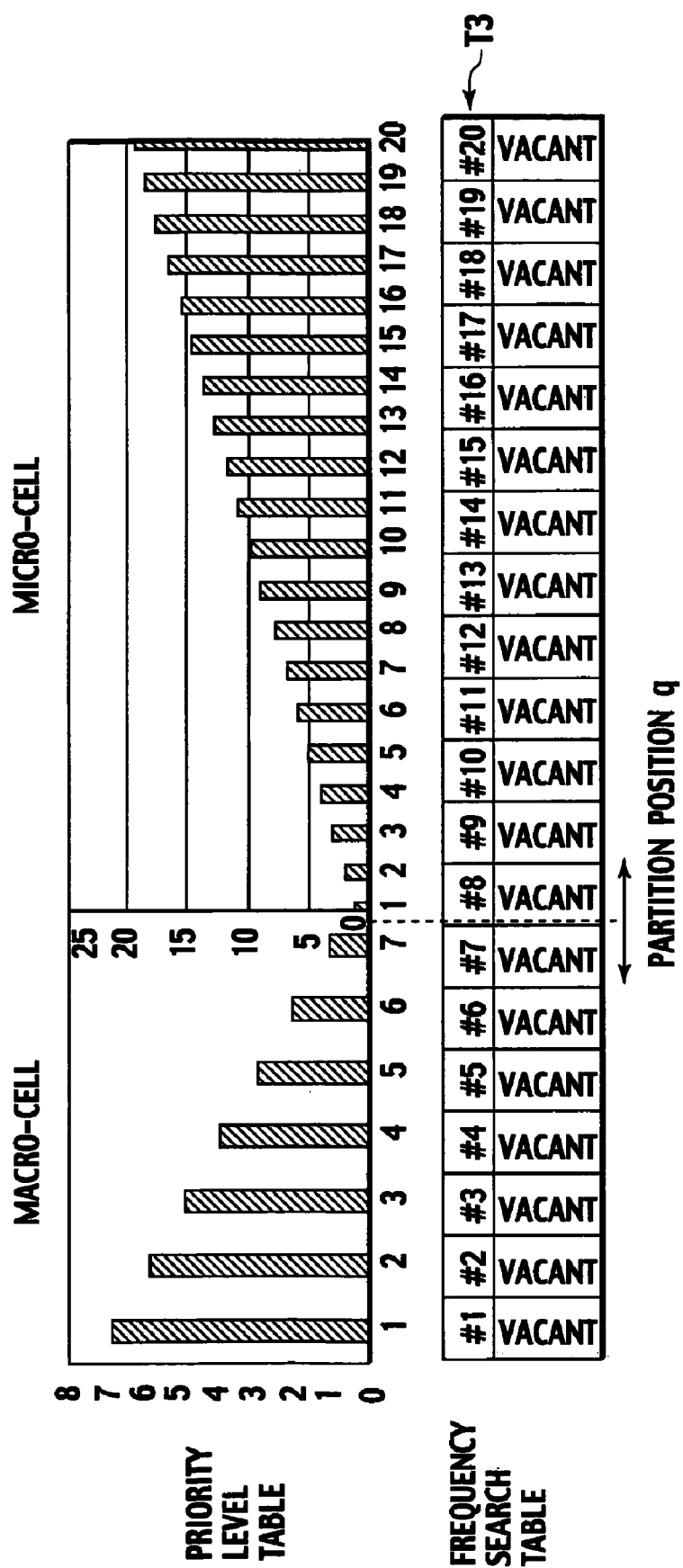
FIG. 26 is a figure showing a search table according to the fifth embodiment.

The radio communication network in the hierarchical cell structure according to the present embodiment is such that, as shown in FIG. 25(b), the macro-cell exchanger X1 and the micro-cell exchanger X2 are connected to the public communication network, and a plurality of macro-cell radio base stations BS1 and micro-cell radio base stations BS2 are respectively connected to these exchangers. Each radio base station BS1 and BS2 has a built-in control device formed by CPU and memory, and stores the frequency channel search table T3 as shown in FIG. 26, and executes the frequency channel assignment and the control of the partition autonomously. Note that the micro-cell radio base station BS2 carries out the communication with the macro-cell radio base station BS1 to which the own station belongs, and executes the frequency channel assignment and the control of the partition autonomously.

The frequency channel search table T3 stores the frequency channel number and the vacant/occupied information for example for each area, as shown in FIG. 26. Note that the number of frequency channels stored in the frequency channel search table T3 is 20 frequency channels, and among them, the frequency channels of the frequency channel numbers 1 to 7 are assigned to the macro-cell, and the frequency channels of the frequency channel numbers 8 to 20 are assigned to the micro-cells.

(Partition Shifting Control)

Figure 27:
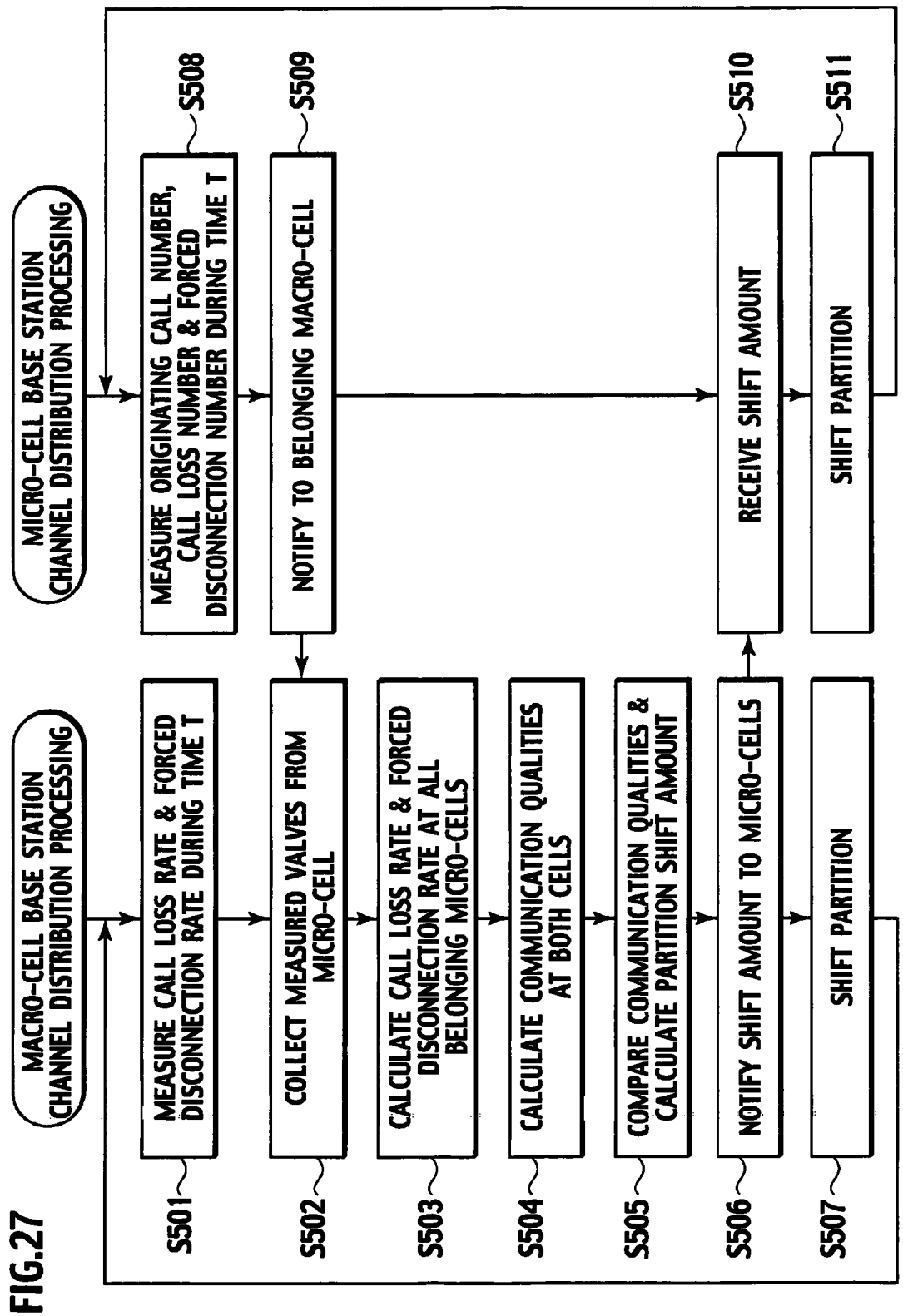
FIG. 27 is a flow chart showing a procedure for a partition shifting control in the fifth embodiment.

FIG. 27 is a flow chart showing the processing procedure of the partition shifting control. Note that this processing is executed by the processing device of the radio base station of each cell. Note that, in the present embodiment, the partition is the border of the areas at which the frequency channels of the macro-cell and the micro-cell are separated.

First, at the macro-cell radio base station, the call loss rate and the forced disconnection rate indicating the traffic state at the own station within the observation time T are measured (S501). In conjunction with this, at the micro-cell radio base station, the originating call number, the call loss number and the forced disconnection number within the observation time T at the own station are measured (S508), and the measurement result is notified to the belonging macro-cell radio base station (S509).

Next, at the macro-cell radio base station side, the measurement values at the step S508 are collected from the micro-cell radio base stations (S502), the call loss rate and the forced disconnection rate at all the belonging micro-cells are calculated (S503), the communication qualities at both cells are calculated (S504), the calculation results are compared, and the partition shift amount is calculated (S505), and the calculation result which is the partition shift amount is notified to the micro-cell radio base stations (S506), while the shifting of the partition is executed (S507). On the other hand, at the micro-cell radio base station side, the notice of the partition shift amount is received and the shifting of the partition of the own station is executed (S510 and S511).

(Frequency Channel Assignment Procedure)

Figure 28:
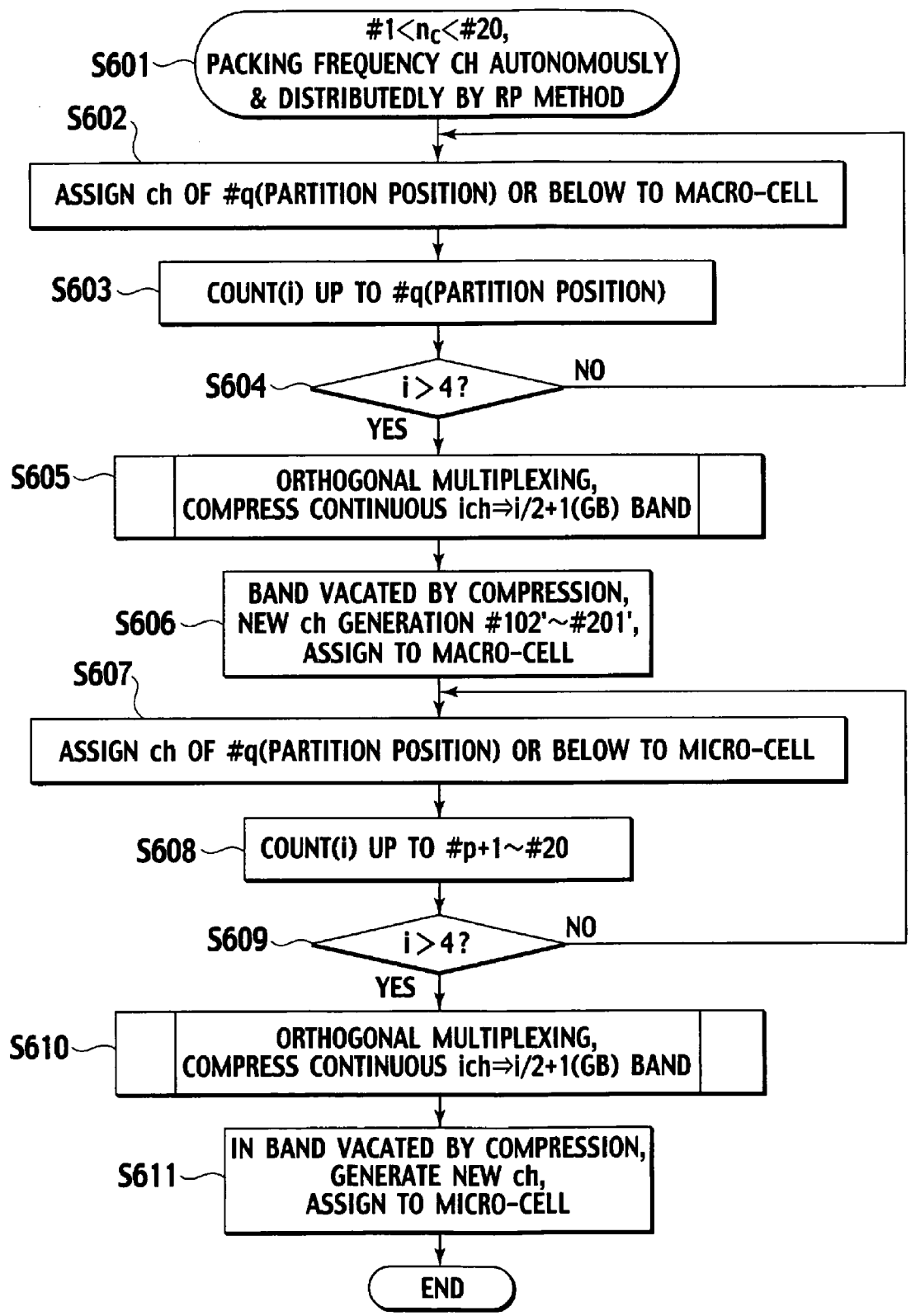
FIG. 28 is a flow chart showing a procedure for a channel assignment according to the fifth embodiment.

After the shifting of the partition is carried out in this way, the assignment of the frequency channels is carried out. Here, the rearrangement (packing) of the frequency channels is carried out at a time of the frequency channel assignment at each cell, such that the frequency channels changed from the macro-cell use to the micro-cell use can be usable immediately at a time of the partition shifting. FIG. 28 is a flow chart showing the processing procedure according to the present embodiment.

As shown in FIG. 28, when the packing is started (S601), first, the channels of the partition position q and below (#7 and below shown in FIG. 26) are assigned to the macro-cell side (S602 to S603). Describing it in detail, the vacant channels are counted from the left side of the frequency channel search table T3, and in the case where the vacant channels of more than or equal to a prescribed number (which is 4 here) of ch are detected (S604 YES), the band compression by the orthogonal multiplexing is carried out for that location (S605). In the case where the count number is i, it is compressed to i/2+1 (GB). The new channels for macro-cell are generated and assigned to the band vacated by this compression (S606).

Next, the channels of the partition position q and above (#8 and above shown in FIG. 26) are assigned to the micro-cell side (S607 to S608), Describing it in detail, the vacant channels are counted from the right side of the frequency channel search table T3 up to the partition position, and in the case where the vacant channels of more than or equal to a prescribed number (which is 4 here) of ch are detected (S609 YES), the band compression by the orthogonal multiplexing is carried out for that location (S610). In the case where the count number is i, it is compressed to i/2+1 (GB). The new channels for the micro-cell are generated and assigned to the band vacated by this compression (S611).

In this way, the assignment at the macro-cell is carried out according to the frequency channel search table T3, so that the macro-cell region is in a state in which the order of being used at the micro-cell in the case of carrying out the partition shifting is maintained even on the partition left side. Also, after the packing, it becomes a state in which the frequency channels in use are arranged on the left side of the micro-cell search table. By carrying out the packing of the frequency channels simultaneously with the channel release in this way, the frequency channels assigned to the macro-cell near the partition have a high probability of being "vacant", so that it becomes possible to utilize the frequency channels at the micro-cell immediately at a time of the partition shifting, and it becomes possible to obtain the larger capacity.

Sixth Embodiment

Next, the sixth embodiment of the present invention will be described. In the present embodiment, an exemplary case where the rearrangement and the compression by the multiplexing of the frequency channels in each embodiment described above are applied to the variable spreading-orthogonal frequency code multiplexing (VSF-OFCDM: Variable Spreading Factor-Orthogonal Frequency Code Division Multiplexing) transmission scheme which is the fourth generation communication scheme will be described. In this VSF-OFCDM, the information symbol is divided on a plurality of frequency axes, and the information symbol is transmitted by spreading it by a spread code of a variable spreading rate which is assigned to each radio mobile station.

Figure 29:
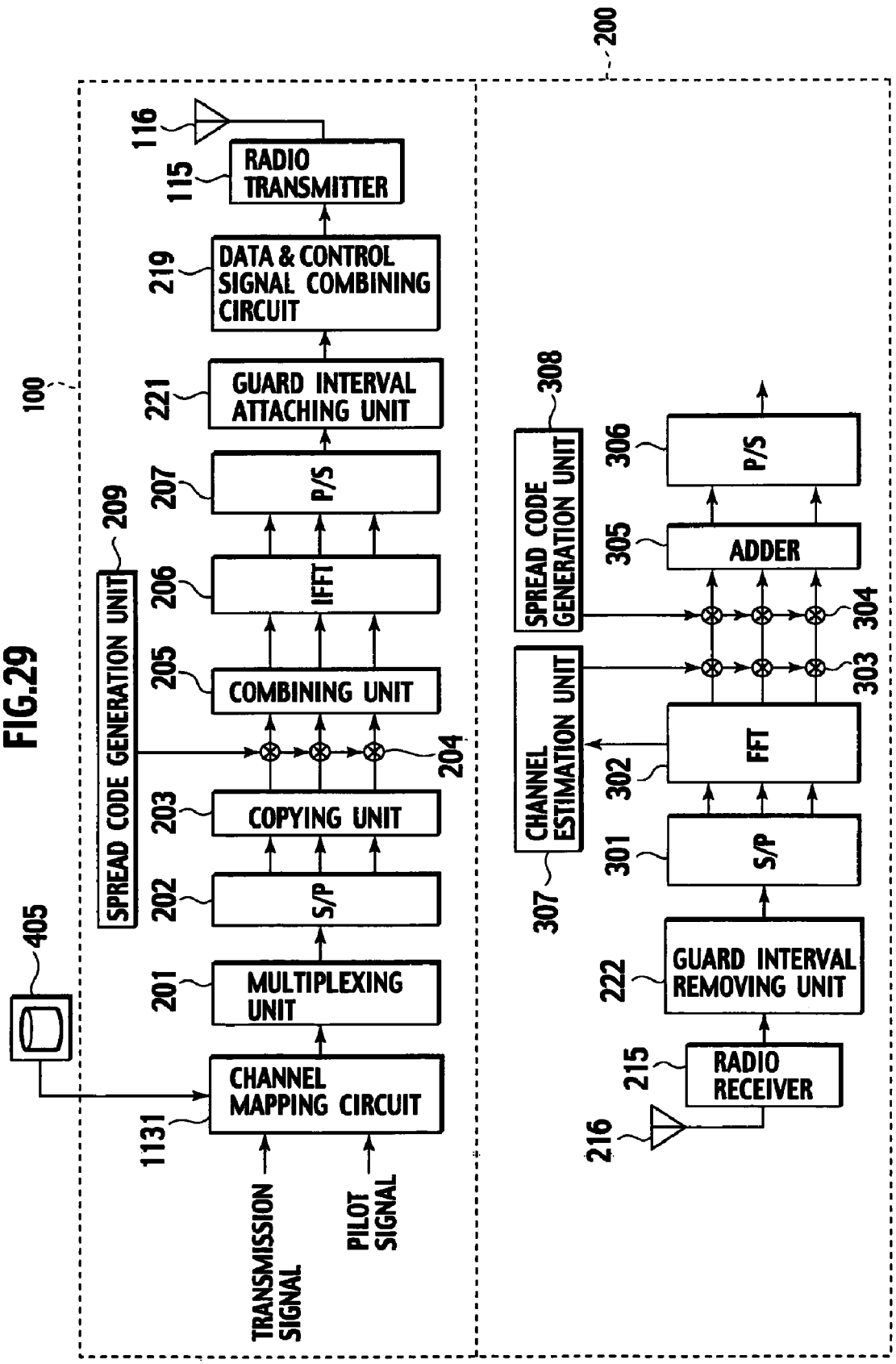
FIG. 29 is a block diagram showing an internal configuration of a radio device according to the sixth embodiment.

The transmission device according to the present modified embodiment has, as shown in FIG. 29, at the transmission unit 100, a multiplexing unit 201 for multiplexing the transmission signals (information symbols) and the pilot signals, a serial/parallel conversion unit 202 for converting the multiplexed signals into parallel signals, a copying unit 230 for copying each signal sequence, a spread code generation unit 209 for generating a spread code, a multiplication unit 204 for multiplying each signal sequence copied by the copying unit 203 with the spread code, a combining unit 205 for combining the multiplied signals, an inverse fast Fourier transform unit (IFFT) 206 for applying the inverse fast Fourier transform to the combined signals, a parallel/serial conversion unit 207 for converting respective transformed signals into a single signal sequence, a guard interval attaching unit 211, a data and control signal combining circuit 219, a radio transmitter 115, and the channel mapping circuit 1131 described above.

The serial/parallel conversion unit 202 is a circuit for converting the serial signals into parallel signals which are a plurality of signal sequences, according to the bandwidth and the number of sub-carriers calculated by the transmission sub-carrier bandwidth control unit, and the converted parallel signals are respectively outputted to the copying unit 203.

The copying unit 203 is a circuit for copying each information symbol of a plurality of information symbol sequences which are serial to parallel converted at the serial/parallel conversion unit 202 as many as the number equal to the sequence length (chip length) of the spread code, and the copied information symbols are arranged on the frequency axis and outputted to the multiplication unit 204 as one set of the information symbol sequence.

The spread code generation unit 209 is a circuit for generating the spread code of a prescribed spreading rate which is assigned to each radio mobile station as many as the number of sub-carriers, according to the spreading rate inputted from the multiplexing control unit. The multiplication unit 204 is a circuit for multiplying each information symbol copied at the copying unit 203 with the spread code generated by the spread code generation unit 209.

The inverse fast Fourier transform unit 206 is a circuit for carrying out the inverse fast Fourier transform on a plurality of signal sequences inputted from the combining unit 205, according to the bandwidth and the number of sub-carriers calculated by the transmission sub-carrier bandwidth control unit, and each transformed signal sequence is outputted to the parallel/serial conversion unit 207.

The parallel/serial conversion unit 207 is a circuit for converting a plurality of signal sequences inputted from the inverse fast Fourier transform unit 206 into serial signals which are a single signal sequence, according to the bandwidth and the number of sub-carriers calculated by the transmission sub-carrier bandwidth control unit. The guard interval attaching unit 221 inserts the guard interval into the signals converted by the parallel/serial conversion unit 207.

The channel mapping circuit 1131 is the same as that of each embodiment described above, which is a circuit for searching the continuous frequency channels within the system band according to the search table provided at the control station 405, and carrying out the rearrangement of the frequency channels according to this search result.

Then, at the transmission unit 100, the data sequences rearranged by the channel mapping circuit 1131 are multiplexed by the multiplexing unit 201, and the multiplexed transmission signals are converted into the parallel signals formed by a plurality of signal sequences by the serial/parallel conversion unit (S/P) 202, and after carrying out the copying processing at the copying unit 203, each signal sequence is multiplied with the spread code generated by the spread code generation unit 209.

Next, after applying the inverse Fourier transform on these combined signals at the inverse fast Fourier transform unit (IFFT) 206, they are converted into serial signals formed by a single signal sequence by the parallel/serial conversion unit (P/S) 207, the guard interval is inserted into these serial signals by the guard interval attaching unit 221, each parameter calculated by the transmission sub-carrier bandwidth control unit is combined by the data and control signal combining circuit 219, and the OFDM signals are transmitted.

On the other hand, as shown in FIG. 29, the transmission device according to the present embodiment has a radio receiver 215, a guard interval removing unit 222, a serial/parallel conversion unit 301, a fast Fourier transform unit 302, a channel estimation unit 307, a spread code generation unit 308, multiplication units 303 and 304, an adder 305, and a parallel/serial conversion unit 306.

The serial/parallel conversion unit 301 is a circuit for converting the serial signals into parallel signals which are a plurality of signal sequences, according to the bandwidth and the number of sub-carriers calculated by the received sub-carrier bandwidth control unit, and the converted parallel signals are respectively outputted to the fast Fourier transform unit 302. The parallel/serial conversion unit 306 is a circuit for converting a plurality of signal sequences inputted from the adder 305 into the serial signals which are a single signal sequence, according to the bandwidth and the number of sub-carriers calculated by the received sub-carrier bandwidth control unit.

The channel estimation unit 307 is a circuit for extracting the pilot signals from the signals transformed by the fast Fourier transform unit 302, and estimating the channel variation value of each sub-carrier according to these pilot signals. Also, the multiplication units 303 and 304 are circuits for guaranteeing the variation of each sub-carrier according to the variation value estimated by the channel estimation unit 307 and multiplying the spread code generating by the spread code generation unit 308.

Then, at the reception unit 200, the guard interval is removed by the guard interval removing unit 222 from the received OFDM signals. Next, the data sequence from which the guard interval is removed is converted into parallel signals formed by a plurality of signal sequences by the serial/parallel conversion unit (S/P) 301, and the Fourier transform is applied to each signal sequence at the fast Fourier transform unit (FFT) 302. After that, each transformed signal is multiplied with the variation value estimated by the channel estimation unit 307 and the spread code generated by the spread code generation unit, and they are converted into the serial signals formed by a single signal sequence by the parallel/serial conversion unit (P/S) 306, and these serial signals are outputted as the demodulated signals.

According to such a transmission device according to the present embodiment, the wide band system of the OFDM scheme and the narrow band system can be made to coexist in the identical frequency band, so that by using two schemes in the same frequency band together, the new generation communication scheme can be made to coexist, and in the case of changing the communication scheme, a smooth transition in stages from the previous scheme to the new scheme can be made.

As described above, according to the radio communication system and the radio communication method of this invention, by enlarging the unused channels by rearranging the frequency channels in use and compressing them by the orthogonal multiplexing, it is possible to utilize the frequency channels in the band efficiently, in the various communication schemes such as the digital cellular system, the orthogonal frequency division multiplexing scheme system CDMA scheme, etc.

Seventh Embodiment (Configuration of the Transmission System)

Figure 30:
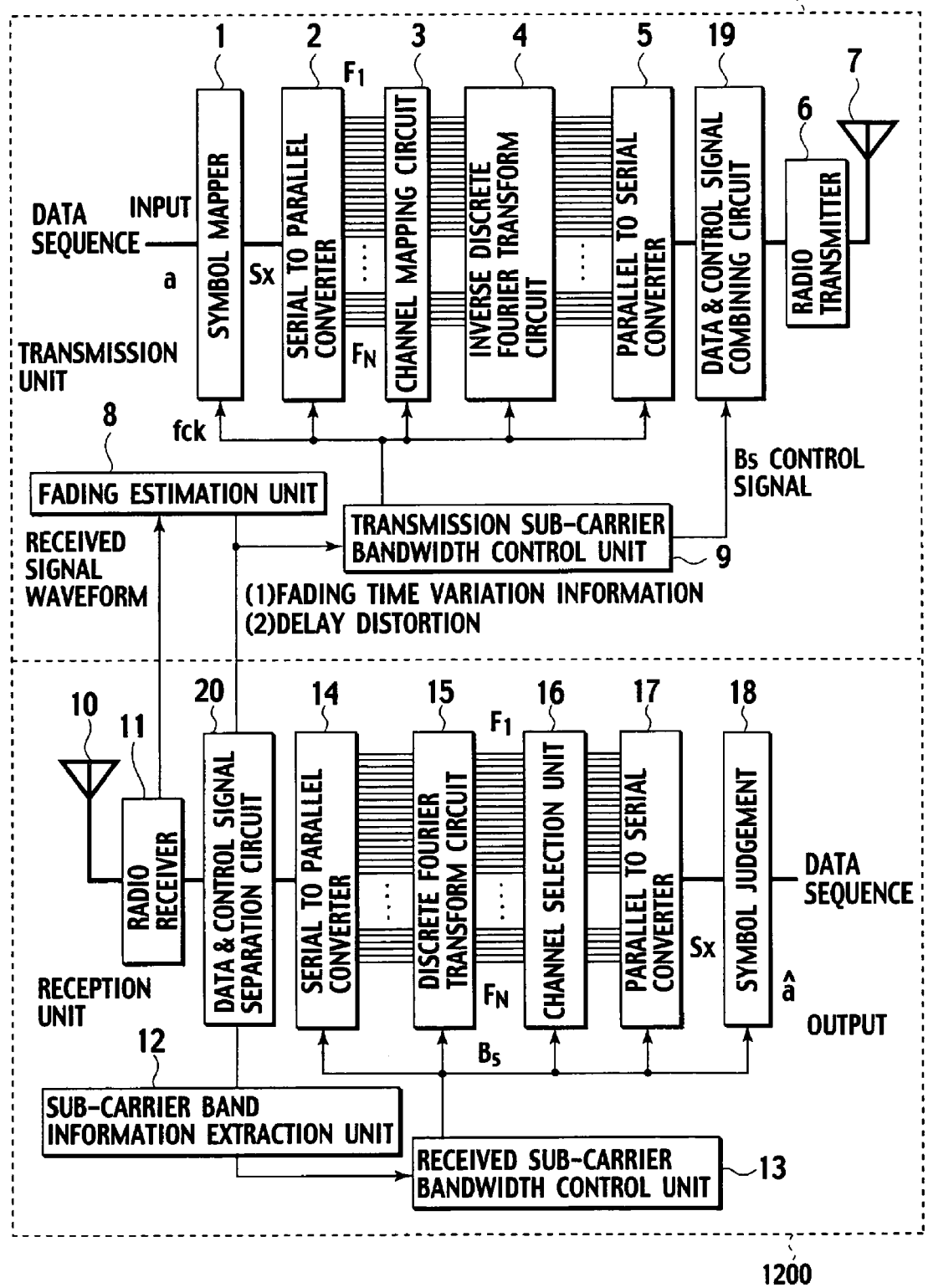
FIG. 30 is a block diagram showing an internal configuration of a transmission device according to the seventh embodiment.

The seventh embodiment of the radio communication system according to the present invention will be described. FIG. 30 is a block diagram showing an internal configuration of the transmission device used in the radio communication system according to the present embodiment. Note that, in the present embodiment, an exemplary case of applying the transmission device to the radio base station in the cellular mobile communication system will be described, but the present invention is not limited to this, and can be applied to the other communication or broadcasting system such as the digital broadcasting using the OFDM transmission, for example.

As shown in FIG. 30, the transmission device according to the present invention is a device for carrying out the control to make the sub-carrier band of the downward channel data signals from the radio base station variable according to the state of the propagation path, and more specifically, has a transmission unit 1100 for transmitting by the orthogonal frequency division multiplexing modulation scheme and a reception unit 1200 for enabling the acquisition of a fading (radio wave propagation path) information from the downward channel.

(1) Configuration of the Transmission Unit

The transmission unit 1100 has a symbol mapper 1, a serial to parallel converter 2, a channel mapping circuit 3, an inverse discrete Fourier transform circuit 4, a parallel to serial converter 5, a radio transmitter 6, a transmission antenna 7, a fading estimation unit 8, and a transmission sub-carrier bandwidth control unit 9.

The symbol mapper 1 is a module for carrying out the digital modulation when there is an input (speech call origination, packet transmission) of data from some user. Here, when the inputted data is a, the digital modulation such as QPSK, QAM, etc., for example is carried out for this inputted data a at the symbol mapper 1. By this digital modulation, the information bit sequence is converted into a complex symbol sequence $S_x$ ($S_0$, $S_1$, $S_2$, $S_3$).

The serial to parallel converter 2 is a module for branching the complex symbol sequence $S_x$ ($S_0$, $S_1$, $S_2$, $S_3$) into a plurality of channels. At this point, the number of channels to be branched (which is assumed to be M here) is determined by the transmission sub-carrier bandwidth control unit 9.

In the present embodiment, the fading information for determining the sub-carrier width optimum for the downward channel is extracted from the upward channel by the radio receiver 11. Namely, the control for branching into a plurality of channels ($C_1$, $C_2$, ... $C_M$) at the transmission sub-carrier bandwidth control unit 9 is such that the waveform information is taken out from the received signals received at the radio receiver 11 of the reception unit 1200, the fading information in the upward channel is sent to the fading estimation unit 8, the sub-carrier bandwidth of the downward channel which has little influence of the fading is calculated according to this fading information, and the clock frequency conversion is carried out such that it becomes this bandwidth.

Note that, the downward channel transmitted by the transmission device and the upward channel to obtain the information here are in many cases different in the frequency division. The fading has its cause in the propagation distance and the frequency of the radio base station and the radio mobile station, and the upward and downward channel frequency division in the cellular communication such as PDC is less than or equal to 130 MHz, so that the difference in the influence of the fading is small.

In the present embodiment, from the fading information of the upward channel, at the fading estimation unit 8, the optimum sub-carrier bandwidth Bs is determined according to (1) the fading time variation information and (2) the delay distortion information. Then, at the transmission sub-carrier bandwidth control unit 9, the clock oscillation frequency for outputting this optimum sub-carrier bandwidth Bs is set as fck. Describing it in detail, at the transmission sub-carrier bandwidth control unit 9, the control to generate the clock oscillation frequency fck such that the bandwidth of each sub-carrier becomes Bs is carried out, and this clock frequency fck information is sent respectively to the serial to parallel converter 2, the channel mapping circuit 3, the inverse discrete Fourier transform circuit 4, and the parallel to serial converter 5. The conversion for carrying out each orthogonal frequency division multiplexing transmission is carried out, and it is transmitted.

Here, the control information regarding the optimum sub-carrier bandwidth will be described in detail. As shown in FIG. 30, from the received signal waveform extracted from the radio receiver 11, at the fading estimation unit 8, the fading time variation information and the waveform distortion information are calculated, and from this fading information, at the transmission sub-carrier bandwidth control unit 9, the optimum sub-carrier width is determined, and the clock frequency fck information is sent to the serial to parallel converter 2, the channel mapping circuit 3, the inverse discrete Fourier transform circuit 4, and the parallel to serial converter 5.

Also, at the receiving side, this sub-carrier bandwidth control information for carrying out each conversion operation in this sub-carrier bandwidth is sent from the transmission sub-carrier bandwidth control unit 9 to the data and control signal combining circuit 19. At the data and control signal combining circuit 19, the information data sent from the parallel to serial converter 5 and this sub-carrier bandwidth control information sent from the transmission sub-carrier bandwidth control unit 9 are combined, and simultaneously transmitted to the receiving side.

Figure 31:
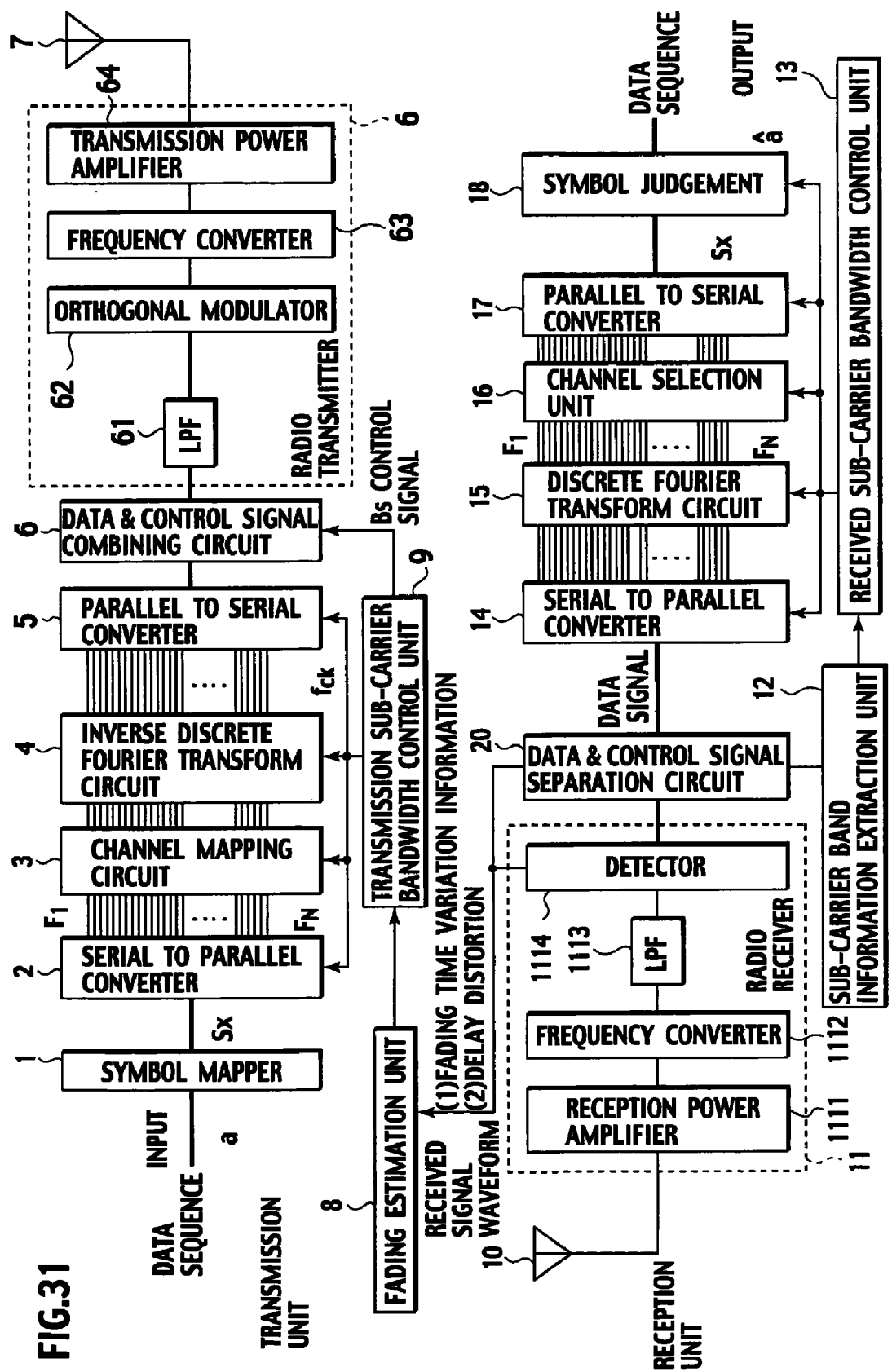
FIG. 31 is a block diagram showing in detail a configuration of a radio transmitter provided at a transmission unit and a reception unit according to the seventh embodiment.

FIG. 31 is a block diagram showing in detail a configuration of the radio transmitter 6 provided in the transmission unit 1100. As shown in FIG. 31, the radio transmitter 6 comprises an LPF 61, an orthogonal modulator 62, a frequency converter 63, and a transmission power amplifier 64.

In order to transmit the baseband continuous signals outputted from the parallel to serial converter 5 and the optimum sub-carrier band control information connected from the transmission sub-carrier bandwidth control unit 9 simultaneously at the downward channel, these signals are filter processed by the LPF 61 through the data and control signal combining circuit 19, converted into the intermediate frequency by the orthogonal modulator 62, and converted into the RF frequency band used in the system by the frequency converter 63, and the amplification for the purpose of the transmission is carried out by the transmission power amplifier 64.

(2) Configuration of the Reception Unit 1200

On the other hand, the reception unit 1200 has, as shown in FIG. 30, a reception antenna 10, a radio receiver 11, a received sub-carrier bandwidth control unit 13, a serial to parallel converter 14, a discrete Fourier transform circuit 15, a channel selection unit 16, a parallel to serial converter 17, and a symbol judgement 18.

In such a reception unit 1200, the signals transmitted from the other device are received at the reception antenna 10, and the continuous data signals converted into the baseband signals at the radio receiver 11 are serial to parallel converted at the symbol time interval at the serial to parallel converter 14.

Here, a plurality of sub-carrier signal components are extracted from these output signals at the discrete Fourier transform circuit 15. At this point, they are branched into all frequency channels ($F_1$, $F_2$, $F_3$, ... $F_N$) of as many as the maximum sub-carrier number N in the case of using the conceivably narrowest band sub-carriers, but the channels by which the information data are actually conveyed are channels of a part of the all channels, so that by the channel selection means 16 for selectively outputting only a group of channels containing the information destined to the own station, only a group of channels ($C_1$, $C_2$, $C_3$, ... $C_M$) containing the information are selected. In other words, N is a value less than or equal to M, and usually M=N/2, N/3, N/4 ... etc., which is determined by the Bs width. A single or plurality of sub-carrier channel signals which are the output are serial to parallel converted to output the complex symbol sequence with respect to a desired user by the parallel to serial converter 17, and baseband digital demodulated at the symbol judgement 18.

FIG. 31 is a block diagram showing an exemplary configuration of the radio receiver 11 provided in the reception unit 1200. As shown in FIG. 31, the radio receiver 11 comprises a reception power amplifier 1111, a frequency converter 1112, an LPF 1113, and a detector 1114. At the reception power amplifier 1111, the signals with the level dropped due to the fading are amplified, and converted from the RF frequency to the IF frequency by the frequency converter 1112.

These data are filtered by the LPF 1113, and converted into the baseband frequency at the detector 1114. Then, the baseband continuous signals transmitted by the upward channel and the optimum sub-carrier band control information connected from the transmission sub-carrier bandwidth control unit 9 that is transmitted simultaneously by the upward channel are separated, and the baseband continuous signals are sent to the serial to parallel converter 14, the optimum sub-carrier band control information is sent to the fading estimation unit 8, and the fading information is sent to the transmission unit 1100.

(Effects)

According to such a transmission device according to the seventh embodiment, the fading at the upward channel is estimated from the signals received at the upward channel, and the sub-carrier bandwidth at the downward channel is controlled according to this estimation result, so that the improvement of the transmission characteristics can be realized.

Eighth Embodiment

Figure 32:
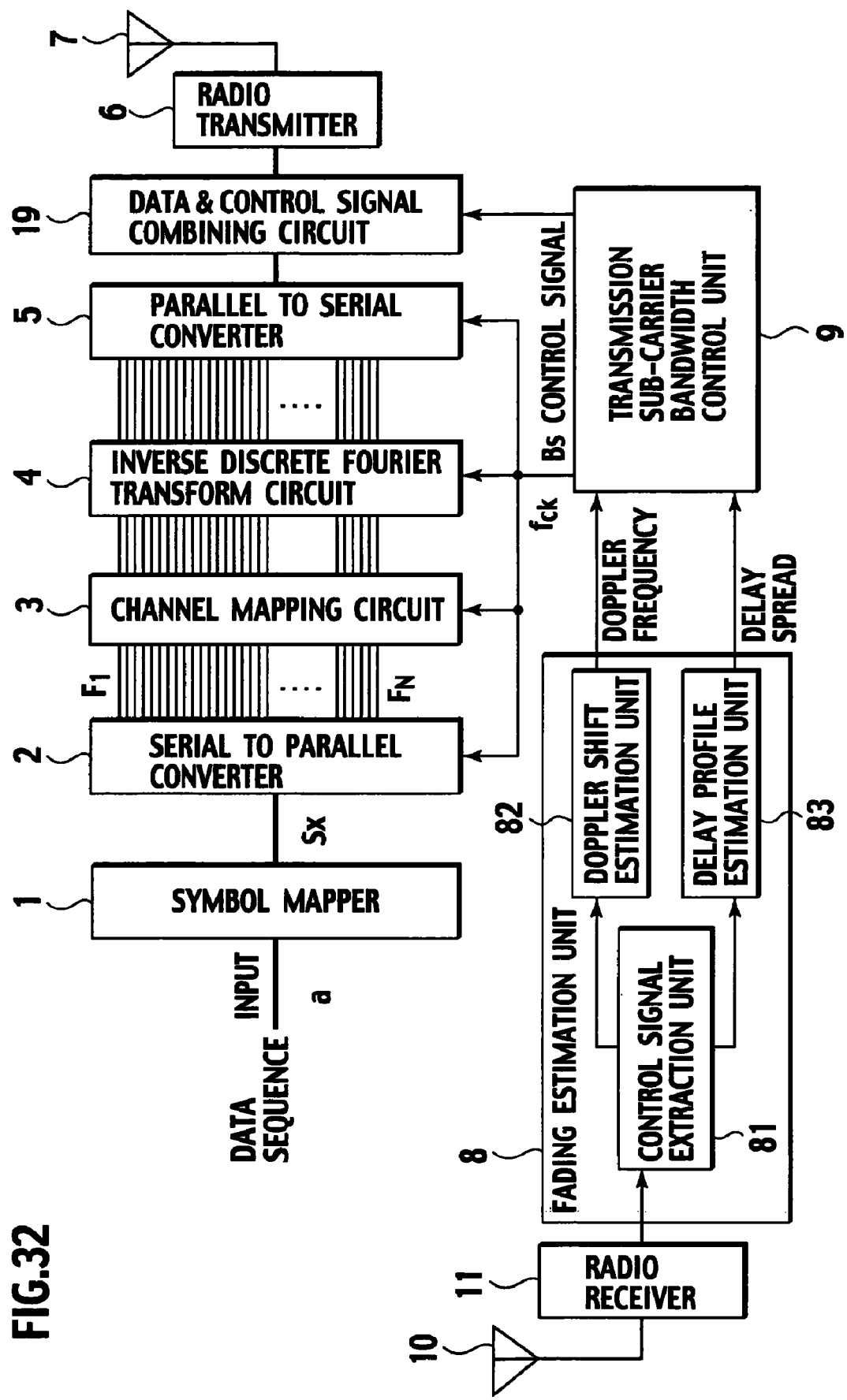
FIG. 32 is a block diagram showing an internal configuration of a transmission device according to the eighth embodiment.

Next, the eighth embodiment of the present invention will be described. FIG. 32 is a block diagram showing an internal configuration of the transmission device according to the present embodiment. The present embodiment has the feature that the fading estimation unit 8 in the seventh embodiment described above is provided with a Doppler shift estimation and a delay profile estimation function. Note that, in FIG. 32, in the transmission device according to the seventh embodiment described above, a portion related to the Doppler shift estimation and a delay profile estimation function is mainly shown.

Namely, similarly as in the seventh embodiment, the transmission device has the transmission unit 110 formed by the symbol mapper 1, the serial to parallel converter 2, the channel mapping circuit 3, the inverse discrete Fourier transform circuit 4, the parallel to serial converter 5, the radio transmitter 6, the transmission antenna 7, the fading estimation unit 8 and the transmission sub-carrier bandwidth control unit 9, and the reception unit 1200 formed by the reception antenna 10, the radio receiver 9, the sub-carrier band information extraction means 12, the received sub-carrier bandwidth control means 13, the serial to parallel converter 14, the discrete Fourier transform circuit 15, the channel selection means 16, the parallel to serial conversion means 17, and the symbol judgement 18.

Then, in particular, the fading estimation unit 8 according to the present embodiment has a control signal extraction unit 81 for extracting control signals from the received signals received by the radio receiver 9, a Doppler shift estimation unit 82 for estimating the Doppler shift according to the extracted control signals, and a delay profile estimation unit 83 for estimating a delay profile according to the control signals.

(Handling of the Fading Information)

The band variable processing operation of the transmitting side in the present embodiment will be described. Within the fading estimation unit 8, the sub-carrier widest band Bs_w information obtained from the delay profile estimation unit 83 and the sub-carrier narrowest band Bs_n information obtained from the Doppler shift estimation unit 82 are respectively sent to the transmission sub-carrier bandwidth control unit 9, and at the transmission sub-carrier bandwidth control unit 9, the information transmission bit rate Bs per sub-carrier which hardly receives the fading is determined. This information transmission bit rate information is sent to the data and control signal combining circuit 19.

As the method for calculating the sub-carrier band from the fading information, the following examples are noted.

The Doppler shift $f_D$ is obtained by the following formula from the average fade duration.

$$f_D = \frac{1}{\sqrt{2\pi\tau}} \frac{\sqrt{2b_\theta}}{R_s} \left( \exp\left(\frac{R s^2}{2b_\theta}\right) - 1 \right)$$

Note that, in the above formula, $\tau$ is the average fade duration, $b_0$ is the average reception power, Rs is the regulation level.

Then, when the transmission frequency is 900 MHz, the moving speed v is 50 km/h, the Doppler frequency $f_D$ with respect to the average fade duration for the level lower by 20 dB than the reception power corresponds to 45.5 Hz.

It is known that the orthogonalized transmission is possible if the maximum Doppler frequency $f_D$ falls within approximately 10% of the occupied band Bs. Consequently, there is a need for the occupied band Bs to be the band of 455 Hz or more.

Also, the delay spread S is expressed as the standard deviation of the power density function $P(\tau)$, and obtained from the following formula.

$$S = \sqrt{\frac{1}{P_m} \int_\theta^3 \tau^2 P(\tau) d\tau - T_D^2}$$

Note that, in the above formula, Pm is the reception power, $\tau$ is the delay time, and $T_D$ is the average delay.

Then, the correlation bandwidth Bc is obtained from the delay spread S by the following formula.

$$B_c = \frac{1}{2\pi S}$$

In other words, in the case where the sub-carrier frequency band is narrower than this correlation bandwidth Bc, the influence of the delay profile will not be received. The sub-carrier clock oscillation frequency fck is determined according to such an information, and the bandwidth per sub-carrier is obtained, and this is sent to the data and control signal combining circuit 19 as the control information.

Note that, in the present embodiment, the guard interval Tg is set such that it becomes less than or equal to the maximum delay time $\tau$.

Ninth Embodiment

Figure 33:
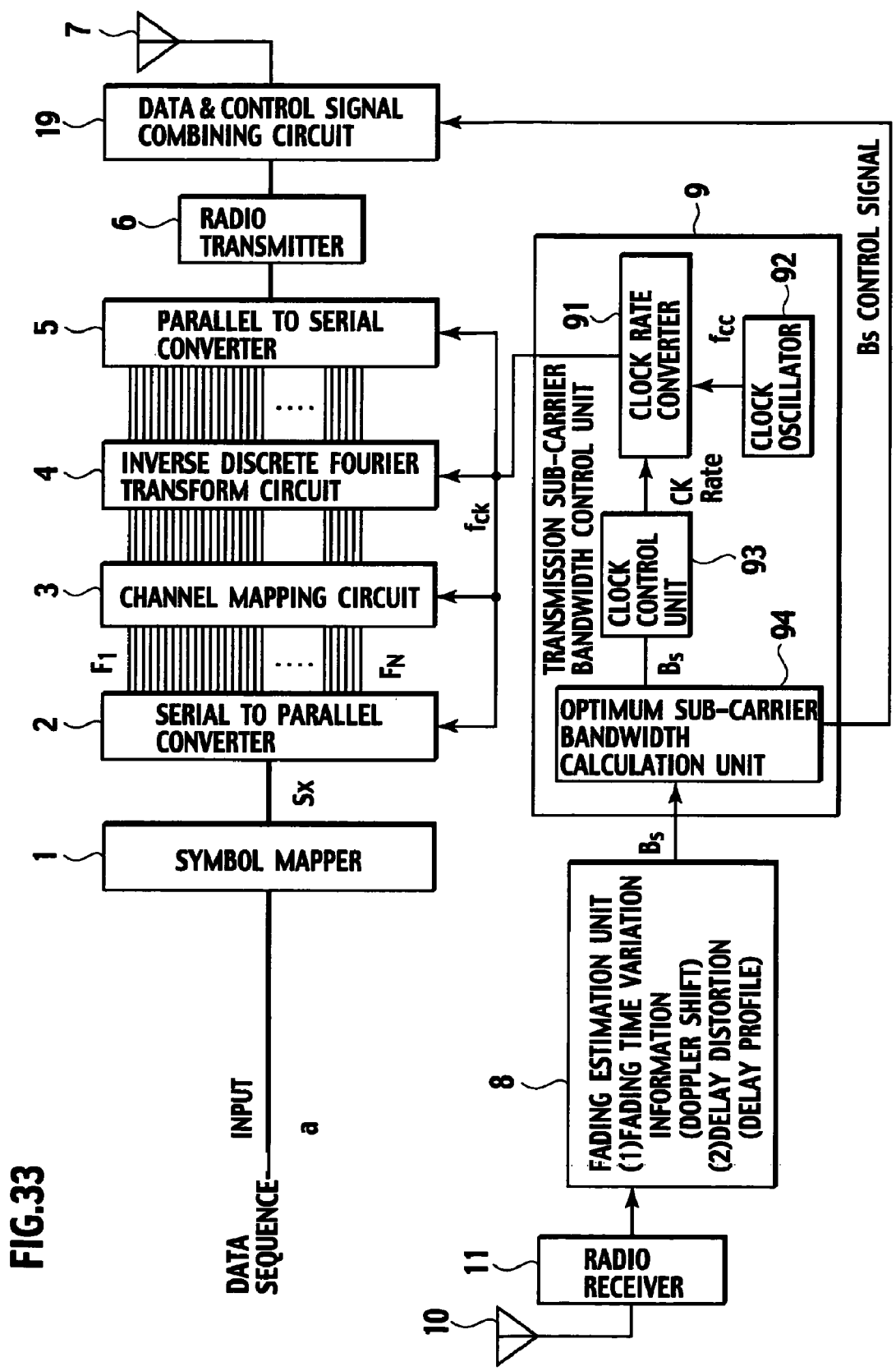
FIG. 33 is a block diagram showing an internal configuration of a transmission device according to the ninth embodiment.

Next, the ninth embodiment of the present invention will be described. FIG. 33 is a block diagram showing an internal configuration of the transmission device according to the present embodiment. The present embodiment has the feature that the transmission sub-carrier bandwidth control unit 9 in the seventh embodiment and the eighth embodiment described above is provided with a function for controlling the sub-carrier band variably by controlling the clock rate. Note that, in FIG. 33, in the transmission device according to the seventh embodiment and the eighth embodiment described above, a portion related to the sub-carrier band variable control function is mainly shown.

Namely, similarly as in the seventh embodiment and the eighth embodiment, the transmission device has the transmission unit 110 formed by the symbol mapper 1, the serial to parallel converter 2, the channel mapping circuit 3, the inverse discrete Fourier transform circuit 4, the parallel to serial converter 5, the radio transmitter 6, the transmission antenna 7, the fading estimation unit 8 and the transmission sub-carrier bandwidth control unit 9, and the reception unit 1200 formed by the reception antenna 10, the radio receiver 9, the sub-carrier band information extraction means 12, the received sub-carrier bandwidth control means 13, the serial to parallel converter 14, the discrete Fourier transform circuit 15, the channel selection means 16, the parallel to serial conversion means 17, and the symbol judgement 18.

Then, in particular, in the present embodiment, the transmission sub-carrier bandwidth control unit 9 has a clock rate converter 91, a clock oscillator 92, a clock control unit 93, and an optimum sub-carrier bandwidth calculation unit 94.

(Sub-Carrier Band Variable Control)

In the present embodiment, at the transmission sub-carrier bandwidth control unit 9 of the transmission unit 1100, according to the fading information given from the fading estimation unit 8, the optimum sub-carrier bandwidth Bs is calculated at the optimum sub-carrier bandwidth calculation unit 94.

Describing it in detail, the clock frequency to be a reference in order to change it to the optimum sub-carrier occupied bandwidth Bs is converted at the clock control unit 93. Namely, the clock rate CK Rate for deriving Bs is determined at the clock control unit 93, and the frequency conversion control command using this CK Rate is outputted to the clock rate converter 91.

Note that, in the present embodiment, it is converted from the clock frequency fcc generated by the clock oscillator 92 to the clock carrier frequency fck by default. For example, it is fck=fcc/2, fcc/3, . . . or fck=2*fcc, 3*fcc, . . . etc. The clock output terminal of the clock rate converter 91 is connected to the respective clock terminals of the serial to parallel converter 2, the channel mapping circuit 3, the inverse discrete Fourier transform circuit 4, and the parallel to serial converter 5, and outputs the information for the control of each portion. In addition, for the sake of the serial to parallel conversion at a time of receiving, this clock rate information is combined with the data signals as the Bs control signal at the data and control signal combining circuit 19, and transmitted to the receiving side.

Tenth Embodiment

Next, the tenth embodiment of the present invention will be described. The present embodiment has the feature that the channel mapping circuit 3 in the ninth embodiment described above is provided with a sub-carrier frequency channel assignment function which makes the transmission band variable. FIG. 34 shows the operation of the sub-carrier frequency channel assignment which makes the transmission band variable, in the channel mapping according to the present embodiment.

As shown in FIG. 34(a), the channel mapping circuit 3 according to the present embodiment has a mapping unit 31 for executing the channel mapping, and a required sub-carrier number control unit 32 for controlling the required number of sub-carriers of the mapping unit 31 according to the fading information.

The mapping unit 31 assigns sub-carrier channels ($C_1, C_2, C_3, \ldots C_M$) as many as to be assigned to a desired user to a group of continuous sub-carrier channels ($F_1, F_2, F_3, \ldots F_N$) which are adjacent within the Freq band, by using the required sub-carrier number N control information from the required sub-carrier number control unit 32. Also, with respect to the sub-carrier frequency channels not to be sent which are distributed outside the Freq band, the mapping unit 31 has a zero insertion circuit function for connecting to the ground which sets the outputs of the corresponding sub-carrier frequency channels to 0.

(Channel Mapping)

Then, in the present embodiment, as shown in FIG. 34(b), it is set as the necessary occupied band Freq of a desired user, and at the channel mapping circuit 3, the sub-carrier channels ($C_1, C_2, C_3, \ldots C_M$) as many as to be assigned to a desired user are assigned to a group of continuous sub-carrier channels ($F_1, F_2, F_3, \ldots F_N$) which are adjacent within the Freq band, by using the required sub-carrier number N control information from the required sub-carrier number control unit 32. Also, the sub-carrier frequency channels not to be sent which are distributed outside the Freq band are connected to the ground which sets the outputs of the corresponding sub-carrier frequency channels ($F_{M+1}, \ldots F_N$) to 0.

Then, all frequency channels ($F_1, F_2, F_3, \ldots F_N$) including the parallel output signals ($C_1, C_2, C_3, \ldots C_M$) after the mapping are converted into the time series transmission signals by the inverse discrete Fourier transform circuit 4, similarly as the embodiments described above.

Eleventh Embodiment

Figure 35:
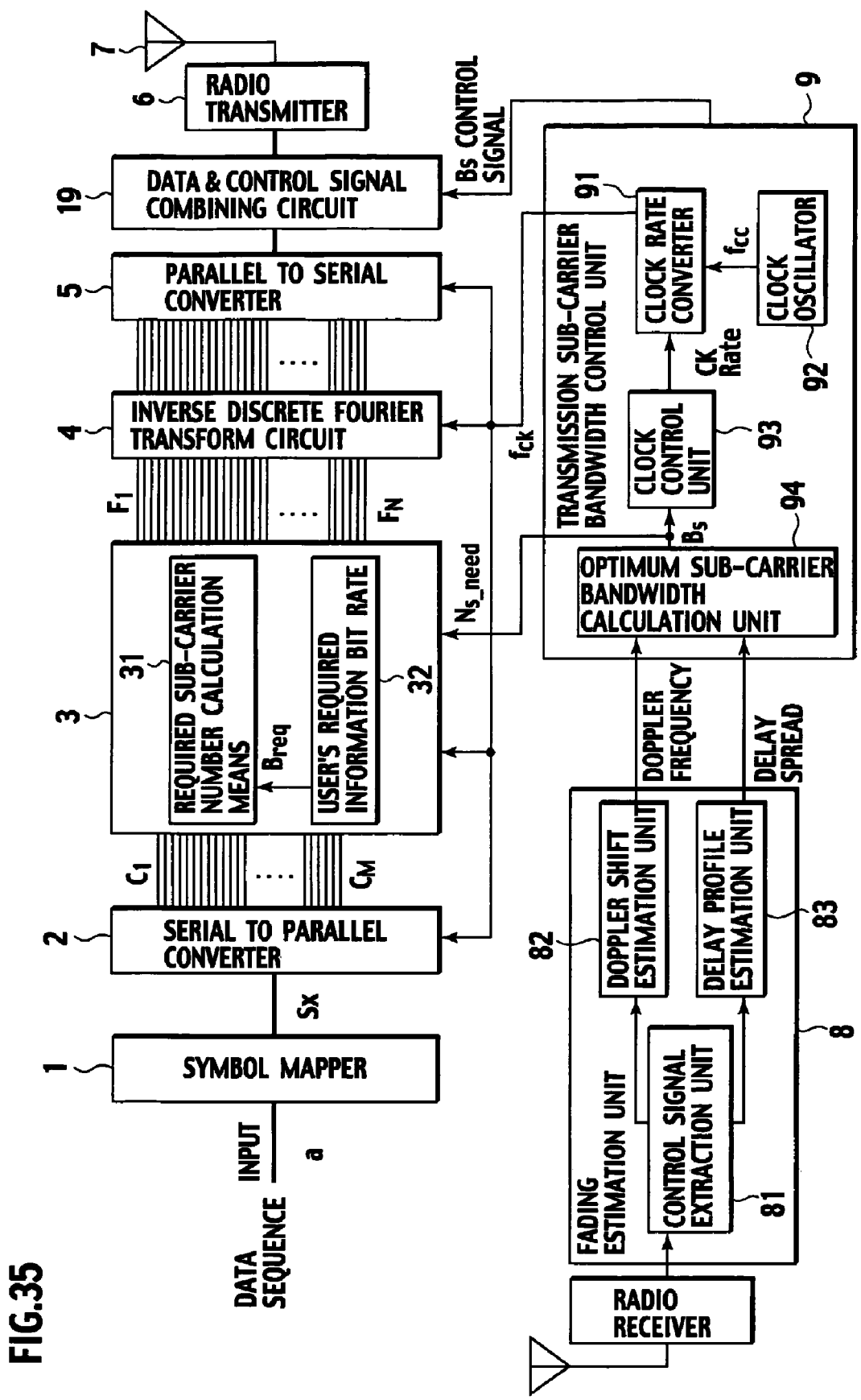
FIG. 35 is a block diagram showing in detail an internal configuration of a channel mapping circuit in the eleventh embodiment.

Next, the eleventh embodiment of the present invention will be described. The present embodiment has the feature that the channel mapping circuit 3 in the tenth embodiment described above is provided with a required sub-carrier number calculation means 31 and a user required information bit rate estimation unit 32, as shown in FIG. 35.

The user required information bit rate calculation unit 32 is a module for calculating the required information bit transmission speed a of the user, according to the inputted data, and the required sub-carrier control unit 32 is a module for calculating the total bandwidth Ba necessary for the user according to the required information bit transmission speed a of the user, and dividing it in units of the optimum sub-carrier bandwidth Bs.

Then, in the case where the required sub-carrier control unit 32 and the user required information bit rate calculation unit 32 calculate the total bandwidth Ba necessary for this user from the required information bit transmission speed a of the user and divide it in units of the optimum sub-carrier bandwidth Bs, the channel mapping circuit 3 carries out the assignment of the frequency channels corresponding to the required sub-carrier number Ns, according to the required sub-carrier number Ns (=Ba/Bs) information to be used by the user which becomes necessary.

Note that the required sub-carrier number to be used by the user can also be obtained as Nsystem (=Bsystem/Bs) information, according to the characteristics of the system. In this case, the channel mapping circuit 3 carries out the assignment of the frequency channel corresponding to the required sub-carrier number Nsystem.

Twelfth Embodiment

Next, the twelfth embodiment of the present invention will be described.

(Configuration of the Transmission Device)

Figure 36:
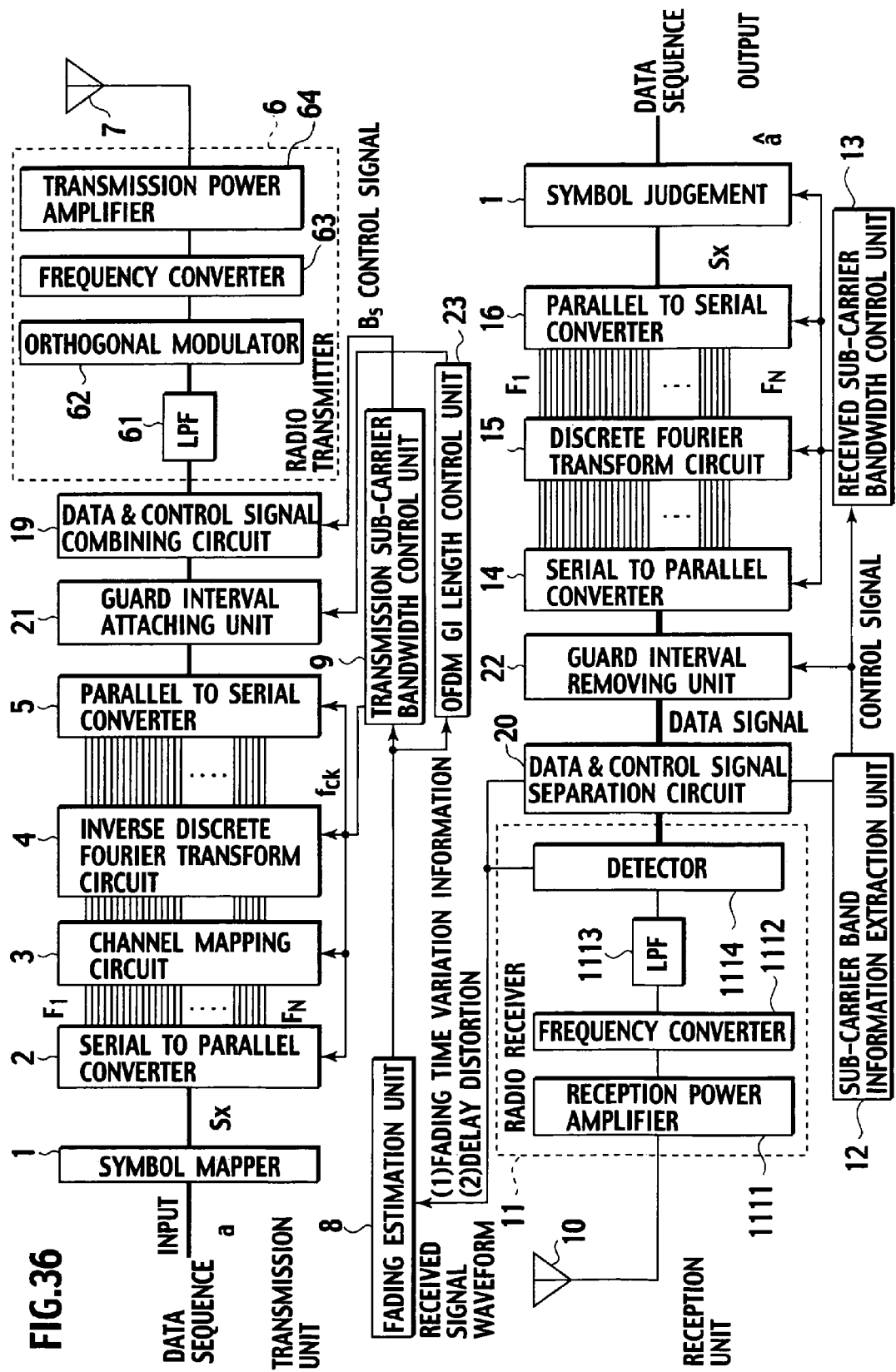
FIG. 36 is a block diagram showing an internal configuration of a transmission device according to the twelfth embodiment.

FIG. 36 is a block diagram showing an internal configuration of the transmission device according to the present embodiment. As shown in FIG. 36, the transmission device according to the present invention also comprises the transmission unit 1100 and the reception unit 1200, similarly as in the above described embodiments.

(1) Transmission Unit

As shown in FIG. 36, the transmission unit 1100 has the symbol mapper 1, the serial to parallel converter 2, the channel mapping circuit 3, the inverse discrete Fourier transform circuit 4, the parallel to serial converter 5, the radio transmitter 6, the transmission antenna 7, the fading estimation unit 8, and the transmission sub-carrier bandwidth control unit 9. Then, in particular, the transmission 1100 in the present embodiment has a guard interval attaching unit 21 for removing an influence of a delay distortion by attaching a guard interval, and a GI length control unit 23 for calculating an optimum guard interval length regarding the OFDM according to the delay profile extracted at the fading estimation unit 8.

Then, in the transmission unit 1100 of such a configuration, the influence of the delay distortion is removed by attaching the guard interval at the guard interval attaching unit 21 to the baseband OFDM signals multiplexed by the parallel to serial converter 5. At this point, as the guard interval length, the optimum guard interval length calculated by the GI length control unit 23 according to the delay profile extracted at the fading estimation unit 8 is used.

Namely, in the case where the multi-path having the delay spread longer than the guard band length exists and the degradation of the characteristics becomes extremely large, compared with the case of not attaching the guard interval, the transmission speed of the data is lowered as it becomes $1/(1+f_0 Tg)$.

For this reason, in the present embodiment, the optimum guard interval width of the minimum length for maintaining the sufficient length for not receiving the influence due to the delay and improving the frequency utilization efficiency is calculated from the delay profile extracted from the fading information and attached.

(2) Reception Unit

On the other hand, the reception unit 1200 has the reception antenna 10, the radio receiver 11, the fading estimation unit 8, the transmission sub-carrier bandwidth control unit 9, the sub-carrier band information extraction unit 12, the received sub-carrier bandwidth control unit 13, the serial to parallel converter 14, the discrete Fourier transform circuit 15, the channel selection unit 16, the parallel to serial converter 17, the symbol judgement 18, and the guard interval attaching unit 21.

The reception unit of the transmission device of the orthogonal frequency division multiplexing modulation scheme will be described in FIG. 36. It has the reception unit 1200 comprising the reception antenna 10, the radio receiver 11, the sub-carrier band information extraction unit 12, the received sub-carrier bandwidth control unit 13, the serial to parallel converter 14, the discrete Fourier transform circuit 15, the channel selection unit 16, the parallel to serial converter 17, the symbol judgement 18, and the guard interval removing unit 22.

The signals transmitted from the reception device of the orthogonal frequency division multiplexing modulation scheme are received at the reception antenna 10, and the control signals are separated from the continuous data signals converted into the baseband signals at the radio receiver 11. In each case of (1) at a time of communication start, (2) periodically, or (3) at a time of exceeding the error rate level, the received signal waveform is sent to the fading estimation unit 8. According to the fading information, the continuous data signals are serial to parallel converted at the symbol time interval at the serial to parallel converter 14. Here, Here, a plurality of sub-carrier signal components are extracted from these output signals at the discrete Fourier transform circuit 15. At this point, they are branched into all frequency channels ($F_1, F_2, F_3, \ldots F_N$) of as many as the maximum sub-carrier number N in the case of using the conceivably narrowest band sub-carriers, but the channels by which the information data are actually conveyed are channels of a part of the all channels, so that by the channel selection means 16 for selectively outputting only a group of channels containing the information destined to the own station, only a group of channels ($C_1, C_2, C_3, \ldots C_M$) containing the information are selected. In other words, N is a value less than or equal to M, and usually M=N/2, N/3, N/4 . . . etc. (It is determined according to the Bs width.) A single or plurality of sub-carrier channel signals which are the output are serial to parallel converted to output the complex symbol sequence with respect to a desired user by the parallel to serial converter 17, and baseband digital demodulated at the symbol judgement 18.

(Guard Interval Control)

As a timing for changing the guard interval, it is possible to adopt the methods of (1) to (3) enumerated in the following.

(1) At a Time of Communication Start

At a time of communication start, the delay profile is obtained from the received signal waveform at the fading estimation unit 8, and the guard interval larger than the maximum delay time is set at the OFDM GI length control unit 23. From the optimum guard interval length information set here, the optimum guard interval is attached at the guard interval attaching unit 21.

Figure 37:
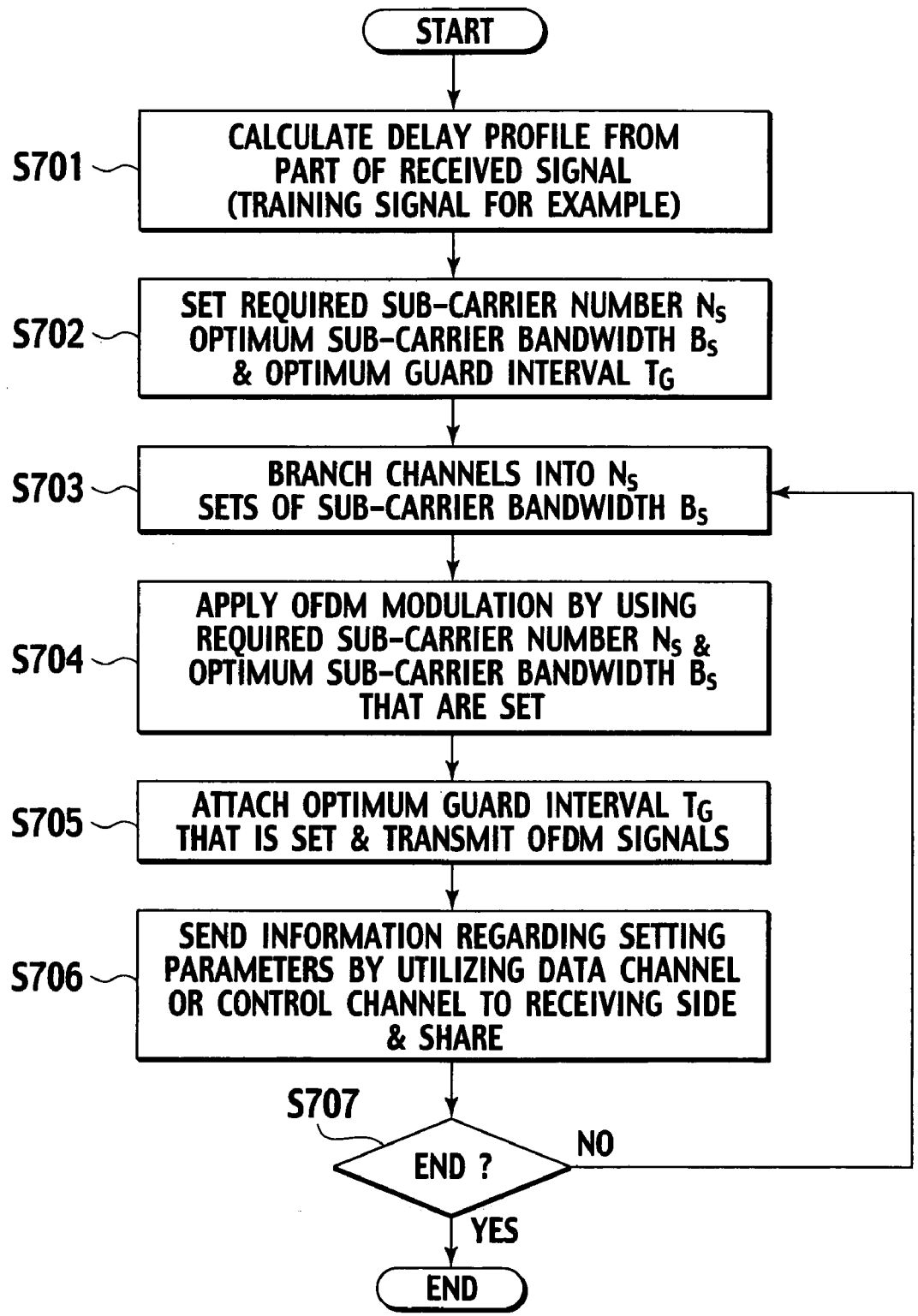
FIG. 37 is a flow chart showing a procedure for setting a guard interval length at a time of communication start in the twelfth embodiment.

Such a method for setting at a time of communication start will be described by using the flow chart of FIG. 37. First, at a time of communication start, the fading information is extracted from the received signal waveform (the received waveform of the training signal portion, for example), and the delay profile and the maximum Doppler frequency are calculated (S701). Next, the required sub-carrier number Ns, the optimum sub-carrier bandwidth Bs, and the optimum guard interval length TG are calculated (S702).

According to the information calculated at these steps S701 and S702, the inputted data are branched into channels of the required sub-carrier number and the optimum sub-carrier bandwidth after the digital modulation (S703), the OFDM modulation is carried out by using the required sub-carrier number Ns and the optimum sub-carrier bandwidth Bs that are set (S704), and the guard interval of the optimum guard interval length $T_G$ is attached to the baseband OFDM signals and transmitted (S705). The setting of the parameters on the transmitting side is constant until a time of the communication end.

Then, by utilizing the data channel or the control channel, the information regarding each setting parameter is sent to the receiving side, and shared between it and the receiving side device (S706). Then, during a time until the communication end, the above described steps S703 to S706 are repeated by the loop processing (S707).

(2) Periodical

Periodically, at every time of the frame change, such as a top or a last of the frame, the delay profile is obtained from the received signal waveform at the fading estimation unit 8, and the guard interval larger than the maximum delay time is set at the OFDM GI length control unit 23. From the optimum guard interval length information set here, the optimum guard interval is attached at the guard interval attaching unit 21.

Figure 38:
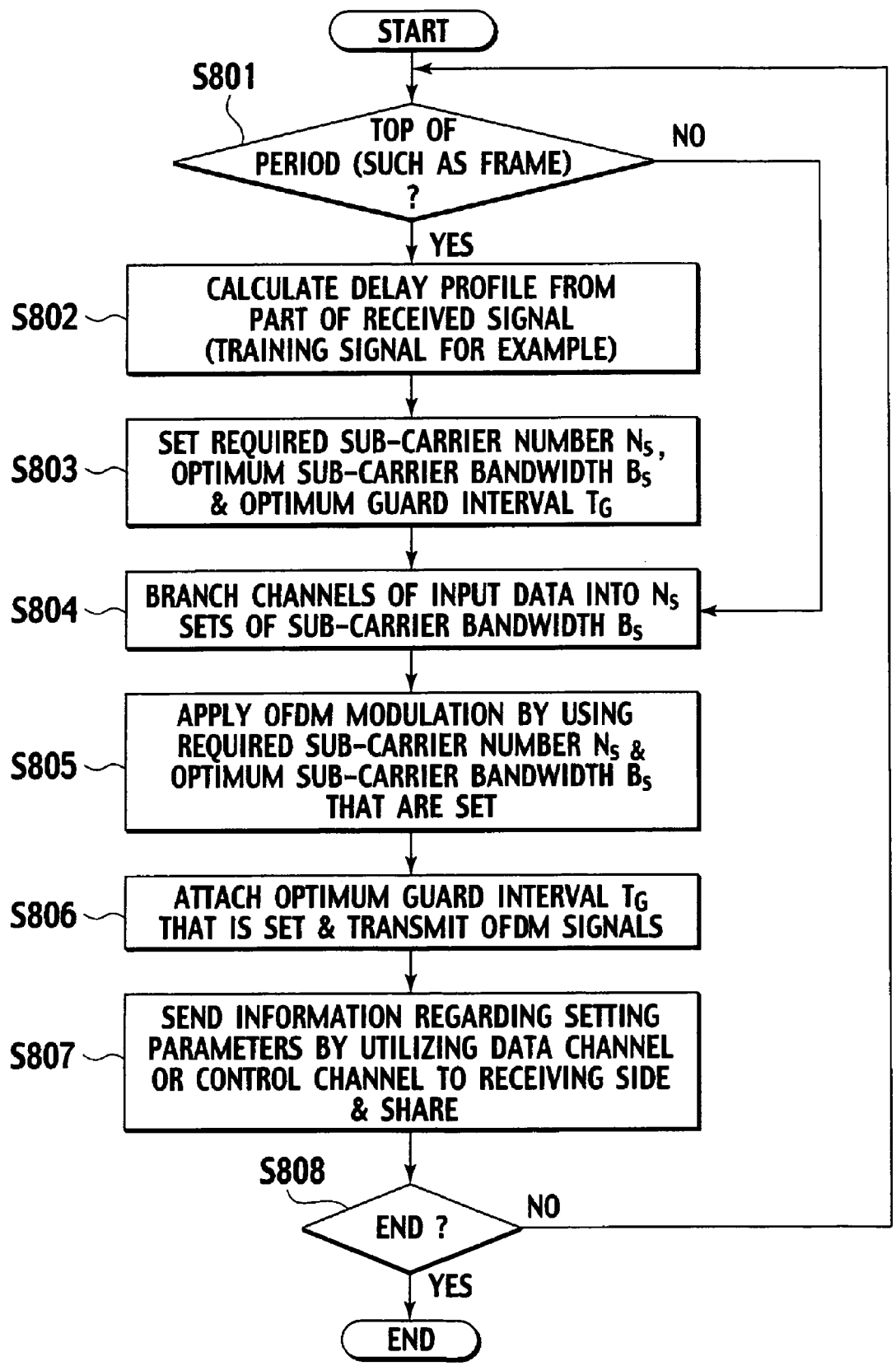
FIG. 38 is a flow chart showing a procedure for periodically re-setting at each time of changing a frame in the twelfth embodiment.

Such a method for re-setting periodically, at every time of the frame change, such as a top or a last of the frame, will be described by using the flow chart of FIG. 38.

First, the received frame is monitored, and the frame change such as a top or a last of the frame is periodically detected (S801). Then, in the case where the frame change is detected, the fading information is extracted from the signal waveform of the receiving side, the delay profile and the maximum Doppler frequency are calculated (S802), and the required sub-carrier number Ns, the optimum sub-carrier bandwidth Bs, and the optimum guard interval length $T_G$ are calculated (S803).

Next, according to these information, the inputted data are branched into channels of the required sub-carrier number Ns and the optimum sub-carrier bandwidth Bs after the digital modulation (S804), the OFDM modulation is carried out by using the required sub-carrier number Ns and the optimum sub-carrier bandwidth Bs that are set (S805), and the guard interval of the optimum guard interval length $T_G$ is attached to the baseband OFDM signals and transmitted (S806).

On the other hand, in the case where the frame change is not detected at the step S801, without executing the above described steps S802 and S803, the channels are branched by using the input data by using the required sub-carrier number Ns, the optimum sub-carrier bandwidth Bs, and the optimum guard interval length $T_G$ that are already set (S804), and the OFDM modulation and the OFDM transmission are carried out (S805, S806).

Then, after the step S806, by utilizing the data channel or the control channel, the information regarding each setting parameter is sent to the receiving side, and shared between it and the receiving side device (S807). Then, during a time until the communication end, the above described steps S801 to S807 are repeated by the loop processing (S808).

(3) At a Time of Exceeding the Error Rate Level

When the error rate judgement such as the CRC check, etc. is carried out during the communication at the receiving side, the guard interval is re-set in the case where the detected error rate is larger than a certain constant level.

More specifically, the delay profile is obtained from the received signal waveform at the fading estimation unit 8, and the guard interval larger than the maximum delay time is set at the OFDM GI length control unit 23. From the optimum guard interval length information set here, the optimum guard interval is attached at the guard interval attaching unit 21.

Figure 39:
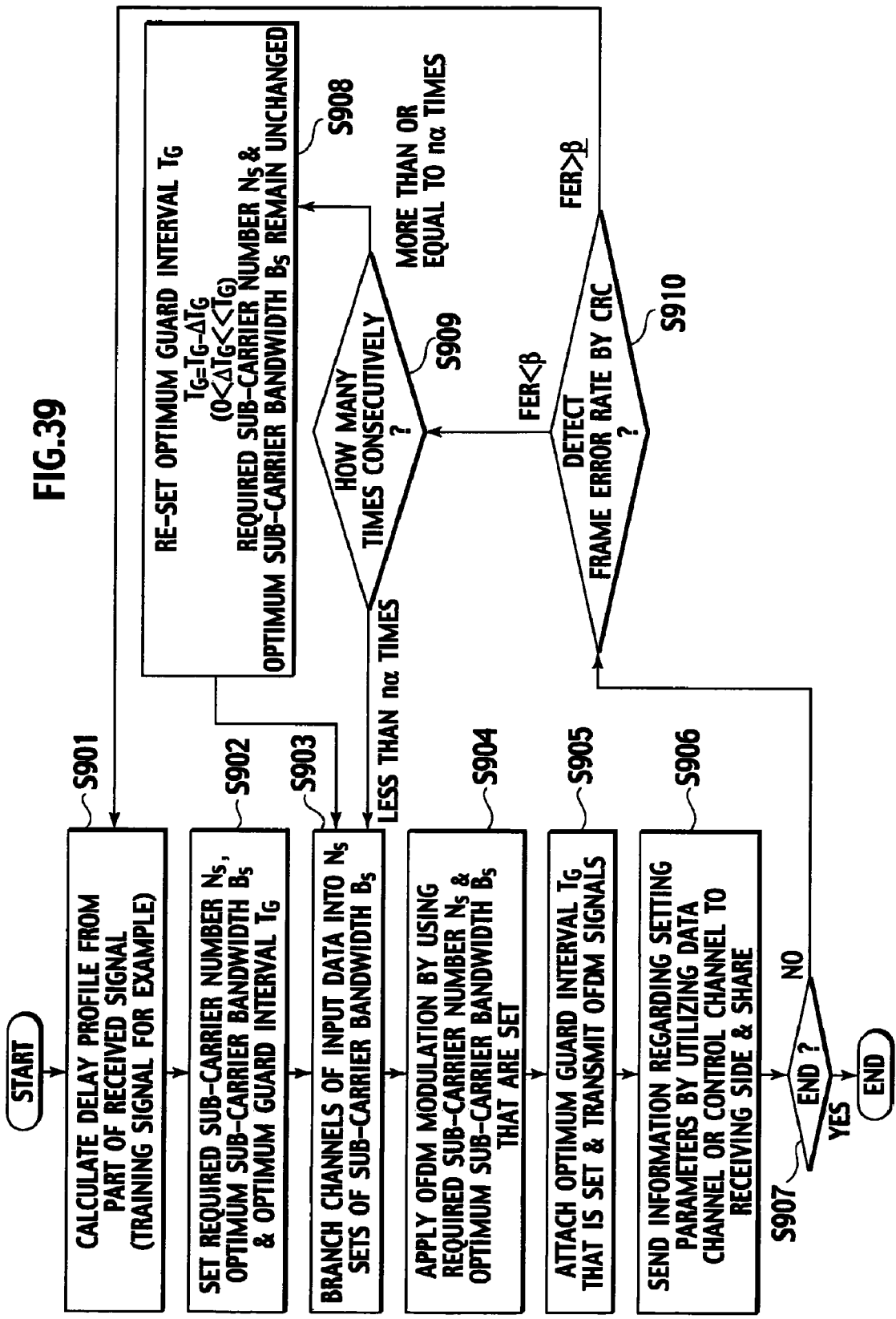
FIG. 39 is a flow chart showing a procedure for periodically re-setting at each time of changing a frame in the twelfth embodiment.

Such a method for re-setting the OFDM parameters when the error rate exceeds a certain constant level in the case where the error rate judgement is carried out at the receiving side will be described by using the flow chart of FIG. 39.

When the error rate judgement such as the CRC check is carried out during the communication at the receiving side, the fading estimation unit 8 is operated in the case where the detected error rate is larger than a certain constant level, and the fading information such as the delay profile and the maximum Doppler frequency, for example, is extracted from the received signal waveform (S901).

Next, using these fading information, the required sub-carrier number Ns, the optimum sub-carrier bandwidth Bs, and the optimum guard interval length $T_G$ are calculated (S902). According to these information, the inputted data are branched into channels of the required sub-carrier number Ns after the digital modulation (S903), the OFDM modulation into the optimum sub-carrier bandwidth is carried out (S904), and the optimum guard interval length $T_G$ is attached to the baseband OFDM signals and transmitted (S905). After that, by utilizing the data channel or the control channel, the information regarding each setting parameter is sent to the receiving side, and shared between it and the receiving side device (S906).

As for the guard interval length, a command for shortening the guard interval gradually ($T_G=T_G+\Delta T_G$) is sent to the transmitting side, when the communication quality is good as the error rate does not rise for times greater than or equal to a certain constant number of repeat times ($N_\alpha$ times) at the receiving side. Namely, after executing the processing of the above described steps S901 to S906, the detection of the frame error rate is carried out by the error rate judgement (CRC), and a judgement as to whether it is exceeding a prescribed error rate β or not is made (S910). In the case where it is exceeding the error rate β, the above described steps S901 to S906 are carried out again, and in the case where it is not exceeding, the frequency of occurrence of the error is counted (S909).

In the case where the consecutive number of times at which the error frame occurred is less than the prescribed number of times nα at the step S909, the above described steps S903 to S906 are executed again. On the other hand, in the case where the consecutive number of times at which the error frame occurred is exceeding the prescribed number of times nα at the step S909, the already set values of the required sub-carrier number Ns and the optimum sub-carrier bandwidth Bs are left unchanged, and only the optimum guard interval $T_G$ is re-set (S908), and the processing of the above described steps S903 to S906 is executed.

In this way, it is possible to improve the frequency utilization efficiency by reducing the guard interval in the case where the communication quality is good, and it is possible to attach the optimum guard interval length according to the propagation path.

Thirteenth Embodiment

Note that, in the seventh embodiment to the twelfth embodiment described above, the exemplary case of applying the transmission device of the present invention to the OFDM transmission scheme has been described, but the present invention is not limited to this, and it is also possible to apply it to the variable spreading-orthogonal frequency code division (VSF-OFCDM: Variable Spreading Factor-Orthogonal Frequency and Code Division Multiplexing) transmission scheme which is the fourth generation communication scheme, for example. In this VSF-OFCDM, the information symbol is divided on a plurality of frequency axes, and the information symbol is transmitted by spreading it by a spread code of a variable spreading rate which is assigned to each radio mobile station.

Figure 40:
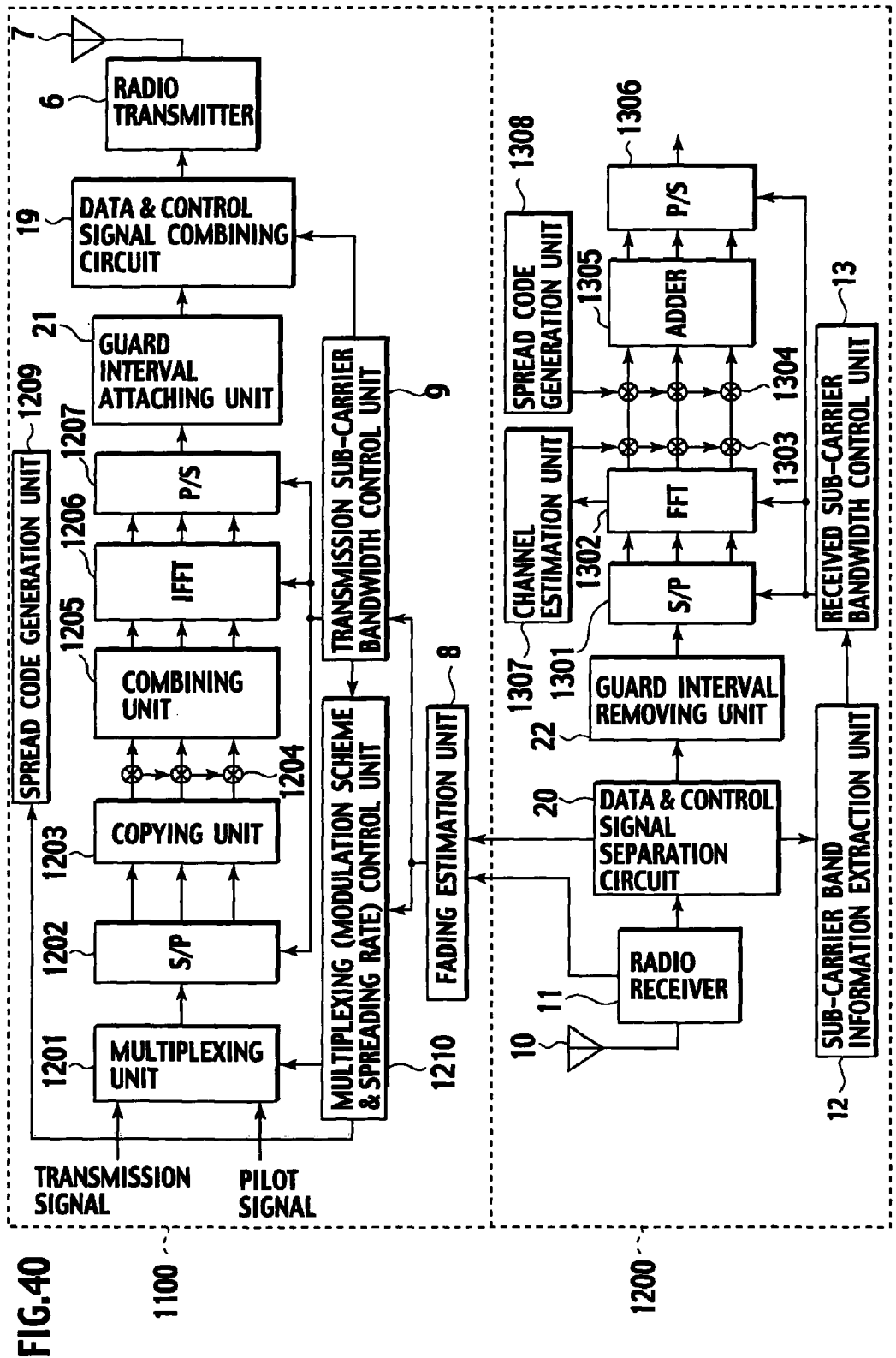
FIG. 40 is a block diagram showing an internal configuration of a transmission device according to the thirteenth embodiment.

The transmission device according to the present embodiment has, as shown in FIG. 40, at the transmission unit 1100, a multiplexing unit 1201 for multiplexing the transmission signals (information symbols) and the pilot signals, a serial/parallel conversion unit 1202 for converting the multiplexed signals into parallel signals, a copying unit 1230 for copying each signal sequence, a spread code generation unit 1209 for generating a spread code, a multiplication unit 1204 for multiplying each signal sequence copied by the copying unit 203 with the spread code, a combining unit 1205 for combining the multiplied signals, an inverse fast Fourier transform unit (IFFT) 1206 for applying the inverse fast Fourier transform to the combined signals, a parallel/serial conversion unit 1207 for converting respective transformed signals into a single signal sequence, a guard interval attaching unit 21, a data and control signal combining circuit 19, a radio transmitter 6, a multiplexing control unit 1210, a transmission sub-carrier bandwidth control unit 9, and a fading estimation unit 8.

The serial/parallel conversion unit 1202 is a circuit for converting the serial signals into parallel signals which are a plurality of signal sequences, according to the bandwidth and the number of sub-carriers calculated by the transmission sub-carrier bandwidth control unit 9, and the converted parallel signals are respectively outputted to the copying unit 1203.

The copying unit 1203 is a circuit for copying each information symbol of a plurality of information symbol sequences which are serial to parallel converted at the serial/parallel conversion unit 1202 as many as the number equal to the sequence length (chip length) of the spread code, and the copied information symbols are arranged on the frequency axis and outputted to the multiplication unit 1204 as one set of the information symbol sequence.

The spread code generation unit 1209 is a circuit for generating the spread code of a prescribed spreading rate which is assigned to each radio mobile station as many as the number of sub-carriers, according to the spreading rate inputted from the multiplexing control unit 1210. The multiplication unit 1204 is a circuit for multiplying each information symbol copied at the copying unit 1203 with the spread code generated by the spread code generation unit 1209.

The inverse fast Fourier transform unit 1206 is a circuit for carrying out the inverse fast Fourier transform on a plurality of signal sequences inputted from the combining unit 1205, according to the bandwidth and the number of sub-carriers calculated by the transmission sub-carrier bandwidth control unit 9, and each transformed signal sequence is outputted to the parallel/serial conversion unit 1207.

The parallel/serial conversion unit 1207 is a circuit for converting a plurality of signal sequences inputted from the inverse fast Fourier transform unit 1206 into serial signals which are a single signal sequence, according to the bandwidth and the number of sub-carriers calculated by the transmission sub-carrier bandwidth control unit 9. The guard interval attaching unit 21 inserts the guard interval into the signals converted by the parallel/serial conversion unit 1207.

The multiplexing control unit 1210 calculates the modulation scheme and the spreading rate, according to the propagation path state (fading) estimated by the fading estimation unit 8 and the transmission sub-carrier bandwidth and the number of sub-carriers calculated by the transmission sub-carrier bandwidth control unit 9, and outputs them to the multiplexing unit 1201 and the spread code generation unit 1209.

Then, at the transmission unit 1100, the transmission signals multiplexed by the multiplexing unit 1201 are converted into the parallel signals formed by a plurality of signal sequences by the serial/parallel conversion unit (S/P) 1202, and after carrying out the copying processing at the copying unit 1203, each signal sequence is multiplied with the spread code generated by the spread code generation unit 1209, and after applying the inverse Fourier transform on these combined signals at the inverse fast Fourier transform unit (IFFT) 1206, they are converted into serial signals formed by a single signal sequence by the parallel/serial conversion unit (P/S) 1207, the guard interval is inserted into these serial signals by the guard interval attaching unit 21, each parameter calculated by the transmission sub-carrier bandwidth control unit 9 is combined by the data and control signal combining circuit 19, and the OFDM signals are transmitted.

On the other hand, as shown in FIG. 40, the transmission device according to the present embodiment has a radio receiver 11, a data and control signal separation circuit 20, a guard interval removing unit 22, a serial/parallel conversion unit 1301, a fast Fourier transform unit 1302, a channel estimation unit 1307, a spread code generation unit 1308, multiplication units 1303 and 1304, an adder 1305, a parallel/serial conversion unit 1306, a sub-carrier band information extraction means 12, and a received sub-carrier bandwidth control unit 13.

The serial/parallel conversion unit 1301 is a circuit for converting the serial signals into parallel signals which are a plurality of signal sequences, according to the bandwidth and the number of sub-carriers calculated by the received sub-carrier bandwidth control unit 13, and the converted parallel signals are respectively outputted to the fast Fourier transform unit 1302. The parallel/serial conversion unit 1306 is a circuit for converting a plurality of signal sequences inputted from the adder 1305 into the serial signals which are a single signal sequence, according to the bandwidth and the number of sub-carriers calculated by the received sub-carrier bandwidth control unit 13.

The channel estimation unit 1307 is a circuit for extracting the pilot signals from the signals transformed by the fast Fourier transform unit 1302, and estimating the channel variation value of each sub-carrier according to these pilot signals. Also, the multiplication units 1303 and 1304 are circuits for guaranteeing the variation of each sub-carrier according to the variation value estimated by the channel estimation unit 1307 and multiplying the spread code generating by the spread code generation unit 1308.

Then, at the reception unit 1200, the sub-carrier band information is extracted by the sub-carrier band information extraction means 12 according to the control signals separated by the data and control signal separation circuit 20 from the received OFDM signals, and the guard interval is removed by the guard interval removing unit 22. At this point, the received signal waveform acquired by the radio receiver and the fading time variation information and the delay distortion acquired at the data and control signal separation circuit 20 are sent to the fading estimation unit 8.

Next, they are converted into parallel signals formed by a plurality of signal sequences by the serial/parallel conversion unit (S/P) 1301, according to the sub-carrier bandwidth and the number of sub-carriers calculated by the received sub-carrier bandwidth control unit 13 according to the sub-carrier band information, and the Fourier transform is applied to each signal sequence at the fast Fourier transform unit (FFT) 1302. After that, each transformed signal is multiplied with the variation value estimated by the channel estimation unit 1307 and the spread code generated by the spread code generation unit, and they are converted into the serial signals formed by a single signal sequence by the parallel/serial conversion unit (P/S) 1306, and these serial signals are outputted as the demodulated signals.

According to such a transmission device according to the present embodiment, the information symbol is divided on a plurality of frequency axes according to the propagation route (fading) state, and the information can be transmitted by spreading it by a spread code of a variable spreading rate which is assigned to each reception device, so that it is possible to multiplex signals of a plurality of users into signals of the identical time in the identical frequency band, according to the propagation route for each reception device, and it is possible to prevent interferences among users while realizing the efficient utilization of the resources.

Also, according to the transmission device according to the present embodiment, the wide band system of the OFDM scheme and the narrow band system can be made to coexist in the identical frequency band, so that by using two schemes in the same frequency band together, the new generation communication scheme can be made to coexist, and in the case of changing the communication scheme, a smooth transition in stages from the previous scheme to the new scheme can be made.

According to the radio communication system and the radio communication method of the present invention, by calculating the optimum sub-carrier occupied band according to the fading radio wave propagation path information, and making the transmission band variable by adaptively controlling the clock rate and the number of sub-carriers, even in the case of carrying out the transmission of the identical information bit rate according to the fading time variation and the maximum delay amount, it is possible to realize the improvement of the transmission characteristics by changing the optimum sub-carrier bandwidth and the number of sub-carriers of the OFDM according to the characteristics of the transmission path.

Also, the maximum tolerable bandwidth given to the system is constant, and the channels deviating from the system band occur in the case of enlarging the sub-carrier occupied band, but the channel mapping control for not making the mapping to outside the system bandwidth is carried out, so that it is possible to improve the utilization efficiency of the frequency bands possessed by the system.

The invention claimed is:

1. A radio communication system, comprising:
a communication unit configured to carry out communications between radio stations by modulating a plurality of signal sequences to be transmitted and received into an initial assignment of a plurality of frequency channels assigned, respectively, to each of a plurality of cells;
a channel mapping means for rearranging, for each of the plurality of cells, the initial assignment of the plurality of frequency channels into newly assigned continuous frequency channels;
a bandwidth control means for controlling a bandwidth of said newly assigned continuous frequency channels according to a propagation state of said newly assigned continuous frequency channels; and
means for orthogonally multiplexing the newly assigned continuous frequency channels, wherein
said bandwidth control means converts information data sequences into a plurality of channels, and transmits and receives a signal sequence of each of these plurality of channels by a plurality of orthogonalized sub-carrier signals, and includes,
a fading estimation means for estimating a propagation route of said sub-carrier signals, and
a sub-carrier bandwidth control means for controlling a bandwidth of said sub-carrier signals to be transmitted and received, according to a fading information estimated by said fading estimation means.

2. The radio communication system as described in claim 1, wherein
said channel mapping means includes,
a channel mapping circuit configured to carry out rearrangement of assignment of said frequency channels, and to assign particular continuous frequency channels of a system band for each area.

3. The radio communication system of claim 2, further comprising:
a channel selection unit configured to generate unused frequency channels by repeating rearrangement by said channel mapping means and the orthogonal multiplexing, and to assign new channels to the unused frequency channels.

4. The radio communication system of claim 1, further comprising:
a storage unit configured to store a search table indicating a using state of the frequency channels,
wherein said channel mapping means acquires said search table, searches for vacant channels, and rearranges the plurality of frequency channels based on the vacant channels.

5. The radio communication system as described in claim 1, wherein the channel mapping means assigns output signal sequences in which respective frequency channels have an identical symbol rate are assigned to a newly assigned continuous frequency channel, and there is no guard band between the newly assigned frequency channels.

6. A radio communication method executed by a radio communication apparatus, said method comprising:
carrying out communications between radio stations and the radio communication apparatus by modulating a plurality of signal sequences to be transmitted and received into an initial assignment of a plurality of frequency channels assigned, respectively, to each of a plurality of cells;
rearranging, at the radio communication apparatus, for each of the plurality of cells, the initial assignment of the plurality of frequency channels into newly assigned continuous frequency channels;
controlling, at the radio communication apparatus, a bandwidth of said newly assigned continuous frequency channels according to a propagation state of said newly assigned continuous frequency channels; and
orthogonally multiplexing the newly assigned continuous frequency channels, wherein said controlling includes,
converting information data sequences into a plurality of channels,
transmitting and receiving a signal sequence of each of these plurality of channels by a plurality of orthogonalized sub-carrier signals,
estimating a propagation route of said sub-carrier signals, and
controlling a bandwidth of said sub-carrier signals to be transmitted and received, according to estimated fading information.

7. The radio communication method of claim 6, further comprising:
carrying out communications between radio stations through the frequency channel assigned to each of a plurality of areas, wherein
said rearranging includes assigning particular continuous frequency channels of a system band for each of said areas.

8. The method of claim 6, further comprising:
acquiring a table indicating a using state of the frequency channels;
searching the table for vacant channels; and
rearranging the plurality of frequency channels based on the vacant channels.

9. The method of claim 6, further comprising:
generating unused frequency channels; and
assigning new channels to the unused frequency channels.

10. A radio communication system, comprising:
a communication unit configured to carry out communications between radio stations by modulating a plurality of signal sequences to be transmitted and received into an initial assignment of a plurality of frequency channels assigned, respectively, to each of a plurality of cells;
a channel mapping unit configured to rearrange, for each of the plurality of cells, the initial assignment of the plurality of frequency channels into newly assigned continuous frequency channels;

a bandwidth control unit configured to control a bandwidth of said newly assigned continuous frequency channels according to a propagation state of said newly assigned continuous frequency channels; and a converter configured to orthogonally multiplex the newly assigned continuous frequency channels, wherein said bandwidth control unit converts information data sequences into a plurality of channels, and transmits and receives a signal sequence of each of these plurality of channels by a plurality of orthogonalized sub-carrier signals, and includes, a fading estimation unit configured to estimate a propagation route of said sub-carrier signals, and a sub-carrier bandwidth control unit configured to control a bandwidth of said sub-carrier signals to be transmitted and received, according to a fading information estimated by said fading estimation unit.

* * * * *